United States Patent
Xu et al.

(10) Patent No.: US 12,026,690 B2
(45) Date of Patent: Jul. 2, 2024

(54) DISPLAY METHOD FOR FOLDABLE ELECTRONIC DEVICE AND ELECTRONIC DEVICE

(71) Applicant: Huawei Technologies Co., Ltd., Guangdong (CN)

(72) Inventors: Jie Xu, Shanghai (CN); Yueqi Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 325 days.

(21) Appl. No.: 17/753,011

(22) PCT Filed: Aug. 4, 2020

(86) PCT No.: PCT/CN2020/106892
§ 371 (c)(1),
(2) Date: Feb. 15, 2022

(87) PCT Pub. No.: WO2021/031849
PCT Pub. Date: Feb. 25, 2021

(65) Prior Publication Data
US 2022/0335406 A1    Oct. 20, 2022

(30) Foreign Application Priority Data
Aug. 16, 2019 (CN) .......................... 201910759757.1

(51) Int. Cl.
*G06Q 20/32* (2012.01)
*G06F 3/0346* (2013.01)
(Continued)

(52) U.S. Cl.
CPC ....... *G06Q 20/3223* (2013.01); *G06F 3/0346* (2013.01); *G06F 3/04845* (2013.01);
(Continued)

(58) Field of Classification Search
CPC ............. G06Q 20/3223; G06Q 20/351; G06Q 20/3555; G06Q 20/3574; G06Q 20/3274;
(Continued)

(56) References Cited

U.S. PATENT DOCUMENTS 9,990,126 B2 *   6/2018   Chanyontpatanakul ....................
                                                G06Q 30/0641
11,818,852 B2 *  11/2023  Fang ................. H04M 1/72454
(Continued)

FOREIGN PATENT DOCUMENTS

| CN | 101647259 A | 2/2010 |
| CN | 206193906 U | 5/2017 |

(Continued)

*Primary Examiner* — Mihir K Rayan
(74) *Attorney, Agent, or Firm* — WOMBLE BOND DICKINSON (US) LLP

(57) ABSTRACT

A specific solution includes: as an electronic device is folded, dividing a display screen of the electronic device into a first screen and a second screen; when the electronic device is in a folded state, detecting that the electronic device is in a landscape state or a portrait state; and if the electronic device is in the landscape state, displaying a first interface in response to horizontal unfolding of the electronic device, where the first interface includes a payment mode of one or more applications; or if the electronic device is in the portrait state, displaying a second interface in response to vertical unfolding of the electronic device, where the second interface includes any one of a lock screen interface, a main interface, or an interface displayed before the electronic device is folded.

20 Claims, 35 Drawing Sheets

(51) Int. Cl.
*G06F 3/04845* (2022.01)
*G06F 3/0488* (2022.01)
*G06Q 20/34* (2012.01)
*H04M 1/02* (2006.01)
*H04M 1/72403* (2021.01)
*H04M 1/72454* (2021.01)

(52) U.S. Cl.
CPC ......... *G06F 3/0488* (2013.01); *G06Q 20/351* (2013.01); *G06Q 20/3555* (2013.01); *G06Q 20/3574* (2013.01); *G06F 2203/04803* (2013.01); *G06Q 20/3274* (2013.01); *G06Q 20/3278* (2013.01); *G09G 2380/02* (2013.01); *G09G 2380/04* (2013.01); *H04M 1/0216* (2013.01); *H04M 1/72403* (2021.01); *H04M 1/72454* (2021.01)

(58) Field of Classification Search
CPC ............. G06Q 20/3278; G06Q 20/204; G06Q 20/227; G06Q 20/3224; G06Q 20/40145; G06Q 20/405; G06F 3/0346; G06F 3/04845; G06F 3/0488; G06F 2203/04803; G06F 1/1618; G06F 1/1652; G09G 2380/02; G09G 2380/04; H04M 1/0216; H04M 1/72403; H04M 1/72454; H04M 1/0245
See application file for complete search history.

(56) References Cited

U.S. PATENT DOCUMENTS

| | | | |
|---|---|---|---|
| 2012/0081277 A1* | 4/2012 | de Paz | G06F 3/04817 345/156 |
| 2016/0253651 A1 | 9/2016 | Park et al. | |
| 2017/0270510 A1* | 9/2017 | Kattimani | H04W 4/023 |
| 2018/0359350 A1 | 12/2018 | Kim et al. | |
| 2021/0389873 A1 | 12/2021 | Chen et al. | |
| 2022/0386486 A1* | 12/2022 | Fang | G06F 1/1641 |

FOREIGN PATENT DOCUMENTS

| | | |
|---|---|---|
| CN | 107395871 A | 11/2017 |
| CN | 107810470 A | 3/2018 |
| CN | 108196807 A | 6/2018 |
| CN | 109889630 A | 6/2019 |
| CN | 109917956 A | 6/2019 |
| CN | 110035180 A | 7/2019 |
| CN | 110620833 A | 12/2019 |
| EP | 2779061 A1 | 9/2014 |
| JP | 2010277465 A | 12/2010 |
| JP | 2015141520 A | 8/2015 |
| JP | 2017513153 A | 5/2017 |
| WO | 2006058873 A1 | 6/2006 |
| WO | 2018026057 A1 | 2/2018 |

* cited by examiner

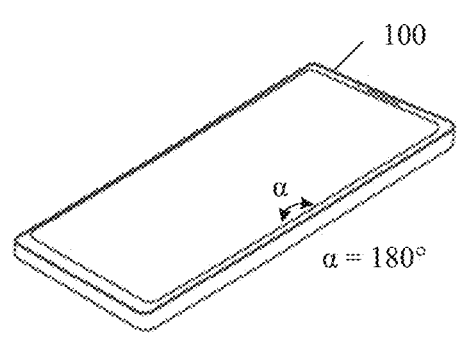
FIG. 2(a)
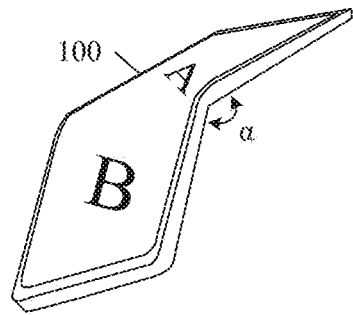
FIG. 2(b)
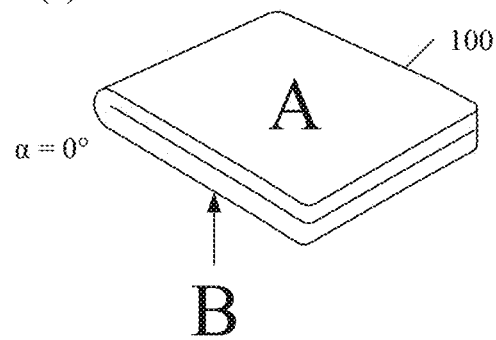
FIG. 2(c)
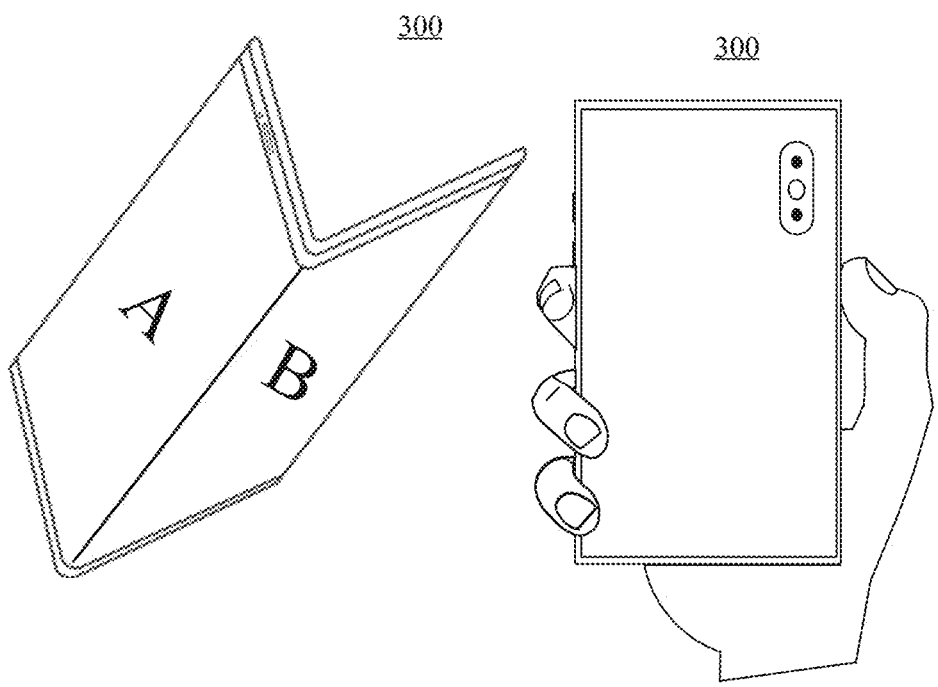
FIG. 3(a)
FIG. 3(b)

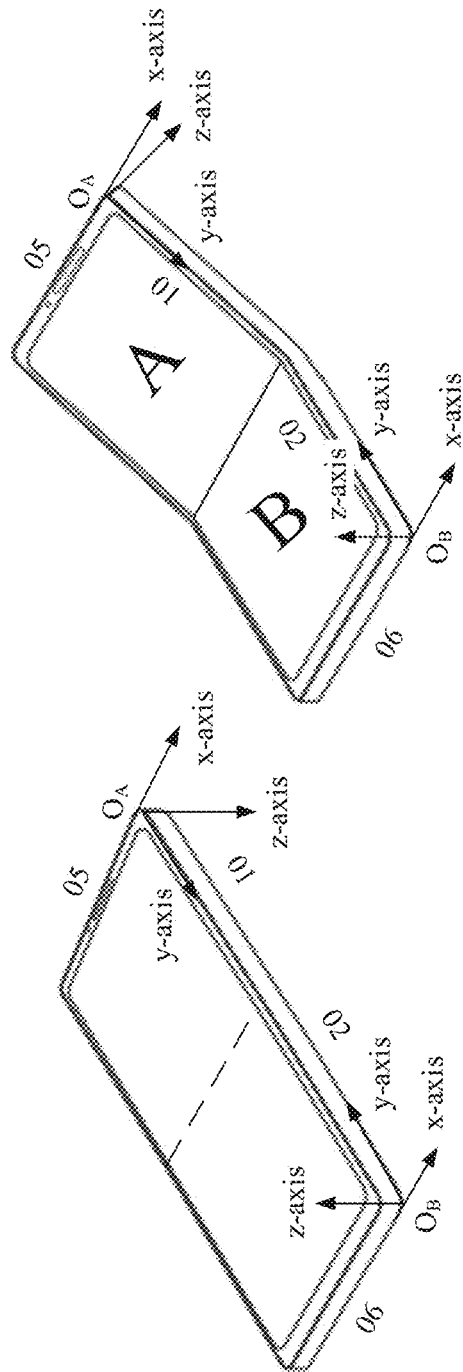
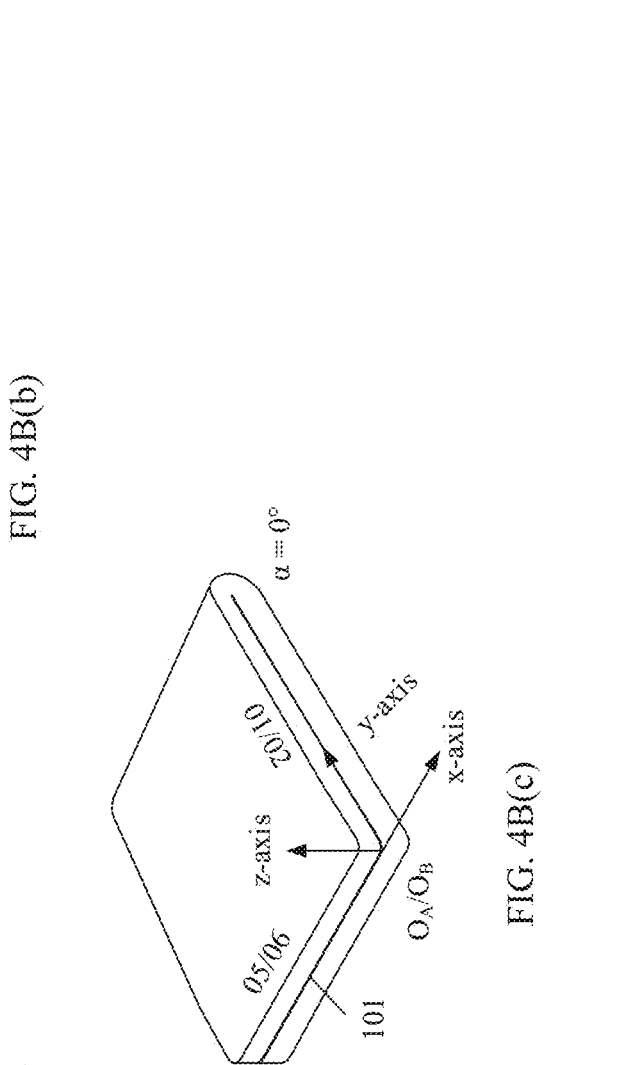
FIG. 4B(a)
FIG. 4B(b)
FIG. 4B(c)

DISPLAY METHOD FOR FOLDABLE ELECTRONIC DEVICE AND ELECTRONIC DEVICE

CROSS-REFERENCE TO RELATED APPLICATIONS

This application is a National Stage of International Application No. PCT/CN2020/106892, filed on Aug. 4, 2020, which claims priority to Chinese Patent Application No. 201910759757.1, filed on Aug. 16, 2019. Both of the aforementioned applications are hereby incorporated by reference in their entireties.

TECHNICAL FIELD

Embodiments of this application relate to the field of electronic technologies and the field of foldable screen intelligent display technologies, and in particular, to a display method for a foldable electronic device and an electronic device.

BACKGROUND

With continuous development of electronic devices, more electronic devices having display screens such as mobile phones having display screens are widely applied in daily life and work of people. In addition, it is not difficult to find that, with development of screen technologies, a display screen of an electronic device also becomes larger, to provide richer information for a user and bring better user experience.

However, because the display screen of the electronic device is excessively large, portability of the electronic device is severely affected. Therefore, foldable-screen electronic devices (such as foldable-screen mobile phones) proposed in recent years are a future development direction of electronic devices.

As the electronic device is folded, the display screen (referred to as a foldable screen) of the electronic device may be divided into at least two display areas (for example, a first display area and a second display area).

When the user wants to use an application or a function of the electronic device on the foldable screen of the electronic device in an unfolded state (foldable screen in the unfolded state for short), the electronic device needs to respond to a plurality of operations of the user, to provide a corresponding service (for example, a payment service) for the user. For example, the plurality of operations may include: unfolding the foldable screen of the electronic device; unlocking the electronic device; searching for an entry of the application or function; and starting the application or function. The user's operation of starting the application or function on the unfolded foldable screen of the foldable-screen electronic device is complex, and user experience is poor.

SUMMARY

Embodiments of this application provide a display method for a foldable electronic device and an electronic device, to simplify a user's operation of starting an application or function on an electronic device in an unfolded state, and provide more convenient and comfortable operation experience for the user.

According to a first aspect, an embodiment of this application provides a display method for a foldable electronic device. The method may be applied to the foldable electronic device. As the electronic device is folded, a display screen of the electronic device is divided into a first screen and a second screen. The method may include: when the electronic device is in a folded state, detecting that the electronic device is in a landscape state or a portrait state; and if the electronic device is in the landscape state, displaying, by the electronic device, a first interface in response to horizontal unfolding of the electronic device, where the first interface includes a payment mode of one or more applications, and the payment mode is used by the electronic device to complete a transaction with another electronic device; or if the electronic device is in the portrait state, displaying, by the electronic device, a second interface in response to vertical unfolding of the electronic device, where the second interface includes any one of a lock screen interface of the electronic device, a main interface, or an interface displayed before the electronic device is folded.

Generally, when using the electronic device, a user is accustomed to vertically holding the electronic device in the folded state, and then vertically unfolding the electronic device. In other words, that the electronic device in the folded state is vertically held and vertically unfolded is a normal state in which the user uses the electronic device. When the electronic device in the folded state is vertically held and vertically unfolded, the electronic device may display the lock screen interface, the main interface, or an interface displayed during last unfolding, or an interface of any application. However, that the electronic device in the folded state is horizontally held and horizontally unfolded may be referred to as a special state in which the user uses the electronic device.

In this instance of this application, when the electronic device is in the folded state, the electronic device may be horizontally held, automatically start a payment function when being horizontally unfolded, and display an interface (that is, the first interface) including a payment mode of one or more applications. In this way, the user's operation of starting the payment function on the foldable electronic device in the unfolded state can be simplified, and user experience can be improved.

In one embodiment, the folded state is a state in which an included angle between the first screen and the second screen is less than a first preset angle threshold. When detecting that a change of the first screen and/or the second screen in compliance with a preset condition occurs, the electronic device may determine that the electronic device is horizontally unfolded.

A gyro sensor and/or an acceleration sensor are/is disposed on both the first screen and the second screen. The gyro sensor of the first screen is configured to capture angles between an x-axis, a y-axis, and a z-axis of the first screen and a horizontal plane, and the acceleration sensor of the first screen is configured to capture acceleration of the first screen. The gyro sensor of the second screen is configured to capture angles between an x-axis, a y-axis, and a z-axis of the second screen and the horizontal plane, and the acceleration sensor of the second screen is configured to capture acceleration of the second screen.

In this embodiment of this application, that a change of the first screen and/or the second screen in compliance with a preset condition occurs may specifically include: a change of the angle and the acceleration in compliance with the preset condition occurs.

In one embodiment, that the first interface includes a payment mode of one or more applications specifically includes: the first interface includes at least one transaction card. The at least one transaction card is used to support the electronic device in completing the transaction with the another electronic device by using the payment mode. In this way, when the electronic device displays the first interface, the user may select different transaction cards to complete the transaction.

In one embodiment, the at least one transaction card may include a preset transaction card among transaction cards of the electronic device.

In one case, the preset transaction card may be set in the electronic device by the user. In another case, the preset transaction card may be a transaction card that is among the transaction cards of the electronic device and whose quantity of use times or use frequency in a first preset time period is greater than a first preset threshold. In this way, when the electronic device in the folded state is horizontally held and horizontally unfolded, one or more preset transaction cards may be directly displayed, so that the user can directly use the preset transaction card to make payment. In this way, the user's operation of starting the payment function on the electronic device in the unfolded state can be simplified, and user experience can be improved.

In another case, the preset transaction card may be a transaction card that is among the transaction cards of the electronic device and matches current scenario information of the electronic device. The current scenario information includes geographical location information and/or time information. In this way, the user's operation of displaying the transaction card corresponding to the current scenario information on the electronic device in the unfolded state can be simplified. Therefore, more convenient and comfortable operation experience can be provided for the user, and user experience is improved.

In another case, the preset transaction card may be a transaction card that currently has a preferential activity among the transaction cards of the electronic device. In one embodiment, the electronic device may further display preferential activity information of each transaction card, so that the user conveniently selects a transaction card with a relatively high preference for payment.

In one embodiment, the at least one transaction card may further include a transaction card other than the preset transaction card among the transaction cards of the electronic device. Specifically, the electronic device may display the preset transaction card on the first interface in a preset display manner, and display the other transaction card in another display manner different from the preset display manner. For example, the preset display manner may include: displaying the preset transaction card at a top layer of the first interface. The preset transaction card displayed at the top layer of the first interface is not blocked by another transaction card.

In one embodiment, the at least one transaction card may include a plurality of transaction cards. The electronic device may display a part of the at least one transaction card on the first screen, and display another part of the at least one transaction card on the second screen. In other words, the electronic device may distribute the at least one transaction card on the first screen and the second screen for displaying.

In one embodiment, the first screen and the second screen may display a plurality of transaction cards. In this case, the electronic device may display a first transaction card on the first screen in the preset display manner in response to a first sliding operation of the user on the first screen. As a sliding position of the first sliding operation changes, the first transaction card is switched among transaction cards displayed on the first screen. The electronic device displays a second transaction card on the second screen in the preset display manner in response to a second sliding operation of the user on the second screen. As a sliding position of the second sliding operation changes, the second transaction card is switched among transaction cards displayed on the second screen.

In this embodiment of this application, the electronic device may implement, in response to the first sliding operation of the user on the first screen, switching among the plurality of transaction cards displayed on the first screen; and implement, in response to the second sliding operation of the user on the second screen, switching among the plurality of transaction cards displayed on the second screen. According to this application, the user's operation of implementing transaction card switching can be reduced, man-machine interaction performance can be improved, and user experience can be improved.

In one embodiment, in response to a first operation of the user on a third transaction card displayed on the first screen, the electronic device displays the third transaction card on the first screen, displays no other transaction cards on the first screen, and displays a detail page of the third transaction card on the second screen. In response to a first operation of the user on a fourth transaction card displayed on the second screen, the electronic device displays the fourth transaction card on the second screen, displays no other transaction cards on the second screen, and displays a detail page of the fourth transaction card on the second screen.

The detail page may include one or more pieces of information, such as payment information, a transaction record, a balance, and a use time of a corresponding transaction card. The transaction card may be a traffic electronic payment card, for example, a bus electronic payment card of WeChat, a map electronic payment card of WeChat, a bus electronic payment card of Alipay, or a metro electronic payment card of Alipay. A detail page of the traffic electronic payment card may include real-time running information of a corresponding vehicle.

In one embodiment, in response to a second operation of the user on a fifth transaction card displayed on the first screen, the electronic device may display the fifth transaction card on the first screen, and display, on the second screen, a transaction card that matches the fifth transaction card among the transaction cards of the electronic device. In response to a second operation of the user on a sixth transaction card displayed on the first screen, the electronic device may display the sixth transaction card on the second screen, and display, on the first screen, a transaction card that matches the sixth transaction card among the transaction cards of the electronic device.

That one transaction card matches another transaction card specifically includes: when the one transaction card is used, a use frequency or a quantity of use times of the another transaction card is greater than a second preset threshold. For example, it is assumed that a supermarket membership card matches an electronic payment card of Alipay. When the user uses an electronic device to make payment, the electronic device displays the supermarket membership card and the electronic payment card of Alipay simultaneously. In this way, after scanning the supermarket membership card, a cashier can directly scan a payment code of the electronic payment card of Alipay to collect money. This can simplify a payment operation.

In one embodiment, the electronic device may include a plurality of types of transaction cards. For example, the plurality of transaction cards may include at least two types of transaction cards: an identification card, a bank card, a voucher card, and an electronic card. The identification card includes at least one transaction card of an identity card and a social security card. The voucher card includes at least one transaction card of a movie ticket, a train ticket, an airplane ticket, and an entrance ticket. The electronic card is a transaction card including an electronic payment code.

In one embodiment, the electronic device may display at least one of the transaction cards based on types. Specifically, the electronic device may display a first type of transaction card among the plurality of types of transaction cards on the first screen, and display a second type of transaction card on the second screen. The preset transaction card includes two transaction cards, and the first type of transaction card and the second type of transaction card are transaction cards that are of a same type as the preset transaction card.

The electronic device displays, in different display areas (that is, the first screen and the second screen) based on types of the transaction cards, at least one transaction card including the preset transaction card. Therefore, the user can conveniently view or search for transaction cards of a same type, and user experience can be improved.

In one embodiment, in response to a first folding operation of the user on the electronic device, the electronic device may display a third type of transaction card on the first screen, and display a fourth type of transaction card on the second screen. After displaying the third type of transaction card on the first screen, and displaying the fourth type of transaction card on the second screen, in response to a second folding operation of the user on the electronic device, the electronic device may display the first type of transaction card on the first screen again, and display the second type of transaction card on the second screen again.

It may be understood that a wallet (that is, a billfold) daily used by the user may include a plurality of interlayers, and that a plurality of cards may be placed in each interlayer. The electronic device may store a plurality of types of transaction cards, and each type of transaction card may include a plurality of transaction cards. In response to the first folding operation or the second folding operation, the electronic device switches and displays different types of transaction cards on the first screen and the second screen. This is equivalent to turning pages of the interlayers of the wallet, so that the user can view cards placed in each interlayer. In other words, the electronic device may switch and display different types of transaction cards on the first screen and the second screen in response to the first folding operation or the second folding operation with reference to behavior of turning the pages of the interlayers of the wallet to search for a card when the user daily uses the wallet (that is, the billfold). In this way, a card search manner that complies with a daily habit of the user can be provided for the user, and user experience can be improved.

In one embodiment, the electronic device displays a label of one or more transaction cards on the display screen while displaying the first interface, where the one or more transaction cards are voucher cards, and the voucher card includes at least one transaction card of a movie ticket, a train ticket, an airplane ticket, and an entrance ticket. The label of the one or more transaction cards is used to trigger the electronic device to display a detail page of a corresponding transaction card. In this way, the user can conveniently view and use the voucher transaction card, and user experience can be improved.

In one embodiment, after the electronic device displays the first interface, in response to a third operation of the user on the display screen, the electronic device starts a preset application or a preset function, or the electronic device displays a widget area including one or more control icons, where each control icon is used to start one preset application or preset function. In this way, by performing the third operation, the user can control the electronic device to quickly start the preset application or the preset function, so that more convenient and comfortable operation experience can be provided for the user.

In one embodiment, in response to a fourth operation of the user on a seventh transaction card displayed on the first screen, the electronic device displays the seventh transaction card on the first screen in the preset display manner. In response to a fourth operation of the user on an eighth transaction card displayed on the second screen, the electronic device displays the eighth transaction card on the second screen in the preset display manner. In other words, in response to a fourth operation of the user on any transaction card displayed on the first screen or the second screen, the electronic device may display the transaction card in the preset manner. In this way, the user can conveniently select, from the plurality of transaction cards, a transaction card that needs to be used currently, to complete a transaction.

In one embodiment, in response to a fifth operation of the user on the first screen, the electronic device displays a first editing interface, where the first editing interface is used to edit the transaction cards displayed on the first screen. In response to a fifth operation of the user on the second screen, the electronic device displays a second editing interface, where the second editing interface is used to edit the transaction cards displayed on the second screen. The editing includes adjusting an arrangement order of the transaction cards and deleting a transaction card. In this way, the electronic device may provide the user with functions of adjusting the arrangement order of the transaction cards on the first screen or the second screen and deleting a transaction card on the editing interface.

According to a second aspect, an embodiment of this application provides a foldable electronic device. The electronic device may include a memory, a display screen, and one or more processors. As the electronic device is folded, the display screen of the electronic device is divided into a first screen and a second screen. The memory and the display screen are coupled to the processor, the memory is configured to store computer program code, the computer program code includes a computer instruction, and when the one or more processors execute the computer instruction, the processor is configured to: when the electronic device is in a folded state, detect that the electronic device is in a landscape state or a portrait state; and the processor is further configured to: if the electronic device is in the landscape state, control the display screen to display a first interface in response to horizontal unfolding of the electronic device, where the first interface includes a payment mode of one or more applications, and the payment mode is used by the electronic device to complete a transaction with another electronic device; or if the electronic device is in the portrait state, control the electronic device to display a second interface in response to vertical unfolding of the electronic device, where the second interface includes any one of a lock screen interface of the electronic device, a main interface, or an interface displayed before the electronic device is folded.

In one embodiment, the folded state is a state in which an included angle between the first screen and the second screen is less than a first preset angle threshold. When detecting that a change of the first screen and/or the second screen in compliance with a preset condition occurs, the processor determines that the electronic device is horizontally unfolded. A gyro sensor and/or an acceleration sensor are/is disposed on both the first screen and the second screen. The gyro sensor of the first screen is configured to capture angles between an x-axis, a y-axis, and a z-axis of the first screen and a horizontal plane, and the acceleration sensor of the first screen is configured to capture acceleration of the first screen. The gyro sensor of the second screen is configured to capture angles between an x-axis, a y-axis, and a z-axis of the second screen and the horizontal plane, and the acceleration sensor of the second screen is configured to capture acceleration of the second screen. That a change of the first screen and/or the second screen in compliance with a preset condition occurs specifically includes: a change of the angle and the acceleration in compliance with the preset condition occurs.

In one embodiment, that the first interface includes a payment mode of one or more applications specifically includes: the first interface includes at least one transaction card. The at least one transaction card is used to support the electronic device in completing the transaction with the another electronic device by using the payment mode.

In one embodiment, the at least one transaction card includes a preset transaction card among transaction cards of the electronic device.

The preset transaction card may be set in the electronic device by a user. Alternatively, the preset transaction card may be a transaction card that is among the transaction cards of the electronic device and whose quantity of use times or use frequency in a first preset time period is greater than a first preset threshold. Alternatively, the preset transaction card may be a transaction card that is among the transaction cards of the electronic device and matches current scenario information of the electronic device, where the current scenario information includes geographical location information and/or time information. Alternatively, the preset transaction card may be a transaction card that currently has a preferential activity among the transaction cards of the electronic device.

In one embodiment, the at least one transaction card further includes a transaction card other than the preset transaction card among the transaction cards of the electronic device. The processor is further configured to control the display screen to display the preset transaction card on the first interface in a preset display manner, and display the other transaction card in another display manner different from the preset display manner. The preset display manner includes: displaying the preset transaction card at a top layer of the first interface, where the preset transaction card displayed at the top layer of the first interface is not blocked by another transaction card.

In one embodiment, the at least one transaction card includes a plurality of transaction cards; and that the processor is configured to control the display screen to display a first interface includes: the processor is configured to control the display screen to display a part of the at least one transaction card on the first screen, and display another part of the at least one transaction card on the second screen.

In one embodiment, the processor is further configured to: control the display screen to display a first transaction card on the first screen in the preset display manner in response to a first sliding operation of the user on the first screen, where as a sliding position of the first sliding operation changes, the first transaction card is switched among transaction cards displayed on the first screen; and control the display screen to display a second transaction card on the second screen in the preset display manner in response to a second sliding operation of the user on the second screen, where as a sliding position of the second sliding operation changes, the second transaction card is switched among transaction cards displayed on the second screen.

In one embodiment, the processor is further configured to: in response to a first operation of the user on a third transaction card displayed on the first screen, control the display screen to display the third transaction card on the first screen, display no other transaction cards on the first screen, and display a detail page of the third transaction card on the second screen; and in response to a first operation of the user on a fourth transaction card displayed on the second screen, control the display screen to display the fourth transaction card on the second screen, display no other transaction cards on the second screen, and display a detail page of the fourth transaction card on the second screen.

In one embodiment, the processor is further configured to: in response to a second operation of the user on a fifth transaction card displayed on the first screen, control the display screen to display the fifth transaction card on the first screen, and display, on the second screen, a transaction card that matches the fifth transaction card among the transaction cards of the electronic device; and in response to a second operation of the user on a sixth transaction card displayed on the first screen, control the display screen to display the sixth transaction card on the second screen, and display, on the first screen, a transaction card that matches the sixth transaction card among the transaction cards of the electronic device. That one transaction card matches another transaction card specifically includes: when the one transaction card is used, a use frequency or a quantity of use times of the another transaction card is greater than a second preset threshold.

In one embodiment, the memory stores a plurality of types of transaction cards, and the plurality of transaction cards include at least two types of transaction cards: an identification card, a bank card, a voucher card, and an electronic card, where the identification card includes at least one transaction card of an identity card and a social security card, the voucher card includes at least one transaction card of a movie ticket, a train ticket, an airplane ticket, and an entrance ticket, and the electronic card is a transaction card including an electronic payment code.

In one embodiment, that the processor is configured to control the display screen to display a part of the at least one transaction card on the first screen, and display another part of the at least one transaction card on the second screen includes: the processor is specifically configured to control the display screen to display a first type of transaction card among the plurality of types of transaction cards on the first screen, and display a second type of transaction card on the second screen. The preset transaction card includes two transaction cards, and the first type of transaction card and the second type of transaction card are transaction cards that are of a same type as the preset transaction card.

In one embodiment, the processor is further configured to: in response to a first folding operation of the user on the electronic device, control the display screen to display a third type of transaction card on the first screen, and display a fourth type of transaction card on the second screen. After controlling the display screen to display the third type of transaction card on the first screen, and display the fourth type of transaction card on the second screen, the processor is further configured to: in response to a second folding operation of the user on the electronic device, control the display screen to display the first type of transaction card on the first screen, and display the second type of transaction card on the second screen.

In one embodiment, the processor is further configured to control the display screen to display a label of one or more transaction cards on the display screen while displaying the first interface, where the one or more transaction cards are voucher cards, and the voucher card includes at least one transaction card of a movie ticket, a train ticket, an airplane ticket, and an entrance ticket. The label of the one or more transaction cards is used to trigger the electronic device to display a detail page of a corresponding transaction card.

In one embodiment, after controlling the display screen to display the first interface, the processor is further configured to: in response to a third operation of the user on the display screen, start a preset application or a preset function, or control the display screen to display a widget area including one or more control icons, where each control icon is used to start one preset application or preset function.

In one embodiment, the processor is further configured to: in response to a fourth operation of the user on a seventh transaction card displayed on the first screen, control the display screen to display the seventh transaction card on the first screen in the preset display manner; and in response to a fourth operation of the user on an eighth transaction card displayed on the second screen, control the display screen to display the eighth transaction card on the second screen in the preset display manner.

In one embodiment, the processor is further configured to: in response to a fifth operation of the user on the first screen, control the display screen to display a first editing interface on the first screen, where the first editing interface is used to edit the transaction cards displayed on the first screen; and in response to a fifth operation of the user on the second screen, control the display screen to display a second editing interface on the second screen, where the second editing interface is used to edit the transaction cards displayed on the second screen. The editing includes adjusting an arrangement order of the transaction cards and deleting a transaction card.

According to a third aspect, an embodiment of this application provides a chip system, where the chip system is applied to a foldable electronic device. The chip system includes one or more interface circuits and one or more processors. The interface circuit and the processor are interconnected by using a line. The interface circuit is configured to receive a signal from a memory of the electronic device, and send the signal to the processor, where the signal includes a computer instruction stored in the memory. When the processor executes the computer instruction, the electronic device performs the method according to any one of the first aspect and possible designs of the first aspect.

According to a fourth aspect, an embodiment of this application provides a computer storage medium. The computer storage medium includes a computer instruction, and when the computer instruction is run on a foldable electronic device, the electronic device is enabled to perform the method according to any one of the first aspect and possible designs of the first aspect.

According to a fifth aspect, an embodiment of this application provides a computer program product. When the computer program product is run on a computer, the computer is enabled to perform the method according to any one of the first aspect and possible designs of the first aspect.

It may be understood that for beneficial effects achievable by the foldable electronic device provided in any one of the second aspect and possible designs of the second aspect, the chip system in the third aspect, the computer storage medium in the fourth aspect, and the computer program product in the fifth aspect, refer to the beneficial effects in any one of the first aspect and possible designs of the first aspect. Details are not described herein again.

BRIEF DESCRIPTION OF DRAWINGS

FIG. 2($a$) to FIG. 2($c$) each is a schematic diagram of another product form instance of a foldable screen according to an embodiment of this application;

FIG. 3($a$) and FIG. 3($b$) each is a schematic diagram of another product form instance of a foldable screen according to an embodiment of this application;

FIG. 4B(a) to FIG. 4B(c) is schematic diagrams of coordinate systems of gyros according to an embodiment of this application;

DESCRIPTION OF EMBODIMENTS

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. For example, a first display area and a second display area are two different display areas. In the description of embodiments, unless otherwise specified, "a plurality of" means two or more than two.

An embodiment of this application provides a display method for a foldable electronic device, where the method may be applied to the foldable electronic device. As the electronic device is folded, a display screen (referred to as a foldable screen) of the electronic device may be divided into at least two display areas. For example, as the electronic device is folded, the foldable screen is divided into a first display area and a second display area.

For ease of description, in this embodiment of this application, a foldable screen is used to represent a foldable electronic device. For example, in this embodiment of this application, "folding of the foldable screen" is used to express "folding of the foldable electronic device". In this embodiment of this application, the at least two display areas may be referred to as at least two screens. For example, the first display area may be referred to as a first screen, and the second display area may be referred to as a second screen.

Foldable screens in this embodiment of this application may be classified into two types. One type is a foldable screen that is folded outwards (outward foldable screen for short), and the other type is a foldable screen that is folded inwards (inward foldable screen for short). It is assumed that the foldable screen may be folded into the first screen and the second screen. After the inward foldable screen is folded, the first screen and the second screen are opposite to each other, and are invisible to a user. After the outward foldable screen is folded, the first screen and the second screen are back to back, and are visible to the user.

Figure 1A:
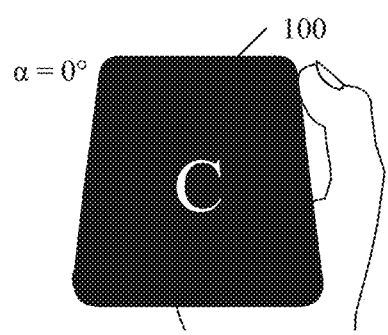
FIG. 1A(a) to FIG. 1A(d) each is a schematic diagram of a product form instance of a foldable screen according to an embodiment of this application.
Figure 1A:
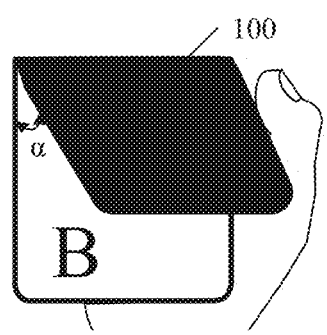
Figure 1A:
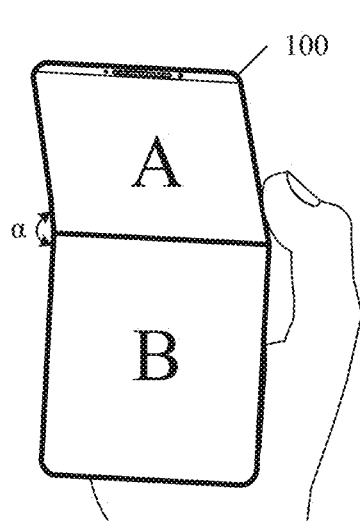
Figure 1A:
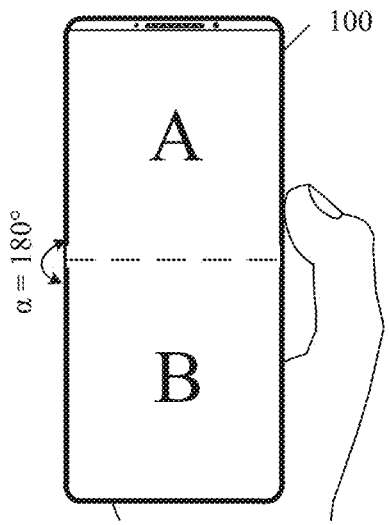

For example, FIG. 1A(a) to FIG. 1A(d) each is a schematic diagram of a product form of an electronic device (such as a mobile phone) 100 having an inward foldable screen according to an embodiment of this application, where FIG. 1A(d) is a schematic diagram of a form when the inward foldable screen is completely unfolded. The inward foldable screen may be folded into a screen A (that is, the first screen) and a screen B (that is, the second screen) shown in FIG. 1A(c). The inward foldable screen may continue to be folded into a foldable screen in a folded state shown in FIG. 1A(b) or FIG. 1A(a). As shown in FIG. 1A(a), after the foldable screen of the mobile phone 100 is completely folded, the screen A and the screen B are opposite to each other, and are invisible to the user.

It should be noted that, a display screen may be further disposed on a back of the first screen or the second screen of the inward foldable screen provided in this embodiment of this application, and may be referred to as a third screen. The third screen is visible to the user regardless of whether the inward foldable screen is folded. For example, as shown in FIG. 1A(a), after the inward foldable screen is completely folded ($\alpha=0°$), a screen C (that is, the third screen) is visible to the user, and the screen C may be disposed on a back of the screen A or the screen B. As shown in FIG. 1A(d), after the inward foldable screen is completely unfolded ($\alpha=180°$), the screen C (that is, the third screen) is located on the back of the screen A or the screen B, and is visible to the user. It may be understood that, for the electronic device having the inward foldable screen, when the foldable screen is in the folded state, an interface may be displayed on the third screen; or when the foldable screen is in an unfolded state, an interface may be displayed on the first screen and/or the second screen.

For another example, FIG. 2(a) to FIG. 2(c) each is a schematic diagram of a product form of a mobile phone having an outward foldable screen according to an embodiment of this application, where FIG. 2(a) is a schematic diagram of a form when the outward foldable screen is completely unfolded. The outward foldable screen may be folded into a screen A (that is, the first screen) and a screen B (that is, the second screen) shown in FIG. 2(b). The outward foldable screen may continue to be folded into a foldable screen in a folded state shown in FIG. 2(c). As shown in FIG. 2(c), after the foldable screen of the mobile phone is completely folded, the screen A and the screen B are back to back, and are visible to the user.

It may be understood that, for the electronic device having the outward foldable screen, when the foldable screen is in the folded state, an interface may be displayed on the first screen or the second screen; or when the foldable screen is in an unfolded state, an interface may be displayed on the first screen and the second screen. For descriptions of the unfolded state and the folded state of the foldable screen, refer to descriptions in the following embodiments. Details are not described herein again.

Generally, a value range of an included angle $\alpha$ between the first screen and the second screen of the foldable screen (including the inward foldable screen and the outward foldable screen) is [0°, 180°]. In this embodiment of this application, if $\alpha \in [0°, P1]$, the electronic device may determine that the foldable screen is in the folded state; or if α∈[P2, 180°], the electronic device may determine that the foldable screen is in the unfolded state. P1 is a first preset angle threshold, and P2 is a second preset angle threshold. P1 and P2 may be determined based on usage habits of a large quantity of users using foldable screens. Alternatively, P1 and P2 may be set by the user in the electronic device.

In some embodiments, based on usage habits of most users, when the included angle α between the first screen and the second screen is greater than 90°, there is a relatively high possibility that the user wants to use the first screen and the second screen as a whole (that is, as a complete display screen). Therefore, the second preset angle threshold P2 may be greater than 90°, and P1 may be less than 90°. For example, P2 may be 145°, 170°, or 175°. The first preset angle threshold P1 may be 5°, 8°, 10°, 15°, or the like.

It should be noted that, in this embodiment of this application, the foldable screen (including the inward foldable screen and the outward foldable screen) is folded into at least two screens. The foldable screen may be a plurality of screens that exist independently, or may be one complete screen of an integrated structure but is folded into at least two parts. For example, the foldable screen may be a flexible foldable screen. The flexible foldable screen includes a foldable side made of a flexible material. The flexible foldable screen is partially or completely made of the flexible material. The at least two screens into which the flexible foldable screen is divided are a complete screen of an integrated structure, but are folded into at least two parts. For example, the foldable screens in FIG. 1A(a) to FIG. 2(c) are both flexible foldable screens.

It should be understood that, in FIG. 1A(a) to FIG. 2(c), the electronic device is folded vertically to implement folding of the foldable screen. In other words, foldable screens of some electronic devices may be folded vertically. Certainly, the foldable screen of the electronic device may also be folded horizontally, to implement folding of the foldable screen. In other words, foldable screens of other electronic devices may be folded horizontally. For example, a foldable screen of an electronic device (such as a mobile phone) 300 may be horizontally folded into a screen A and a screen B shown in FIG. 3(a). After the foldable screen of the electronic device 300 is completely folded, the screen A and the screen B are invisible to the user.

It should be noted that the horizontally folded foldable screen may also include an inward foldable screen and an outward foldable screen. For example, the foldable screen shown in FIG. 3(a) and FIG. 3(b) is an inward foldable screen. The horizontally folded outward foldable screen is not shown in the accompanying drawings. Refer to related descriptions of the vertically folded outward foldable screen in the foregoing embodiment.

For example, the electronic device in this embodiment of this application may be a device including the foregoing foldable screen, such as a mobile phone, a tablet computer, a desktop computer, a laptop computer, a handheld computer, a notebook computer, an ultra-mobile personal computer (UMPC), a netbook, a cellular phone, a personal digital assistant (PDA), or an augmented reality (AR) or virtual reality (VR) device. A specific form of the electronic device is not specifically limited in this embodiment of this application.

The following describes the implementations of the embodiments of this application in detail with reference to accompanying drawings.

Figure 4A:
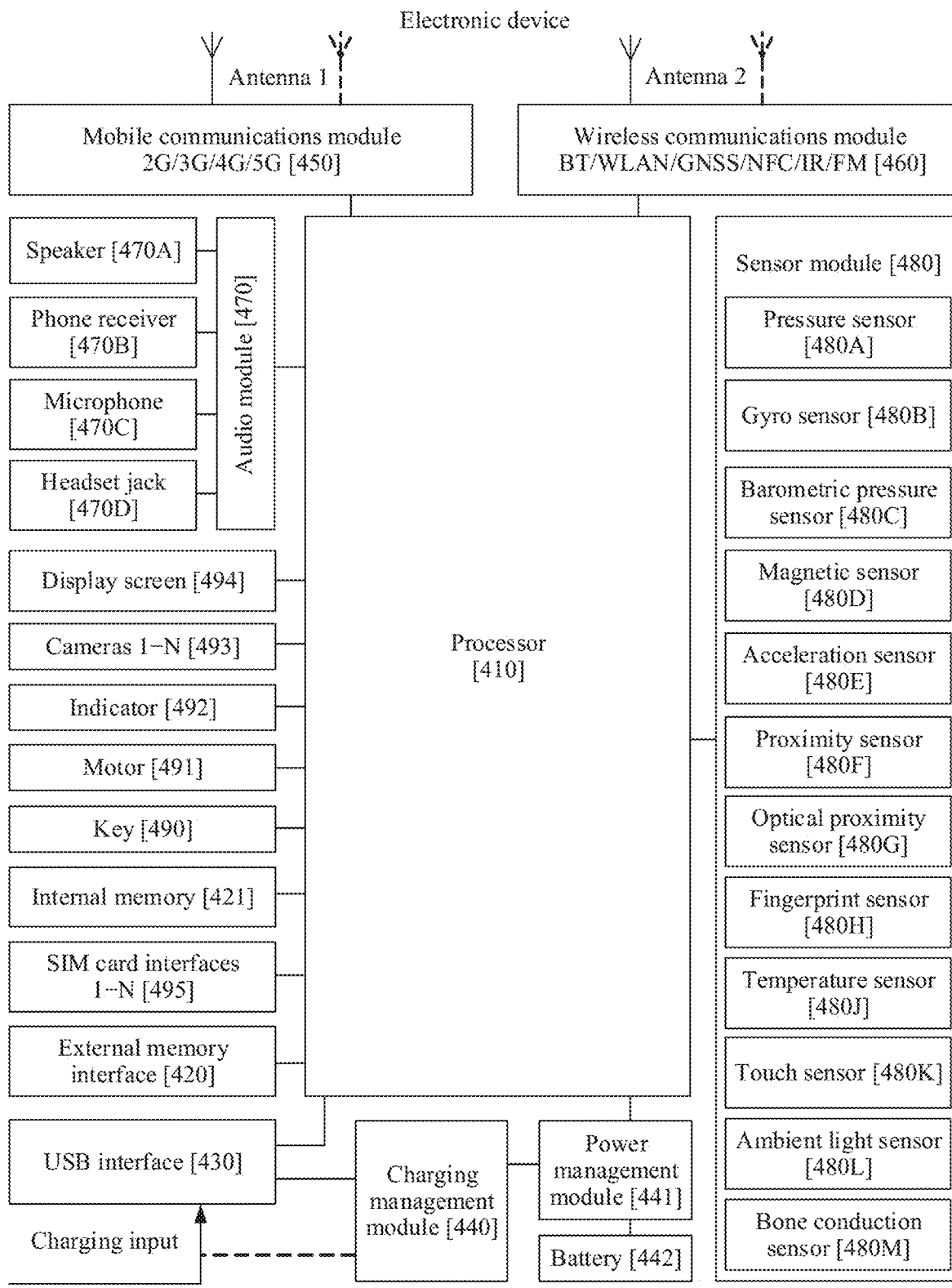
FIG. 4A is a schematic diagram of a hardware structure of an electronic device according to an embodiment of this application.

FIG. 4A is a schematic diagram of a structure of an electronic device according to an embodiment of this application. As shown in FIG. 4A, the electronic device may include a processor 410, an external memory interface 420, an internal memory 421, a universal serial bus (USB) interface 430, a charging management module 440, a power management module 441, a battery 442, an antenna 1, an antenna 2, a mobile communications module 450, a wireless communications module 460, an audio module 470, a speaker 470A, a phone receiver 470B, a microphone 470C, a headset jack 470D, a sensor module 480, a key 490, a motor 491, an indicator 492, a camera 493, a display screen 494, and a subscriber identity module (SIM) card interface 495, and the like.

The sensor module 480 may include a pressure sensor 480A, a gyro sensor 480B, a barometric pressure sensor 480C, a magnetic sensor 480D, an acceleration sensor 480E, a proximity sensor 480F, an optical proximity sensor 480G, a fingerprint sensor 480H, a temperature sensor 480J, a touch sensor 480K, an ambient light sensor 480L, a bone conduction sensor 480M, and the like.

It may be understood that the structure illustrated in this embodiment does not constitute a specific limitation on the electronic device. In other embodiments, the electronic device may include more or fewer components than those shown in the figure, or some components are combined, or some components are split, or component arrangements are different. The illustrated components may be implemented by hardware, software, or a combination of software and hardware.

The processor 410 may include one or more processing units. For example, the processor 410 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device. The controller may generate an operation control signal based on instruction operation code and a timing signal, and implement control over instruction fetching and instruction execution.

A memory may be further disposed in the processor 410, and is configured to store an instruction and data. In some embodiments, the memory in the processor 410 is a cache memory. The memory may store an instruction or data that has just been used or is cyclically used by the processor 410. If the processor 410 needs to use the instruction or data again, the processor 410 may invoke the instruction or data directly from the memory. Therefore, repeated access is avoided, a waiting time of the processor 410 is reduced, and system efficiency is improved.

In some embodiments, the processor 410 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, and the like.

It may be understood that an interface connection relationship between modules illustrated in this embodiment is merely an example for description, and does not constitute a limitation on the structure of the electronic device. In other embodiments, the electronic device may alternatively use different interface connection manners in the foregoing embodiments, or a combination of a plurality of interface connection manners.

The charging management module 440 is configured to receive a charging input from a charger. The charger may be a wireless charger, or may be a wired charger. The power management module 441 is configured to connect the battery 442, the charging management module 440, and the processor 410. The power management module 441 receives an input from the battery 442 and/or the charging management module 440, and supplies power to the processor 410, the internal memory 421, the external memory, the display screen 494, the camera 493, the wireless communications module 460, and the like.

A wireless communications function of the electronic device may be implemented by using the antenna 1, the antenna 2, the mobile communications module 450, the wireless communications module 460, the modem processor, the baseband processor, and the like.

The antenna 1 and the antenna 2 are configured to transmit and receive electromagnetic wave signals. Each antenna in the electronic device may be used to cover a single or a plurality of communication frequency bands. Different antennas may also be reused to improve antenna utilization. For example, the antenna 1 may be reused as a diversity antenna in a wireless local area network. In other embodiments, the antenna may be used together with a tuning switch.

The mobile communications module 450 may provide a wireless communications solution applied to the electronic device and including 2G/3G/4G/5G. The mobile communications module 450 may include at least one filter, a switch, a power amplifier, a low noise amplifier (LNA), and the like.

The wireless communications module 460 may provide a wireless communications solution applied to the electronic device and including a wireless local area network (WLAN) (for example, a Wireless Fidelity (Wi-Fi) network), Bluetooth (BT), a global navigation satellite system (GNSS), frequency modulation (FM), a near field communication (NFC) technology, an infrared (IR) technology, and the like.

In some embodiments, the wireless communications module 460 may include an NFC chip, and the NFC chip may include an NFC controller (NFCC). The NFC chip can perform processing such as signal amplification, analog-to-digital conversion, digital-to-analog conversion, and storage. The NFCC is responsible for performing physical transmission of data by using an antenna. The NFCC may be included in the NFC chip of the electronic device. A device host (DH) is responsible for NFCC management, for example, initialization, configuration, and power management. The DH may be included in a main chip of the electronic device, or may be integrated with the processor of the electronic device.

In some embodiments, the antenna 1 of the electronic device is coupled to the mobile communications module 450, and the antenna 2 is coupled to the wireless communications module 460, so that the electronic device can communicate with a network and another device by using a wireless communications technology. The wireless communications technology may include a global system for mobile communications GSM), general packet radio service (GPRS), code division multiple access (CDMA), wideband code division multiple access (WCDMA), time division code division multiple access (TD-SCDMA), long term evolution (LTE), BT, GNSS, WLAN, NFC, FM, and/or IR technology.

The electronic device implements a display function by using the GPU, the display screen 494, the application processor, and the like. The GPU is a microprocessor for image processing, and is connected to the display screen 494 and the application processor. The GPU is configured to perform mathematical calculation and geometric calculation and used for graphics rendering. The processor 410 may include one or more GPUs that execute a program instruction to generate or change display information.

The display screen 494 is configured to display an image, a video, and the like. The display screen 494 is the foregoing outward foldable screen. Alternatively, the display screen 494 may include the foregoing inward foldable screen that can be folded into the first screen (the screen A shown in FIG. 1A(c)) and the second screen (the screen B shown in FIG. 1A(c)). Alternatively, the display screen 494 may further include the third screen (the screen C shown in FIG. 1A(a)). The display screen 494 includes a display panel. The display panel may be a liquid crystal display (LCD), an organic light-emitting diode (OLED), an active-matrix organic light emitting diode or an active matrix organic light emitting diode (AMOLED), a flex light-emitting diode (FLED), a Miniled, a MicroLed, a Micro-oLed, a quantum dot light emitting diode (QLED), or the like.

The electronic device may implement a photographing function by using the ISP, the camera 493, the video codec, the GPU, the display screen 494, the application processor, and the like. The ISP is configured to process data fed back by the camera 493. For example, when photographing is performed, a shutter is turned on, light is transmitted to a camera photosensitive element through a lens, an optical signal is converted into an electrical signal, and the camera photosensitive element transmits the electrical signal to the ISP for processing, so that the electrical signal is converted into an image visible to naked eyes. The ISP can further perform algorithm optimization on noise, brightness, and complexion of the image. The ISP can further optimize parameters such as exposure and color temperature of a photographing scene. In some embodiments, the ISP may be disposed in the camera 493.

The camera 493 is configured to capture a still image or a video. The lens generates an optical image of an object, and projects the optical image to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device may include one or N cameras 493, where N is a positive integer greater than 1.

The digital signal processor is configured to process a digital signal, and may process other digital signals in addition to a digital image signal. For example, when the electronic device selects a frequency, the digital signal processor is configured to perform Fourier transform on frequency energy.

The video codec is configured to compress or decompress a digital video. The electronic device may support one or more video codecs. Therefore, the electronic device can play or record videos in a plurality of encoding formats, for example, moving picture experts group (MPEG) 1, MPEG 2, MPEG 3, and MPEG 4.

The NPU is a neural-network (NN) computing processor. With reference to a structure of a biological neural network (for example, with reference to a transfer mode between neurons of a human brain), the NPU quickly processes input information, and can further continuously perform self-learning. The NPU can implement applications such as intelligent cognition on the electronic device, for example, image recognition, human face recognition, speech recognition, and text understanding.

The external memory interface 420 may be configured to connect an external storage card, for example, a micro SD card, to expand a storage capability of the electronic device. The external storage card communicates with the processor 410 by using the external memory interface 420, to implement a data storage function. For example, music and video files are stored in the external storage card.

The internal memory 421 may be configured to store computer-executable program code, where the computer-executable program code includes instructions. The processor 410 executes various function applications and data processing of the electronic device by running the instructions stored in the internal memory 421. For example, in this embodiment of this application, the processor 410 may execute an instruction stored in the internal memory 421, and display different content on the display screen 494 (that is, the foldable screen) in response to a user's operation of unfolding the display screen 494 (that is, the foldable screen). The internal memory 421 may include a program storage area and a data storage area. The program storage area may store an operating system, an application program (for example, a sound playing function or an image playing function) required by at least one function, and the like. The data storage area may store data (for example, audio data or a phone book) created in a process of using the electronic device. In addition, the internal memory 421 may include a high-speed random access memory, and may further include a non-volatile memory, for example, at least one magnetic disk storage device, a flash memory, or a universal flash storage (UFS).

The electronic device may implement an audio function such as music playing or recording by using the audio module 470, the speaker 470A, the phone receiver 470B, the microphone 470C, the headset jack 470D, the application processor, and the like.

The gyro sensor 480B may be configured to determine a motion posture of the electronic device. In some embodiments, the gyro sensor 480B may determine angular velocities of the electronic device around three axes (that is, an x-axis, a y-axis, and a z-axis). In this embodiment of this application, the display screen 494 of the electronic device may be folded into a plurality of screens. Each screen may include a gyro sensor 480B. For example, with reference to FIG. 1A(a) to FIG. 1A(d), the display screen 494 of the electronic device may be folded into a screen A and a screen B. In this case, both the screen A and the screen B include a gyro sensor 480B. The gyro sensor 480B is configured to measure included angles between an x-axis, a y-axis, and a z-axis of a corresponding screen and a horizontal plane. Furthermore, the gyro sensor 480B is further configured to measure an orientation (that is, a direction vector of the orientation) of the corresponding screen. The electronic device may determine an included angle between adjacent screens based on an angular change of an orientation of each screen that is obtained through measurement.

For example, it is assumed that the display screen 494 (that is, the foldable screen) of the electronic device (such as a mobile phone) may be folded into a screen A and a screen B. As shown in FIG. 4B(b), the screen A is located in an upper part of the mobile phone, and the screen B is located in a lower part of the mobile phone. It is assumed that a gyro sensor a is disposed in the screen A, and that a gyro sensor b is disposed in the screen B.

FIG. 4B(a) is a schematic diagram of an x-axis, a y-axis, and a z-axis of the gyro sensor a with OA as a coordinate origin, and a schematic diagram of an x-axis, a y-axis, and a z-axis of the gyro sensor b with OB as a coordinate origin when the foldable screen is in an unfolded state. FIG. 4B(b) is a schematic diagram of an x-axis, a y-axis, and a z-axis of the gyro sensor a with OA as a coordinate origin, and a schematic diagram of an x-axis, a y-axis, and a z-axis of the gyro sensor b with OB as a coordinate origin when the foldable screen is in a semi-folded state. FIG. 4B(c) is a schematic diagram of an x-axis, a y-axis, and a z-axis of the gyro sensor a with OA as a coordinate origin, and a schematic diagram of an x-axis, a y-axis, and a z-axis of the gyro sensor b with OB as a coordinate origin when the foldable screen is in a completely folded state. As shown in FIG. 4B(a), 05 and 06 are both short sides of the mobile phone, and 01 and 02 form a long side of the mobile phone.

It should be noted that, as shown in FIG. 4B(a), FIG. 4B(b), or FIG. 4B(c), the x-axis, the y-axis, and the z-axis with OA as the coordinate origin constitute a right-hand rectangular coordinate system, and the x-axis, the y-axis, and the z-axis with OB as the coordinate origin constitute a right-hand rectangular coordinate system. OA may be any point in the upper part of the mobile phone. For example, in FIG. 4B(a), FIG. 4B(b), or FIG. 4B(c), it is assumed that OA is an upper right corner of the mobile phone. OB may be any point in the lower part of the mobile phone. For example, in FIG. 4B(a), FIG. 4B(b), or FIG. 4B(c), it is assumed that OB is a lower right corner of the mobile phone.

As can be learned from FIG. 4B(a), FIG. 4B(b), or FIG. 4B(c), (1) regardless of the state in which the foldable screen is (for example, the unfolded state, the semi-folded state, or the folded state), the x-axis of the gyro sensor a and the x-axis of the gyro sensor b both point to a same direction; (2) when the foldable screen is in the unfolded state, the y-axis of the gyro sensor a and the y-axis of the gyro sensor b point to opposite directions, and the z-axis of the gyro sensor a and the z-axis of the gyro sensor b point to opposite directions; (3) when the foldable screen is in the semi-folded state, a value range of an included angle between the y-axis of the gyro sensor a and the y-axis of the gyro sensor b is (0°, 180°), and a value range of an included angle between the z-axis of the gyro sensor a and the z-axis of the gyro sensor b is (0°, 180°); and (4) when the foldable screen is in the folded state, the x-axis of the gyro sensor a and the x-axis of the gyro sensor b point to a same direction, the y-axis of the gyro sensor a and the y-axis of the gyro sensor b point to a same direction, and the z-axis of the gyro sensor a and the z-axis of the gyro sensor b point to a same direction.

In this embodiment of this application, the x-axis, the y-axis, and the z-axis of the screen A and the x-axis, the y-axis, and the z-axis of the screen B of the foldable screen include but are not limited to those shown in FIG. 4B(a) to FIG. 4B(c). For example, in some embodiments, when the foldable screen is in the unfolded state, the x-axis of the gyro sensor a and the x-axis of the gyro sensor b point to the same direction, the y-axis of the gyro sensor a and the y-axis of the gyro sensor b point to opposite directions, and the z-axis of the gyro sensor a and the z-axis of the gyro sensor b point to the same direction; however, when the foldable screen is in the unfolded state, the x-axis of the gyro sensor a and the x-axis of the gyro sensor b point to the same direction, the y-axis of the gyro sensor a and the y-axis of the gyro sensor b point to the same direction, and the z-axis of the gyro sensor a and the z-axis of the gyro sensor b point to opposite directions.

In this embodiment of this application, the gyro sensor in each screen may be further configured to measure an orientation (that is, a direction vector of the orientation) of the corresponding screen. The electronic device may determine the included angle between adjacent screens based on the angular change of the orientation of each screen that is obtained through measurement.

The acceleration sensor 480E may detect a magnitude of acceleration of the electronic device in each direction (generally triaxial). A magnitude and direction of gravity can be detected when the electronic device is stationary. The acceleration sensor 480E may be further configured to recognize a posture of the electronic device, and applied to applications such as landscape and portrait switching, and a pedometer. In this embodiment of this application, the display screen 494 of the electronic device may be folded into a plurality of screens. Each screen may include an acceleration sensor 480E configured to measure a magnitude of acceleration of the corresponding screen.

The magnetic sensor 480D includes a Hall sensor. The electronic device may detect opening and closing of the foldable screen by using the magnetic sensor 480D. In some embodiments, when the electronic device is a foldable-screen mobile phone, the electronic device may detect opening and closing of the foldable screen based on the magnetic sensor 480D, and further set features such as automatic face recognition and unlocking of the mobile phone based on the detected unfolded state or folded state of the foldable screen. A rotating shaft sensor 480N is configured to detect opening and closing of the foldable screen and the included angle between the adjacent screens in the foldable screen.

The magnetic sensor 480D and the rotating shaft sensor 480N may be disposed at a portion connecting the adjacent screens in the foldable screen. For example, the magnetic sensor 480D and the rotating shaft sensor 480N may be disposed on a folding axis of the foldable screen. For another example, the magnetic sensor 480D and the rotating shaft sensor 480N may be disposed at a flexible material portion for implementing a folding function on the foldable screen.

The fingerprint sensor 480H is configured to capture a fingerprint. The electronic device may implement fingerprint unlocking, access application locking, fingerprint photographing, fingerprint answering of a call, and the like by using a feature of the captured fingerprint. For example, the fingerprint sensor 480H may be disposed under the display screen of the foldable screen, to implement in-screen fingerprint recognition. For another example, the fingerprint sensor 480H may be disposed on a side frame of the foldable screen. In this way, the user can conveniently perform fingerprint unlocking when holding the foldable-screen mobile phone.

The touch sensor 480K is also referred to as a "touch panel". The touch sensor 480K may be disposed on the display screen 494. The touch sensor 480K and the display screen 494 form a touchscreen, which is also referred to as a "touchscreen". The touch sensor 480K is configured to detect a touch operation that acts on or near the touch sensor 480K. The touch sensor may transfer the detected touch operation to the application processor to determine a touch event type. A visual output related to the touch operation may be provided by using the display screen 494. In other embodiments, the touch sensor 480K may alternatively be disposed on a surface of the electronic device, or disposed in a position different from the display screen 494.

The key 490 includes a power-on key, a volume key, and the like. The key 490 may be a mechanical key, or may be a touch key. The electronic device may receive an input from the key, and generate a key signal input related to a user setting and function control of the electronic device. The motor 491 may generate a vibration prompt. The motor 491 may be used for an incoming call vibration prompt, or may be used for touch vibration feedback. The indicator 492 may be an indicator, and may be used to indicate a charging status or a power change, or may be used to indicate a message, a missed call, a notification, or the like. The SIM card interface 495 is configured to connect a SIM card. The SIM card may be inserted into the SIM card interface 495 or pulled out of the SIM card interface 495, so that the SIM card is in contact with or separated from the electronic device. The electronic device may support one SIM card interface or N SIM card interfaces, where N is a positive integer greater than 1.

All methods in the following embodiments may be implemented in the electronic device having the foregoing hardware structure.

A software system of the electronic device may use a layered architecture, an event-driven architecture, a microkernel architecture, a microservice architecture, or a cloud architecture. In this embodiment of this application, an Android system with a layered architecture is used as an example to describe a software structure of an electronic device.

Figure 5:
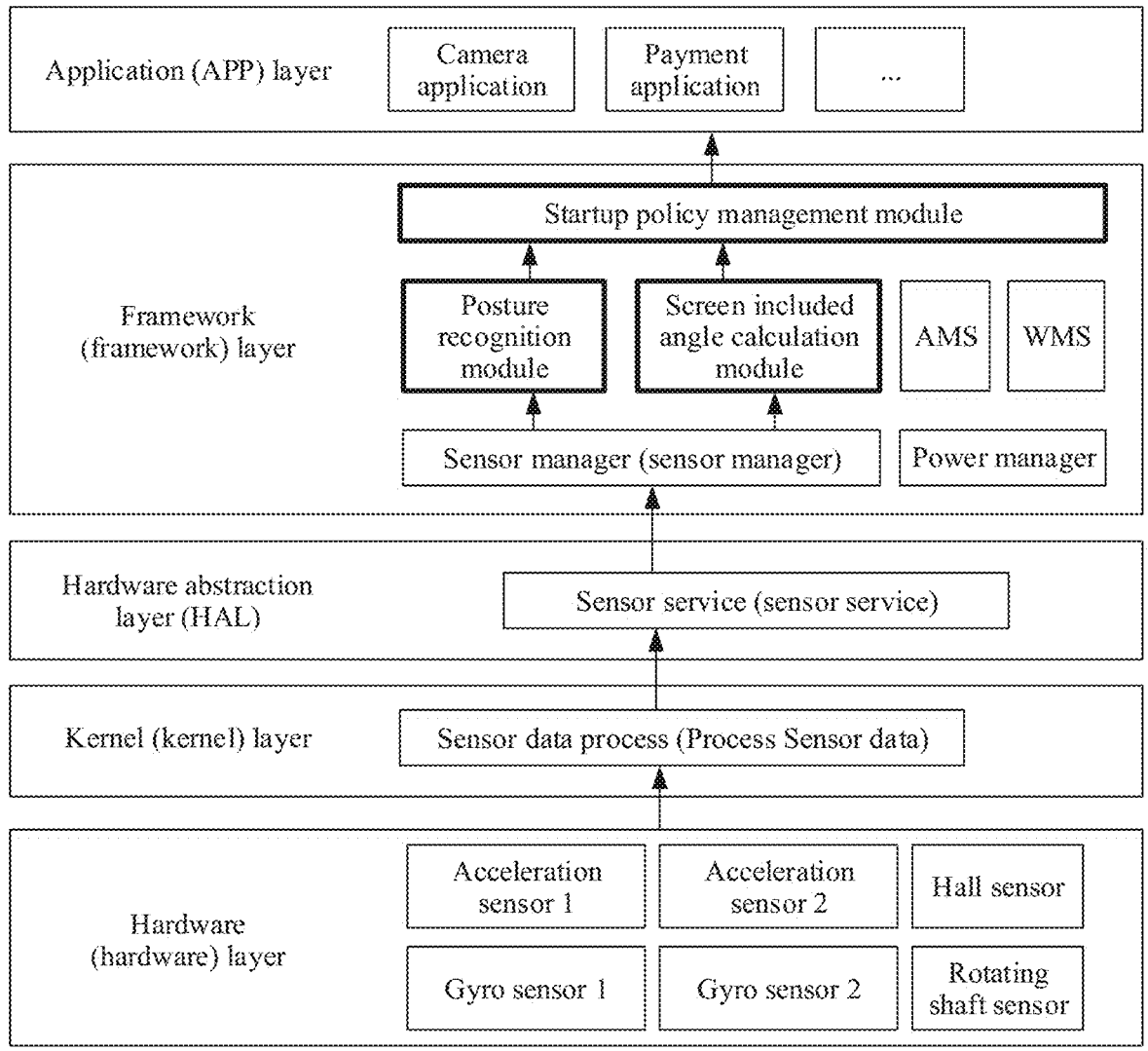
FIG. 5 is a schematic diagram of a software architecture of an electronic device according to an embodiment of this application.

FIG. 5 is a block diagram of a software structure of an electronic device according to an embodiment of this application. In a layered architecture, software may be divided into several layers, each of which is assigned a clear role and task. Communication between the layers is performed by using a software interface. In some embodiments, an Android system is divided into five layers, which are respectively an application program layer (application layer for short), an application program framework layer (framework layer for short), a hardware abstraction layer (hardware abstraction layer, HAL), a kernel (kernel) layer (also referred to as a driver layer), and a hardware (hardware) layer from top to bottom.

The application layer may include a series of application program packages. As shown in FIG. 5, the application layer may include a plurality of application program packages such as a camera application and a payment application. For example, the application program packages may be application programs such as a camera application, a gallery application, a calendar application, a phone application, a map application, a navigation application, a WLAN application, a music application, a video application, an SMS application, and a desktop launcher.

The hardware layer includes a plurality of sensors, such as an acceleration sensor 1, an acceleration sensor 2, a gyro sensor 1, a gyro sensor 2, a Hall sensor, and a rotating shaft sensor. The acceleration sensor 1 and the gyro sensor 1 may be disposed in one screen (for example, a screen A) of a foldable screen. The acceleration sensor 2 and the gyro sensor 2 may be disposed in another screen (for example, a screen B) of the foldable screen. For detailed descriptions of the plurality of sensors at the hardware layer, refer to the descriptions of the sensors in the electronic device shown in FIG. 4A in the foregoing embodiment. Details are not described herein in this embodiment of this application.

The kernel layer is a layer between hardware and software. The kernel layer includes at least a display driver, a camera driver, an audio driver, a sensor driver, and the like. As shown in FIG. 5, the kernel layer (for example, the sensor driver at the kernel layer) may create a sensor data process (process sensor data). The process sensor data transmits data captured by sensors at the hardware layer to the hardware abstraction layer. The hardware abstraction layer may provide a sensor service (sensor service). The sensor service can upload the data captured by the sensors to the framework layer.

The framework layer provides an application programming interface (application programming interface, API) and a programming framework for application programs at the application program layer. The application program framework layer includes some predefined functions. As shown in FIG. 5, the framework layer may include a window manager (window manager service, WMS), an activity manager (activity manager service, AMS), a sensor manager (sensor manager), a power manager, a posture recognition module, a screen included angle calculation module, a startup policy management module, and the like. In one embodiment, the framework layer may further include a content provider, a view system, a phone manager, a resource manager, a notification manager, and the like (not shown in the figure).

The window manager WMS is configured to manage a window program. The window manager can obtain a size of a display screen, determine whether there is a status bar, lock the screen, take a screenshot, and the like. The activity manager AMS is responsible for managing activities, starting, switching, and scheduling components in the system, managing and scheduling application programs, and the like. The sensor manager is configured to receive and manage data captured by sensors and transmitted at a bottom layer (for example). The power manager is configured to implement power management and charging management of the electronic device.

In this embodiment of this application, the posture recognition module, the screen included angle calculation module, and the startup policy management module are added to the framework layer. The posture recognition module is configured to determine a motion posture of the electronic device based on data captured by a sensor from the sensor manager. The screen included angle calculation module is configured to determine an included angle between two adjacent screens in the foldable screen based on the data captured by the sensor from the sensor manager. The startup policy management module is configured to determine, based on the motion posture determined by the posture recognition module and the included angle obtained through calculation by the screen included angle calculation module, to start a corresponding application in the application layer, so that the electronic device performs a corresponding interaction event. For example, the camera application is started to capture an image by using a camera, or the payment application is started to display a payment interface.

Assuming that the electronic device is a mobile phone with an inward foldable screen, and that the inward foldable screen is the vertically folded foldable screen shown in FIG. 1A(a) to FIG. 1A(d), the following describes in detail the technical solution provided in this embodiment of this application. The foldable screen may be folded into a first screen (for example, a screen A) and a second screen (for example, a screen B).

Figure 1B:
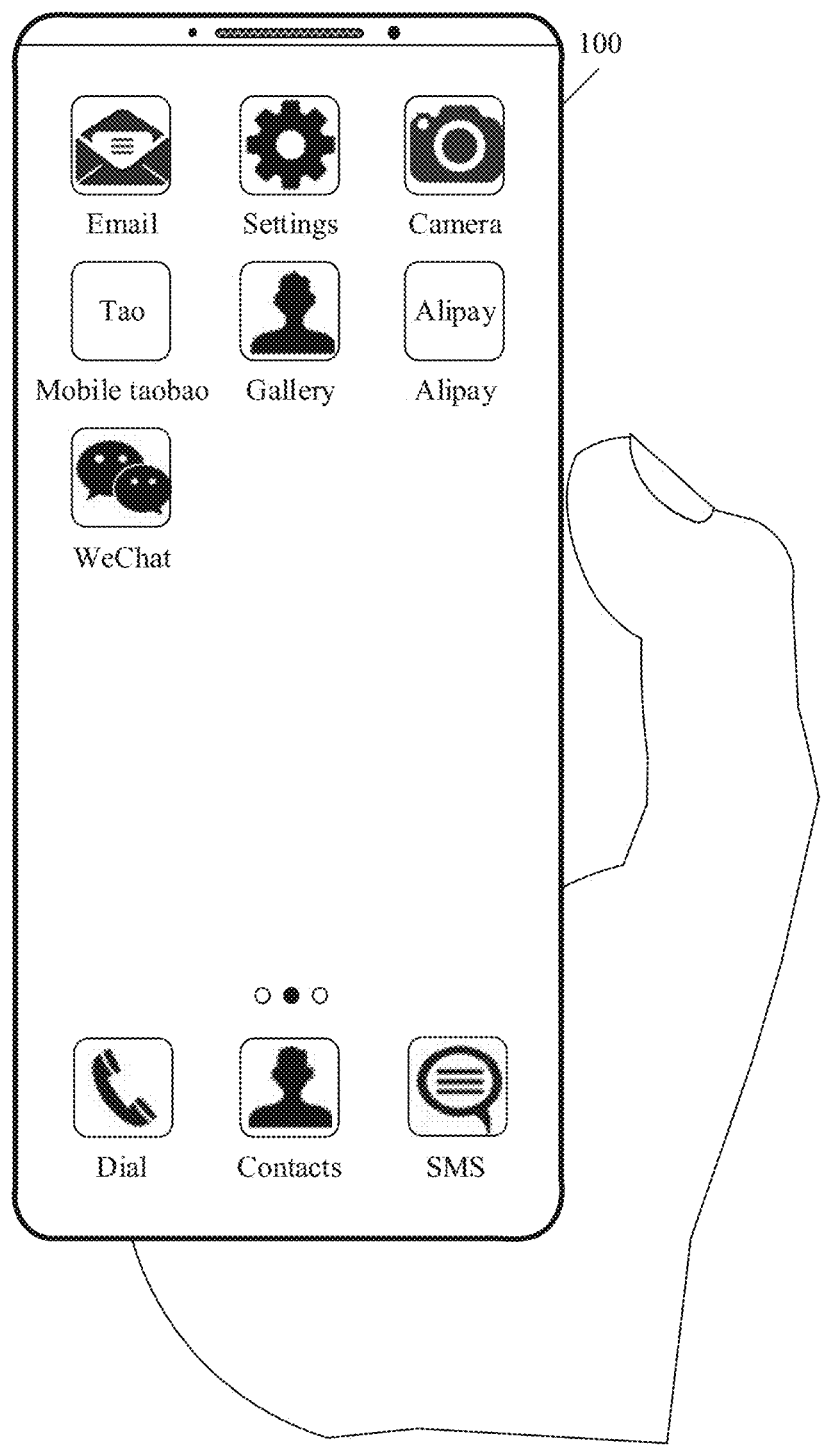
FIG. 1B is a schematic diagram of a display interface of a mobile phone according to an embodiment of this application.

Generally, when using the vertically folded foldable-screen mobile phone 100 shown in FIG. 1A(a) to FIG. 1A(d) or FIG. 2(a) to FIG. 2(c), the user is accustomed to vertically holding the mobile phone 100 in the folded state, and then vertically unfolding the foldable screen. For example, as shown in FIG. 1A(a), the foldable screen of the mobile phone 100 is in the folded state, and is vertically held by the user. The foldable screen of the mobile phone 100 may be vertically unfolded by the user according to an unfolding process of the foldable screen shown in FIG. 1A(b) to FIG. 1A(c) to FIG. 1A(d). After the mobile phone 100 is vertically unfolded, a second interface may be displayed on the foldable screen. The second interface may be a lock screen interface of the mobile phone 100, a main interface of the mobile phone 100 shown in FIG. 1B, an interface displayed when the foldable screen is unfolded last time, an interface of any application, or the like.

Figure 6A:
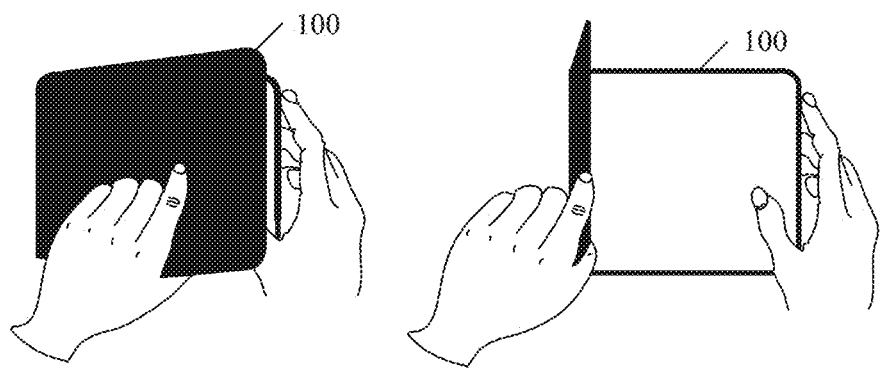
FIG. 6($a$) to FIG. 6($d$) are schematic diagrams of a status change and a display interface of a mobile phone according to an embodiment of this application.
Figure 6C:
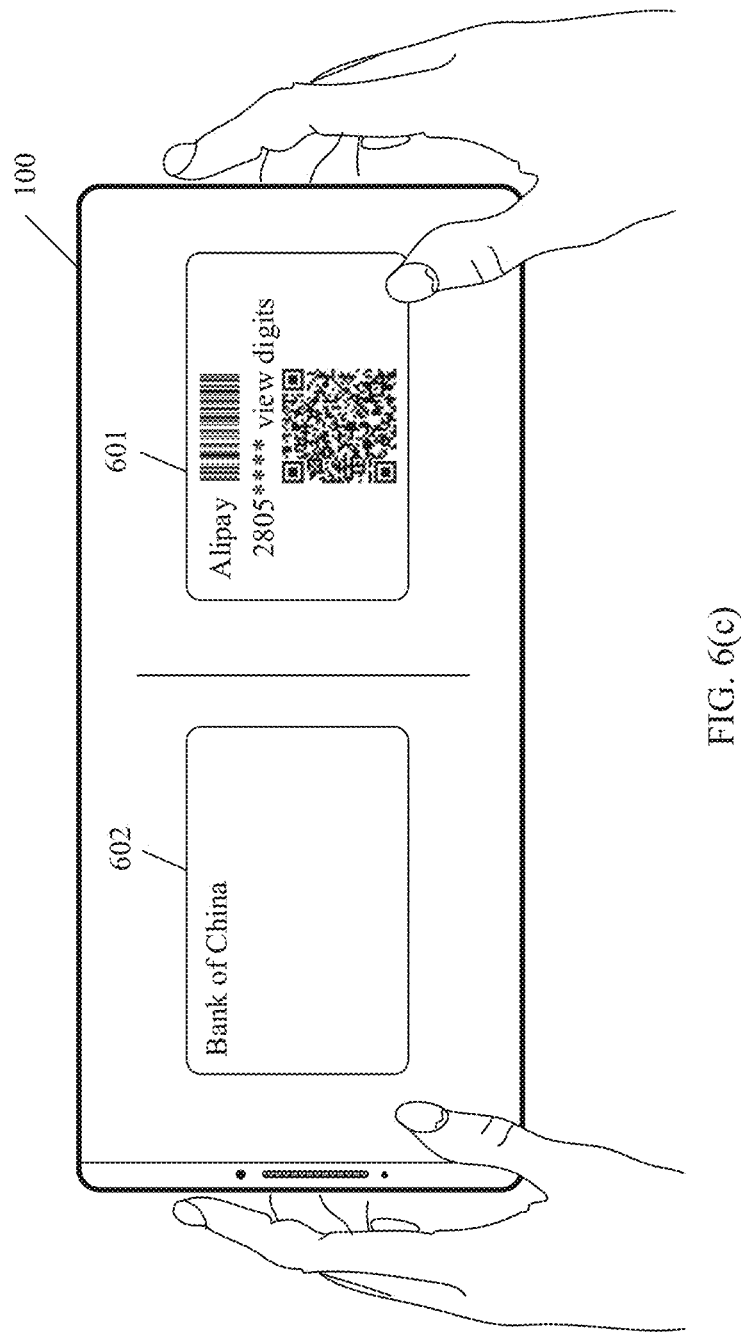

In other words, when the user uses the vertically folded foldable-screen mobile phone 100 shown in FIG. 1A(a) to FIG. 1A(d) or FIG. 2(a) to FIG. 2(c), "the mobile phone 100 in the folded state is vertically held and vertically unfolded" is a normal state in which the user uses the vertically folded foldable-screen mobile phone. As shown in FIG. 6(a), the foldable screen of the mobile phone 100 is in the folded state, and is horizontally held by the user. The foldable screen of the mobile phone 100 is horizontally unfolded by the user according to an unfolding process of the foldable screen shown in FIG. 6(a) to FIG. 6(b) to FIG. 6(c), that is, "the mobile phone 100 is horizontally held and is horizontally unfolded", which may be referred to as a special state in which the user uses the vertically folded foldable-screen mobile phone.

In this embodiment of this application, when detecting that the mobile phone 100 in the folded state is horizontally held and then horizontally unfolded, the mobile phone 100 may automatically display a first interface on the foldable screen in the unfolded state. The first interface is an interface corresponding to a preset function in the mobile phone 100.

In some embodiments, the preset function may be a payment function, and the first interface may include at least one payment mode. The mobile phone 100 may display the payment mode in a transaction card manner. In other words, the first interface may include at least one transaction card, such as an electronic payment card 601 of Alipay and a transaction card 602 of Bank of China shown in FIG. 6(c). In other embodiments, the preset function may be a photographing function, and the first interface may be a viewfinder interface of the camera.

In other words, when the mobile phone 100 is in the folded state, the mobile phone 100 may be horizontally held and then horizontally unfolded, the preset function is automatically started, and the interface (that is, the first interface) corresponding to the preset function is displayed. In this way, the user's operation of starting the preset function on the foldable screen of the foldable-screen mobile phone in the unfolded state can be simplified, and user experience can be improved.

For example, a method in this embodiment of this application may include the following three phases: phase I: a phase of detecting the folded state and horizontal holding; phase II: a phase of detecting that the mobile phone 100 is horizontally unfolded; and phase III: a phase in which the mobile phone 100 displays the first interface.

First, in this embodiment of this application, the phase I (that is, the phase of detecting the folded state and horizontal holding) is described in detail.

It may be understood that the foldable screen of the mobile phone 100 may be folded into the first screen and the second screen. A gyro sensor is disposed in both the first screen and the second screen. The gyro sensor in each screen may be configured to measure included angles between an x-axis, a y-axis, and a z-axis of the corresponding screen and a horizontal plane. In addition, among the x-axis, y-axis, and z-axis of each screen (that is, a gyro disposed in the screen), one axis is parallel to a short side of the mobile phone 100, and another axis is parallel to a long side of the mobile phone 100, and a third axis is perpendicular to the long side of the mobile phone 100 and perpendicular to the short side of the mobile phone 100. The x-axis, y-axis, and z-axis of each screen (that is, the gyro disposed in the screen) constitute a right-hand rectangular coordinate system.

For example, as shown in FIG. 4B(b), the x-axis of the screen A is parallel to the short side of the mobile phone, the y-axis is parallel to the long side 01 of the mobile phone, and the z-axis is perpendicular to the short side of the mobile phone and perpendicular to the long side 01 of the mobile phone. As shown in FIG. 4B(b), the x-axis of the screen B is parallel to the short side of the mobile phone, the y-axis is parallel to the long side 02 of the mobile phone, and the z-axis is perpendicular to the short side of the mobile phone and perpendicular to the long side 02 of the mobile phone.

It can be learned from the foregoing description that among the x-axis, the y-axis, and the z-axis of the coordinate system of the gyro sensor in each screen of the foldable screen, an axis (for example, the y-axis) is parallel to the long side of the mobile phone 100. For example, as shown in FIG. 4B(b), the y-axis of the screen A is parallel to the long side 01 of the mobile phone, and the y-axis of the screen B is parallel to the long side 02 of the mobile phone.

Therefore, the mobile phone 100 may determine, based on included angles that are between the foregoing axis (such as the y-axis) and the horizontal plane and captured by the gyro sensors of the screen A and the screen B, that the mobile phone 100 is in the folded state or the unfolded state. Specifically, the mobile phone 100 may determine the included angle between the screen A and the screen B based on the included angle that is between the y-axis and the horizontal plane and captured by the gyro sensor of the screen A and the included angle that is between the y-axis and the horizontal plane and captured by the gyro sensor of the screen B. The included angle between the screen A and the screen B is an included angle between the y-axis of the screen A and the y-axis of the screen B shown in FIG. 4B(b). If the included angle between the y-axis of the screen A and the y-axis of the screen B is less than or equal to a first preset angle threshold P1, the mobile phone 100 may determine that the mobile phone 100 is in the folded state; or if the included angle between the y-axis of the screen A and the y-axis of the screen B is greater than a second preset angle threshold P2, the mobile phone 100 may determine that the mobile phone 100 is in the unfolded state.

In one embodiment, the mobile phone 100 may further identify, by using one or more components such as a magnetometer, a Hall device, an infrared device, and a rotating shaft sensor, that the mobile phone 100 is in the folded state or the unfolded state. For a specific method in which the mobile phone 100 identifies, by using the one or more components, that the mobile phone 100 is in the folded state or the unfolded state, refer to related descriptions in the conventional technology. Details are not described herein in this embodiment of this application.

It should be noted that, in this embodiment of this application, the mobile phone 100 being in a landscape state is referred to as the mobile phone 100 being horizontally held; and the mobile phone 100 being in a portrait state is referred to as the mobile phone 100 being vertically held.

When the user uses the mobile phone 100, the mobile phone 100 may be in the landscape state, or may be in the portrait state. In this embodiment of this application, the landscape state and the portrait state are described in detail herein.

Figure 7A:
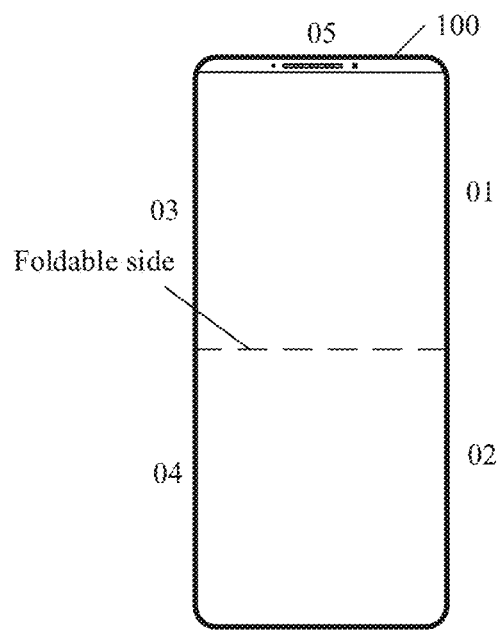
FIG. 7($a$) to FIG. 7($e$) are schematic diagrams of a landscape state and a portrait state according to an embodiment of this application.

As shown in FIG. 7(a), the mobile phone 100 is in the unfolded state, and the foldable screen of the mobile phone 100 may include four sides. The four sides include two short sides that are parallel to each other and equal to each other, which may be referred to as short sides of the foldable screen, such as a short side 05 and a short side 06 shown in FIG. 7(a). The four sides further include two long sides that are parallel to each other and equal to each other, which may be referred to as long sides of the foldable screen, such as a long side formed by 01 and 02 and a long side formed by 03 and 04 shown in FIG. 7(a). Both 01 and 02 are a part of one long side of the mobile phone 100, and both 03 and 04 are a part of another long side of the mobile phone 100. The mobile phone 100 may be folded along a foldable side, and is switched from the unfolded state shown in FIG. 7(a) to the folded state shown in any one of FIG. 7(b) to FIG. 7(e).

In one embodiment, the mobile phone 100 may determine, based on included angles between a long side of the screen A of the foldable screen (01 shown in FIG. 7(a)) and a long side of the screen B (02 shown in FIG. 7(a)) and the horizontal plane, that the mobile phone 100 in the folded state is in the landscape state or the portrait state.

Figure 7B:
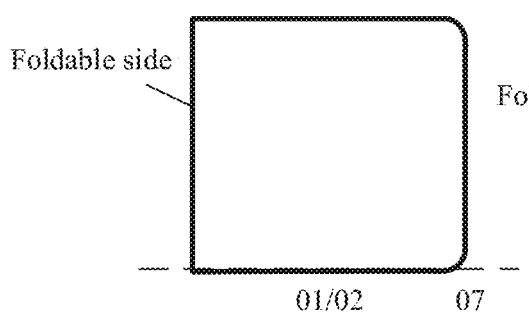
Figure 7C:
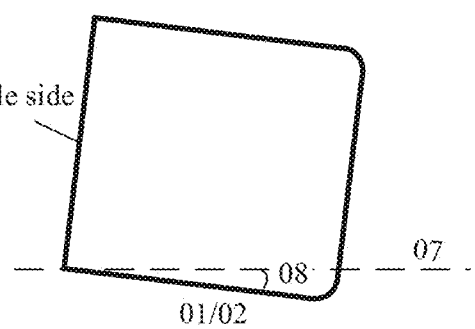

When the mobile phone 100 is in the folded state, in the landscape state, the long side of the foldable screen is parallel to the horizontal plane (for example, as shown in FIG. 7(b), an included angle between the long side 01 or 02 of the foldable screen and the horizontal plane is 0); or an included angle 08 between the long side 01 or 02 of the foldable screen and the horizontal plane 07 is less than or equal to a preset value 1 (for example, as shown in FIG. 7(c)). The preset value 1 is less than or equal to 45°, and a specific value of the preset value 1 may be set based on an actual application scenario. For example, the preset value 1 may be 20°.

Figure 7D:
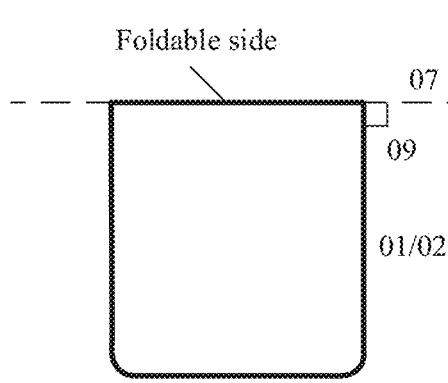
Figure 7E:
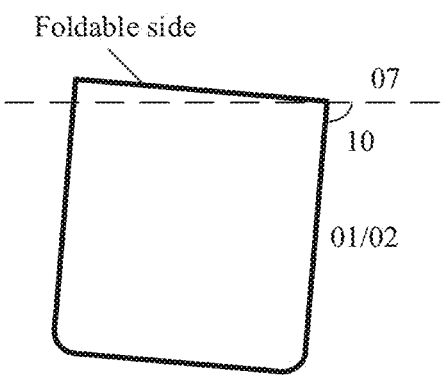

When the mobile phone 100 is in the folded state, in the portrait state, the long side of the foldable screen is perpendicular to the horizontal plane (for example, as shown in FIG. 7(d), an included angle 09 between the long side 01 or 02 of the foldable screen and the horizontal plane is 90°); or an included angle 10 between the long side 01 or 02 of the foldable screen and the horizontal plane 07 is greater than a preset value 1 (for example, as shown in FIG. 7(e), the preset value 1 is greater than or equal to 45°).

It can be learned from the foregoing description that among the x-axis, the y-axis, and the z-axis of the coordinate system of the gyro sensor in each screen of the foldable screen, an axis (for example, the y-axis) is parallel to the long side of the mobile phone 100. Therefore, the mobile phone 100 may determine, based on the included angle that is between the foregoing axis (such as the y-axis) and the horizontal plane and captured by the gyro sensor of each screen, that the mobile phone 100 is in the landscape state or the portrait state. When the included angle between the y-axis of the screen A and the horizontal plane is less than or equal to the preset value 1, and the included angle between the y-axis of the screen B and the horizontal plane is less than or equal to the preset value 1, the mobile phone 100 may determine that the mobile phone 100 is in the landscape state. When the included angle between the y-axis of the screen A and the horizontal plane is greater than the preset value 1, and/or the included angle between the y-axis of the screen B and the horizontal plane is greater than the preset value 1, the mobile phone 100 may determine that the mobile phone 100 is in the portrait state.

In summary, in this embodiment of this application, if the included angle between the y-axis of the screen A and the y-axis of the screen B is less than or equal to the first preset angle threshold P1, and the included angle between the y-axis of the screen A and the horizontal plane is less than or equal to the preset value 1, and/or the included angle between the y-axis of the screen B and the horizontal plane is less than or equal to the preset value 1, the mobile phone 100 may determine that the mobile phone 100 in the folded state is horizontally held.

In another implementation, the mobile phone 100 may determine, based on the included angles between the x-axis, the y-axis, and the z-axis of the screen A (such as the gyro of the screen A) or the screen B (such as the gyro of the screen B) and the horizontal plane, that the mobile phone 100 in the folded state is in the landscape state or the portrait state.

Figure 8A:
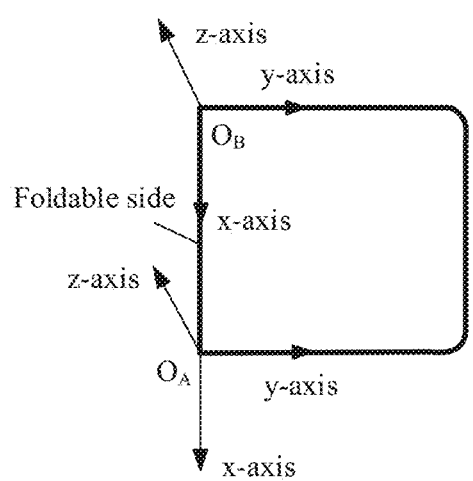
FIG. 8A(a) to FIG. 8A(d) are schematic diagrams of a status change in a horizontal unfolding process of a foldable-screen mobile phone according to an embodiment of this application.
Figure 8A:
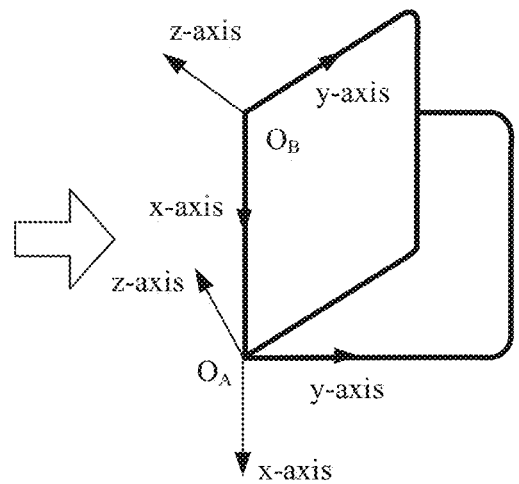
Figure 8A:
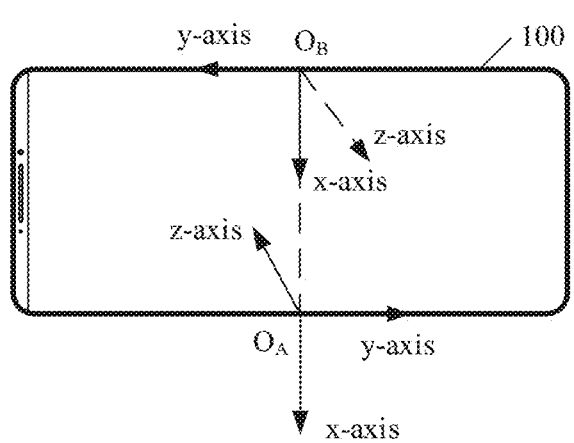
Figure 8A:
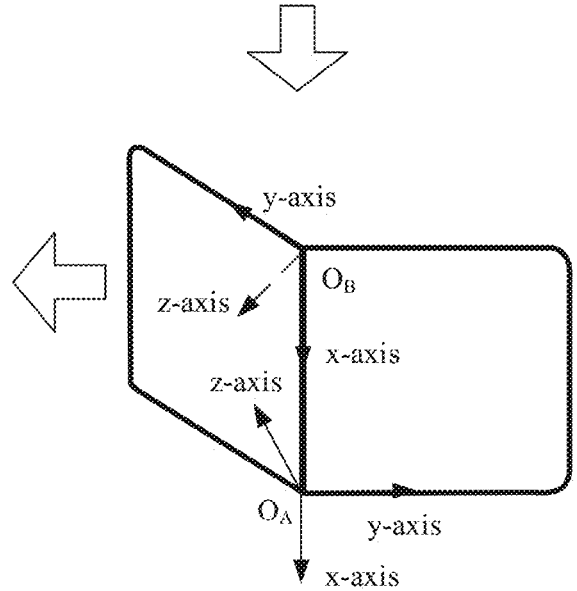

For example, with reference to the x-axis, y-axis, and z-axis of the screen A and the x-axis, y-axis, and z-axis of the screen B shown in FIG. 4B(b), FIG. 8A(a) is a schematic diagram of the x-axis, y-axis, and z-axis of the gyro sensor a of the screen A with OA as a coordinate origin, and a schematic diagram of the x-axis, y-axis, and z-axis of the gyro sensor b of the screen B with OB as a coordinate origin when the screen A and the screen B are in the folded state.

As shown in FIG. 8A(a), the mobile phone 100 is in the landscape state, that is, the mobile phone 100 is horizontally held. In this case, an included angle between the x-axis of the gyro sensor of the screen A and the horizontal plane is close to 90° (that is, perpendicular), an included angle between the y-axis of the gyro sensor of the screen A and the horizontal plane is close to 0° (that is, parallel), and an included angle between the z-axis of the gyro sensor of the screen A and the horizontal plane is close to 0° (that is, parallel). An included angle between the x-axis of the gyro sensor of the screen B and the horizontal plane is close to 90° (that is, perpendicular), an included angle between the y-axis of the gyro sensor of the screen B and the horizontal plane is close to 0° (that is, parallel), and an included angle between the z-axis of the gyro sensor of the screen B and the horizontal plane is close to 0° (that is, parallel).

In summary, if the included angle between the y-axis of the screen A and the y-axis of the screen B is less than or equal to the first preset angle threshold P1, and the included angle between the x-axis of the gyro sensor of the screen A or the screen B and the horizontal plane falls within a third included angle range (for example, [K1, 90°]), the included angle between the y-axis of the gyro sensor of the screen A or the screen B and the horizontal plane falls within a fourth included angle range (for example, [0°, K2]), and the included angle between the z-axis of the gyro sensor of the screen A or the screen B and the horizontal plane falls within the fourth included angle range. In this case, the mobile phone 100 may determine that the mobile phone 100 in the folded state is horizontally held.

For example, a value range of K1 may be [q1, 90°]. For example, q1 may be an angle value close to 90°, such as 85°, 80°, or 86°. A value range of K2 may be [0°, q2]. For example, q2 may be an angle value close to 0°, such as 10°, 8°, or 5°.

Next, in this embodiment of this application, the phase (that is, the phase II) of detecting that the mobile phone 100 is horizontally unfolded after the mobile phone 100 determines that the mobile phone 100 is in the folded state and is horizontally held is described in detail.

When the mobile phone 100 is in the folded state and is horizontally held, if the mobile phone 100 detects that a change of the first screen (for example, the screen A) and/or the second screen (for example, the screen B) in compliance with a preset condition occurs, the mobile phone 100 may determine that the mobile phone is horizontally unfolded.

In one embodiment, when the mobile phone 100 is in the folded state and is horizontally held, that a change of the screen A and the screen B of the mobile phone 100 in compliance with a preset condition occurs may specifically include: a change of the included angle between the x-axis of the screen A and the x-axis of the screen B, the included angle between the y-axis of the screen A and the y-axis of the screen B, and the included angle between the z-axis of the screen A and the z-axis of the screen B in compliance with the preset condition occurs. The mobile phone 100 may detect changes of the x-axis, the y-axis, and the z-axis of the corresponding screens by using the gyro sensor disposed in the screen A and the gyro sensor disposed in the screen B.

For example, with reference to the x-axis, y-axis, and z-axis of the screen A and the x-axis, y-axis, and z-axis of the screen B shown in FIG. 4B(b), FIG. 8A(a) is a schematic diagram of the x-axis, y-axis, and z-axis of the gyro sensor a of the screen A with OA as a coordinate origin, and a schematic diagram of the x-axis, y-axis, and z-axis of the gyro sensor b of the screen B with OB as a coordinate origin when the screen A and the screen B are in the folded state.

As shown in FIG. 8A(a), when the screen A and the screen B are in the folded state, the included angle between the x-axis of the screen A and the x-axis of the screen B is 0°, the included angle between the y-axis of the screen A and the y-axis of the screen B is 0°, and the included angle between the z-axis of the screen A and the z-axis of the screen B is 0°.

Assuming that the screen B rotates counterclockwise along the foldable side, the mobile phone 100 switches from the state shown in FIG. 8A(a) to the state shown in FIG. 8A(b). As shown in FIG. 8A(b), the included angle between the x-axis of the screen A and the x-axis of the screen B is 0°, a value range of the included angle between the y-axis of the screen A and the y-axis of the screen B is (0°, 90°), and a value range of the included angle between the z-axis of the screen A and the z-axis of the screen B is (0°, 90°).

Assuming that the screen B rotates counterclockwise along the foldable side, the mobile phone 100 switches from the state shown in FIG. 8A(b) to the state shown in FIG. 8A(c). As shown in FIG. 8A(c), the included angle between the x-axis of the screen A and the x-axis of the screen B is 0°, the value range of the included angle between the y-axis of the screen A and the y-axis of the screen B is (90°, 180°), and the value range of the included angle between the z-axis of the screen A and the z-axis of the screen B is (90°, 180°).

Assuming that the screen B rotates counterclockwise along the foldable side, the mobile phone 100 switches from the state shown in FIG. 8A(c) to the state shown in FIG. 8A(d). As shown in FIG. 8A(d), the included angle between the x-axis of the screen A and the x-axis of the screen B is 0°, the included angle between the y-axis of the screen A and the y-axis of the screen B is 180°, and the included angle between the z-axis of the screen A and the z-axis of the screen B is 180°.

With reference to the instance shown in FIG. 8A, when the mobile phone 100 is in the folded state and is horizontally held, that a change of the screen A and the screen B of the mobile phone 100 in compliance with a preset condition occurs may specifically include: the included angle between the x-axis of the screen A and the x-axis of the screen B is 0°, the included angle between the y-axis of the screen A and the y-axis of the screen B gradually increases from 0° to 180°, and the included angle between the z-axis of the screen A and the z-axis of the screen B gradually increases from 0° to 180°.

In summary, in this embodiment of this application, when the mobile phone 100 is in the folded state and is horizontally held, if the mobile phone 100 detects that the included angle between the x-axis of the screen A and the x-axis of the screen B is 0°, and that the included angle between the y-axis of the screen A and the y-axis of the screen B gradually increases from 0° to 180°, and that the included angle between the z-axis of the screen A and the z-axis of the screen B gradually increases from 0° to 180°, the mobile phone 100 may determine that the mobile phone 100 is horizontally unfolded.

In another implementation, when the mobile phone 100 is in the folded state and is horizontally held, that a change of the screen A or the screen B of the mobile phone 100 in compliance with a preset condition occurs may specifically include: the gyro sensor and/or the acceleration sensor disposed in the screen A detect/detects that a change of the screen A in compliance with the preset condition occurs, but the gyro sensor and/or the acceleration sensor disposed in the screen B detect/detects that no change of the screen B in compliance with the preset condition occurs; or the gyro sensor and/or the acceleration sensor disposed in the screen A detect/detects that no change of the screen A in compliance with the preset condition occurs, but the gyro sensor and/or the acceleration sensor disposed in the screen B detect/detects that a change of the screen B in compliance with the preset condition occurs.

For example, it is assumed that no change of the screen A in compliance with the preset condition occurs, and that a change of the screen B in compliance with the preset condition occurs. In the foregoing implementation, a change of the screen A or the screen B in compliance with the preset condition is described.

On one hand, when the acceleration sensor of the screen A detects no acceleration change of the screen A, but the acceleration sensor of the screen B detects an acceleration change of the screen B, the mobile phone 100 may determine that the screen A does not move, but the screen B rotates around the foldable side of the screen A and the screen B to unfold the foldable screen.

On the other hand, if the gyro sensor of the screen A detects that the change of the included angles between the x-axis, the y-axis, and the z-axis of the screen A and the horizontal plane is within a first angle range (for example, [0°, K3]), and the gyro sensor of the screen B detects that the change of the included angle between one of the x-axis, the y-axis, and the z-axis of the screen B and the horizontal plane is within the first angle range (for example, [0°, K3]), and that the included angle between another axis and the horizontal plane increases within [0°, 90° ] and then decreases within [90°, 0°], and that the included angle between still another axis and the horizontal plane decreases within [90°, 0° ] and then increases within [0°, 90° ], with reference to the changes of acceleration of the screen A and the screen B on the one hand, the mobile phone 100 may determine that a change of the screen B in compliance with the preset condition occurs. Further, the mobile phone 100 may determine that the mobile phone 100 is horizontally unfolded.

Finally, in this embodiment of this application, the phase III (that is, the phase in which the mobile phone 100 displays the first interface) is described in detail.

In some embodiments, the preset function may be a payment function, and the first interface may include at least one payment mode. The mobile phone 100 may display the payment mode in a transaction card manner. In other words, the first interface may include at least one transaction card.

The at least one transaction card may include transaction cards in one or more applications. For example, the at least one transaction card may include a transaction card in a wallet application of the mobile phone 100 and an electronic payment card in the payment application.

For example, the transaction card in the wallet application of the mobile phone 100 may include a transaction card such as a bus card, an entrance guard card, a social security card, a bank card, a car key, an identity card, a social security card, a membership card, and a voucher card (such as a movie ticket, a train ticket, an airplane ticket, an express pickup slip, and various coupons). For example, the membership card may be a membership card of a commercial organization such as a shopping mall, a supermarket (such as Walmart), a coffee shop (such as Starbucks), or a fitness center.

The electronic payment card of the payment application is a card including an electronic payment code (such as a QR code or a bar code) of the payment application. For example, the payment application may include WeChat and Alipay.

In some embodiments, a part of transaction cards in the wallet application of the mobile phone 100 may use an NFC apparatus of the mobile phone 100 to complete transactions. The NFC apparatus may be a chip or an antenna. For example, a bus card, an entrance guard card, a social security card, a bank card, a car key, a social security card, a membership card, and the like may use the NFC apparatus of the mobile phone 100 to complete transactions. Another part of transaction cards in the wallet application of the mobile phone 100 (voucher cards such as a movie ticket, a train ticket, an air ticket, an express pickup slip, and various coupons) are transaction cards including electronic payment codes (for example, QR codes or bar codes). This type of transaction card can use "scan-to-pay" to complete a transaction.

The mobile phone 100 may set a transaction card that supports NFC in the wallet application as a default transaction card (for example, a bus card). The default transaction card is in an activated state. The transaction card in the activated state can receive a transaction instruction and complete a transaction automatically. Generally, when the mobile phone 100 is close to an NFC card reader or a POS machine, the mobile phone 100 may receive a transaction instruction from the NFC card reader or the POS machine. If the mobile phone 100 receives a transaction instruction used to access the default transaction card (such as a bus card), even if the mobile phone 100 is not unfolded, the mobile phone 100 may complete a transaction by using the default transaction card. For example, the transaction instruction may carry an application identifier (AID) of a transaction card to be accessed by the transaction card, where the AID is used to identify the transaction card.

Certainly, the transaction card to be accessed by the transaction instruction received by the mobile phone 100 may alternatively not be the default transaction card, but is another transaction card supporting NFC.

In some embodiments, the user may manually activate a transaction card that the user wants to use. Specifically, when detecting that the mobile phone 100 in the folded state is horizontally held and then horizontally unfolded, the mobile phone 100 may automatically display, on the foldable screen in the unfolded state, the first interface including the at least one transaction card. Then the mobile phone 100 may receive the user's selection operation on the transaction card that the user wants to use in the at least one transaction card. In response to the selection operation, the mobile phone 100 may activate the transaction card corresponding to the selection operation. The mobile phone 100 may display the transaction card at a top layer of the first interface, to indicate that the transaction card is in the activated state. In this case, if the mobile phone 100 is close to the corresponding NFC card reader or POS machine, and receives a transaction instruction from the NFC card reader or POS machine, the transaction card may be directly used to automatically complete a transaction.

In other embodiments, the mobile phone 100 may automatically activate a transaction card identified by an AID carried in a transaction instruction. When the mobile phone 100 in the folded state is horizontally held and horizontally unfolded, the mobile phone 100 may display at least one transaction card on the first interface. In this case, when the mobile phone 100 is close to the corresponding NFC card reader or POS machine, the mobile phone 100 may receive a transaction instruction from the NFC card reader or POS machine. The transaction instruction carries an AID. The mobile phone 100 may automatically perform routing by using the AID, and automatically activate a transaction card identified by the AID, to complete a transaction. The transaction card identified by the AID may be displayed at the top layer of the first interface, or may be displayed at another layer of the first interface (that is, blocked by the transaction card at the top layer of the first interface). In one embodiment, in this embodiment, the mobile phone 100 may not only automatically perform routing by using the AID, and automatically activate the transaction card identified by the AID, but also display the transaction card at the top layer of the first interface, to indicate that the transaction card is in the activated state.

In other embodiments, the at least one transaction card may include a preset transaction card. For detailed descriptions of the preset transaction card, refer to descriptions in the following implementations (a) to (c).

In one embodiment, the preset transaction card may be set in the mobile phone 100 by the user. Alternatively, the preset transaction card may be a transaction card that is among a plurality of transaction cards and whose quantity of use times or use frequency in a first preset time period is greater than a first preset threshold. For example, the first preset time period may be 3 months, 6 months, 12 months, or 50 days.

For example, it is assumed that the preset transaction card in the mobile phone 100 includes an electronic payment card of Alipay and a transaction card of Bank of China. As shown in FIG. 6(*a*) to FIG. 6(*c*), when the mobile phone 100 in the folded state is horizontally held, the mobile phone 100 is horizontally unfolded. As shown in FIG. 6(*c*), the mobile phone 100 may display the electronic payment card 601 of Alipay and the transaction card 602 of Bank of China on the foldable screen in the unfolded state.

The preset transaction card is a transaction card whose quantity of use times or use frequency in the first preset time period is greater than the first preset threshold in the mobile phone 100; or the preset transaction card is a transaction card set by the user. In other words, the preset transaction card may be a transaction card usually used by the user. In this way, when the mobile phone 100 in the folded state is horizontally held and horizontally unfolded, the mobile phone 100 displays one or more preset transaction cards directly on the foldable screen, so that the user can directly use the preset transaction card to make payment. For example, as shown in FIG. 6(*c*) or FIG. 6(*d*), the user may directly show the electronic payment card 601 of Alipay to a payee, to complete payment. In this way, the user's operation of starting the payment function on the mobile phone 100 in the unfolded state can be simplified, and user experience can be improved.

In one embodiment, the preset transaction card may be a transaction card that is among the plurality of transaction cards and corresponds to current scenario information. For example, the current scenario information may include at least geographical location information and time information. The mobile phone 100 may store usage scenario information of each transaction card. The usage scenario information may include at least one or more of geographical location information and time information.

When the mobile phone 100 in the folded state is horizontally held and then horizontally unfolded, the mobile phone 100 may obtain the current scenario information of the mobile phone 100. Then the mobile phone 100 may search for a transaction card (that is, the preset transaction card) whose usage scenario information matches the current scenario information, and display the preset transaction card on the foldable screen.

For example, geographical location information in usage scenario information of a transaction card is used to indicate a geographical location at which the transaction card may be used. For example, a geographical location at which a movie ticket may be used is a cinema. A geographical location at which an airplane ticket may be used is an airport. A geographical location at which a train ticket may be used is a railway station. A geographical location at which an electronic payment card of Alipay may be used is a shopping mall, a supermarket, a convenience store, or the like. A geographical location at which an entrance guard card may be used is a geographical location corresponding to a home. A geographical location at which a transaction card of a car key may be used is a garage. A geographical location at which an express pickup slip may be used is a location of a self-service express box.

Time information in usage scenario information of a transaction card is used to indicate a time at which the corresponding transaction card may be used. The time information may be a time that is collected by the mobile phone 100 and at which the user usually uses the transaction card. For example, if the mobile phone 100 learns, by collecting statistics, that the user usually uses a bus card in two time periods from 7:00 to 7:30 and 18:00 to 18:30, time information of the bus card may be 7:00 to 7:00 and 18:00 to 18:30. For another example, if the mobile phone 100 learns, by collecting statistics, that the user usually uses an electronic payment card of Alipay in a time period from 8:00 to 8:20, time information of the electronic payment card may be 8:00 to 8:20.

Figure 8B:
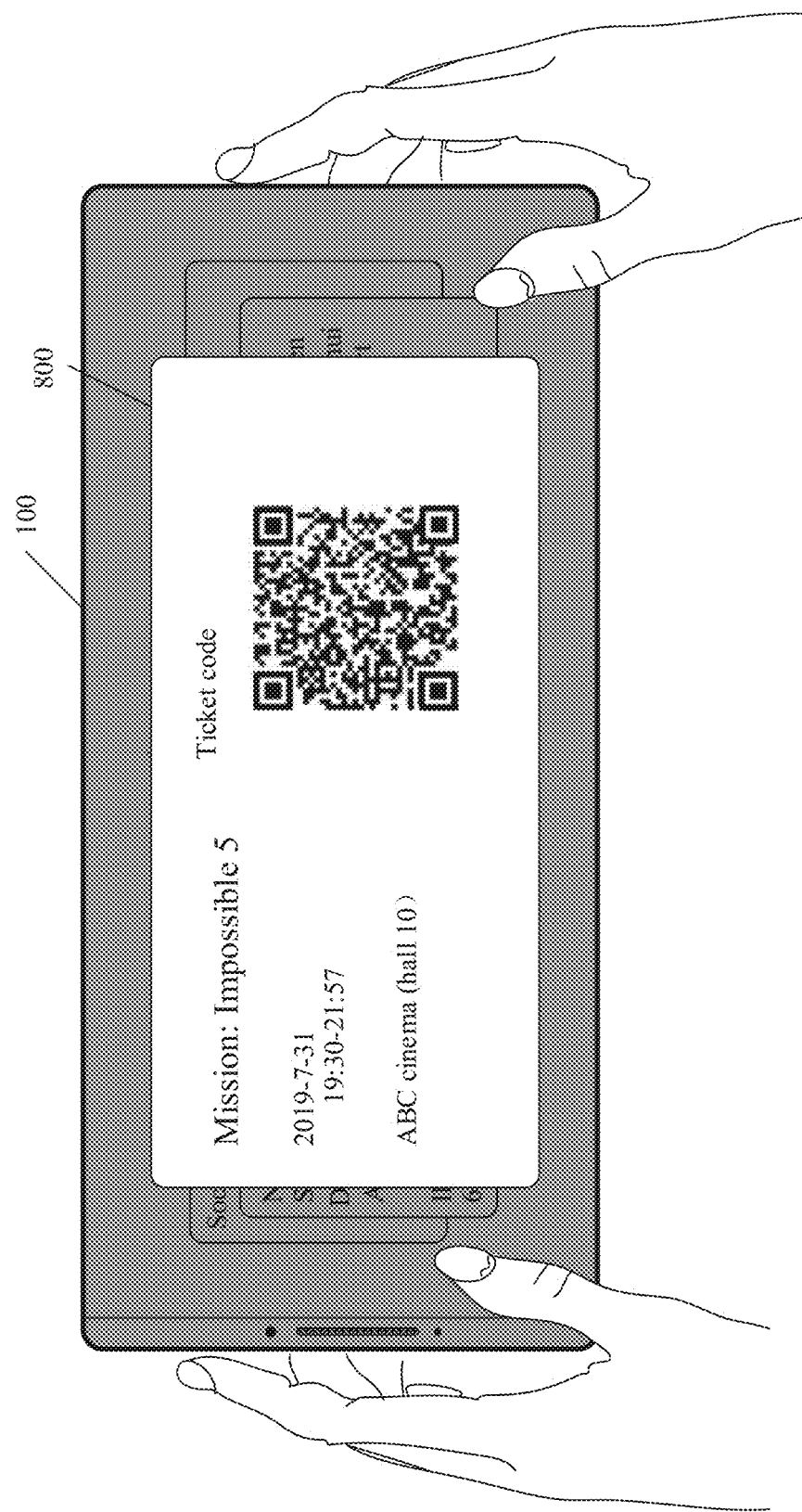
FIG. 8B is a schematic diagram of a display interface of a mobile phone according to an embodiment of this application.

For example, it is assumed that the foregoing usage scenario information includes geographical location information. For example, it is assumed that the mobile phone 100 is in a cinema. When detecting that the mobile phone 100 in the folded state is horizontally held and then horizontally unfolded, the mobile phone 100 may obtain geographical location information of the mobile phone 100, for example, geographical location information of the cinema. Then, as shown in FIG. 8B, the mobile phone 100 may display, on the foldable screen, a transaction card corresponding to the geographical location information of the cinema, for example, a movie ticket 800.

Figure 8C:
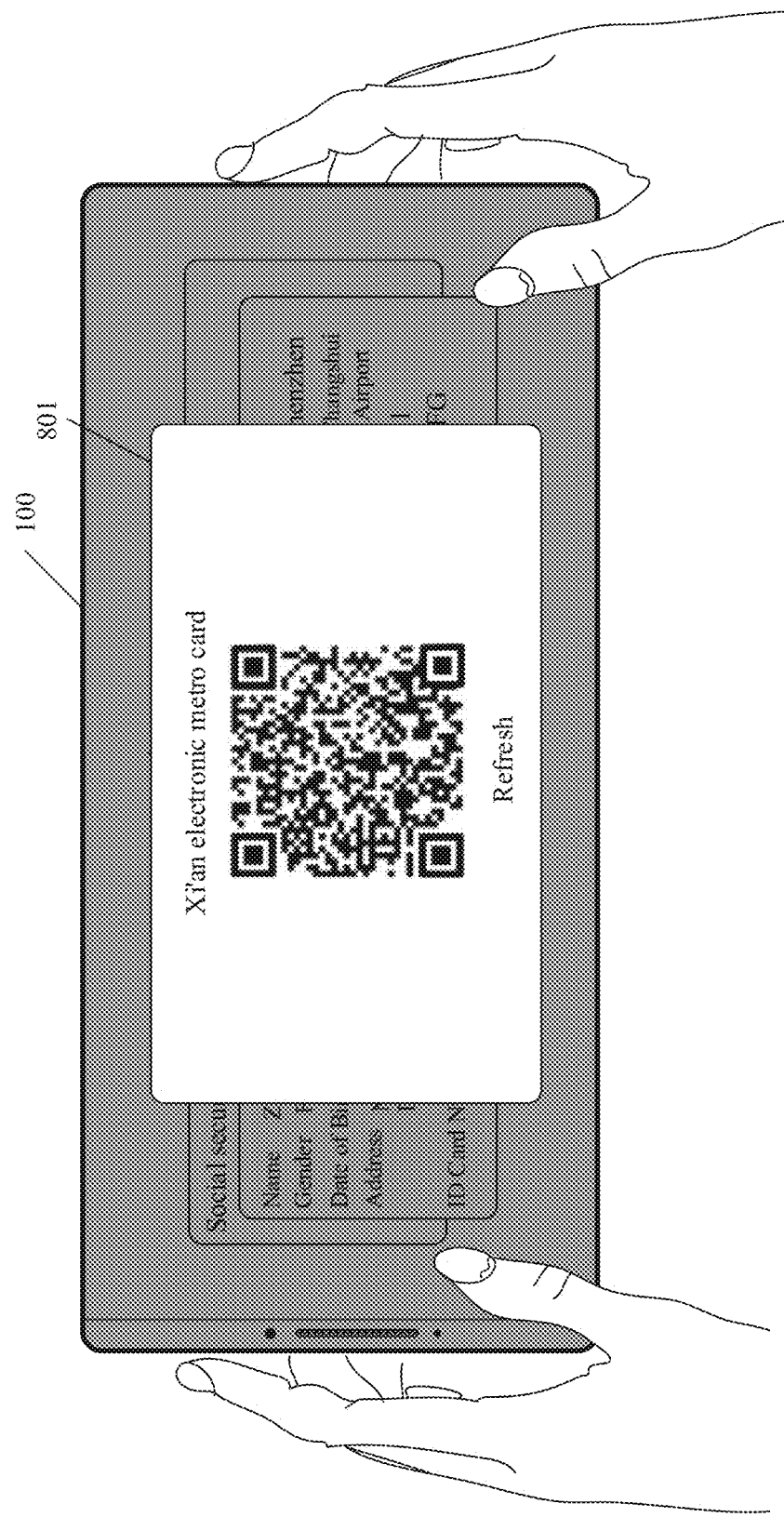
FIG. 8C is a schematic diagram of a display interface of a mobile phone according to an embodiment of this application.

For another example, it is assumed that the mobile phone 100 is in a metro station in Xi'an. When detecting that the mobile phone 100 in the folded state is horizontally held and then horizontally unfolded, the mobile phone 100 may obtain geographical location information of the mobile phone 100, for example, geographical location information of the metro station. Then, as shown in FIG. 8C, the mobile phone 100 may display, on the foldable screen, a transaction card corresponding to the geographical location information of the metro station, for example, a Xi'an electronic metro card 801 of Alipay.

Further, after displaying, on the foldable screen, the transaction card corresponding to the current scenario information of the mobile phone 100, the mobile phone 100 may further receive a sixth operation of the user. In response to the sixth operation, the mobile phone 100 may display a main interface of the wallet application. Alternatively, in response to the sixth operation, the mobile phone 100 may display the first interface including at least one transaction card. For example, the mobile phone 100 displays the movie ticket 800 shown in FIG. 8B. In response to the sixth operation, the mobile phone 100 may display the first interface shown in FIG. 6(c) or FIG. 6(d).

For example, the sixth operation may include a third sliding operation and a fourth sliding operation. The third sliding operation may be a bottom-up sliding operation input by the user on the first screen, and the fourth sliding operation may be a bottom-up sliding operation input by the user on the second screen. Alternatively, the third sliding operation may be a top-down sliding operation input by the user on the first screen, and the fourth sliding operation may be a top-down sliding operation input by the user on the second screen. Alternatively, the third sliding operation may be a left-to-right sliding operation input by the user on the first screen, and the fourth sliding operation may be a right-to-left sliding operation input by the user on the second screen. Alternatively, the third sliding operation may be a right-to-left sliding operation input by the user on the first screen, and the fourth sliding operation may be a left-to-right sliding operation input by the user on the second screen.

In this embodiment of this application, when detecting that the mobile phone 100 in the folded state is horizontally held and then horizontally unfolded, the mobile phone 100 may automatically display, on the foldable screen, the transaction card corresponding to the current scenario information of the mobile phone 100. In this way, the user's operation of displaying the transaction card corresponding to the current scenario information on the mobile phone 100 in the unfolded state can be simplified. Therefore, more convenient and comfortable operation experience can be provided for the user, and user experience is improved.

In one embodiment, the preset transaction card may be a transaction card that currently has a preferential activity among the plurality of transaction cards of the mobile phone 100. The mobile phone 100 may obtain preferential activity information of each transaction card from the wallet application that manages each transaction card. Alternatively, the mobile phone 100 may obtain preferential information of the transaction card from an application such as Dianping or Meituan. For example, Dianping may include a preferential activity of each merchant for each transaction card. Alternatively, the mobile phone 100 may further obtain preferential activity information of the transaction card from an application corresponding to the transaction card. The preferential activity information is used to indicate a preferential activity rule corresponding to the transaction card. In one embodiment, the mobile phone 100 may further display the preferential activity information of each transaction card on the unfolded foldable screen, so that the user conveniently selects a transaction card with a relatively high preference for payment.

Figure 6D:
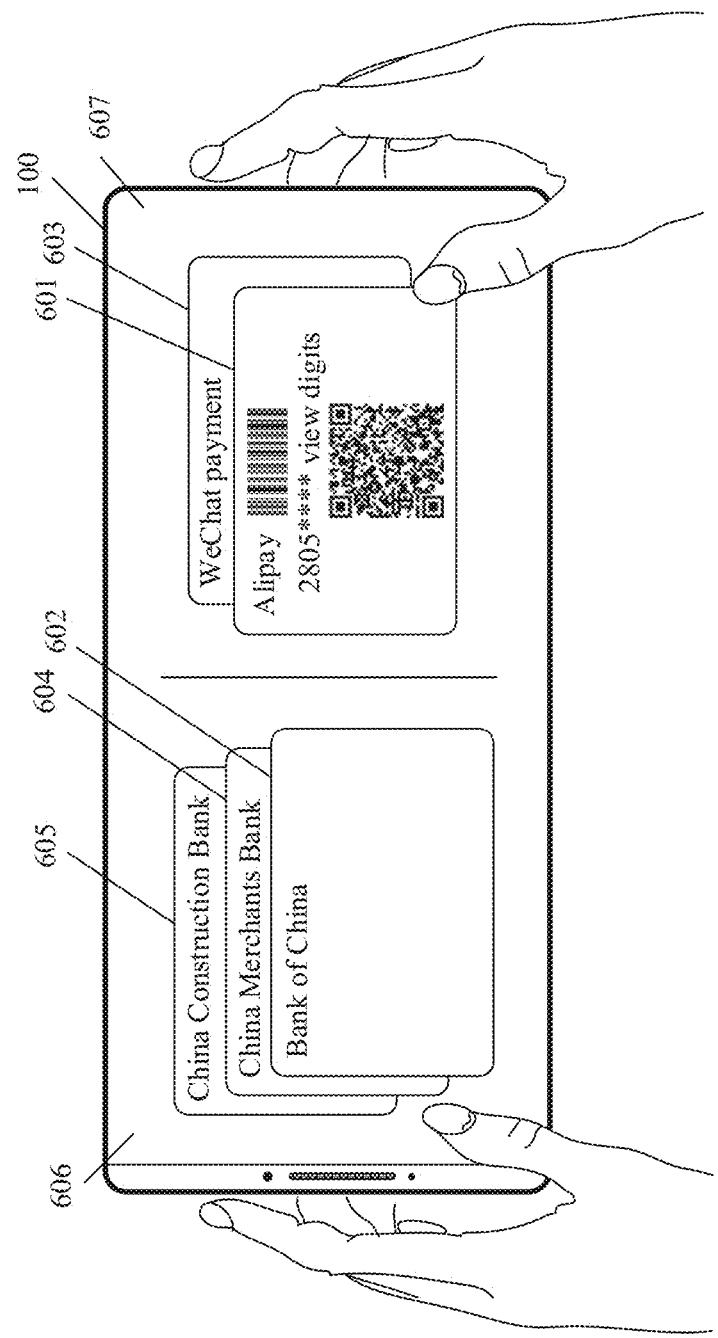

In other embodiments, the at least one transaction card may further include a transaction card other than the preset transaction card of the mobile phone 100. In this embodiment, the mobile phone 100 may display the preset transaction card in a preset display manner, and display the other transaction card in another display manner different from the preset display manner. For example, it is assumed that the transaction card 603 of Bank of China and the electronic payment card 601 of Alipay shown in FIG. 6(d) are the foregoing preset transaction cards. As shown in FIG. 6(d), the mobile phone 100 may not only display the transaction card 603 of Bank of China on the first screen 606, but also display a transaction card 605 of China Construction Bank and a transaction card 604 of China Merchants Bank (that is, the foregoing other transaction cards) on the first screen 606. The mobile phone 100 may not only display the electronic payment card 601 of Alipay on the second screen 607, but also display an electronic payment card 603 of WeChat (that is, the foregoing another transaction card) on the second screen 607.

The at least one transaction card may include a plurality of transaction cards. The mobile phone 100 may display a part of the plurality of transaction cards on the first screen, and display another part of the plurality of transaction cards on the second screen. For example, as shown in FIG. 6(d), the mobile phone 100 may display the transaction card 603 of Bank of China, the transaction card 605 of China Construction Bank, and the transaction card 604 of China Merchants Bank on the first screen 606, and display the electronic payment card 601 of Alipay and the electronic payment card 603 of WeChat on the second screen 607.

Figure 9A:
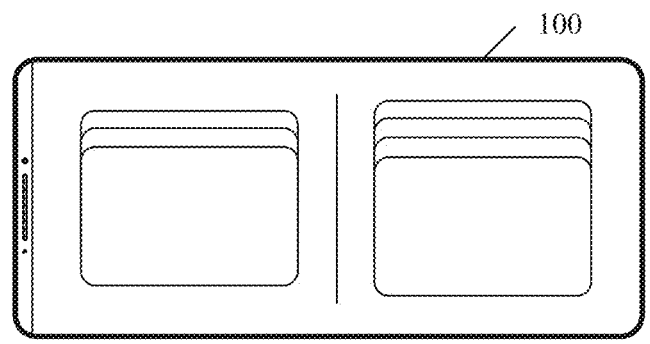
FIG. 9A(a) to FIG. 9A(c) each is a schematic diagram of an arrangement of transaction cards according to an embodiment of this application.
Figure 9A:
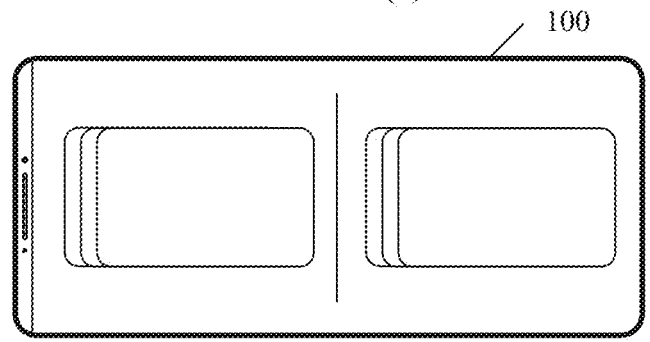
Figure 9A:
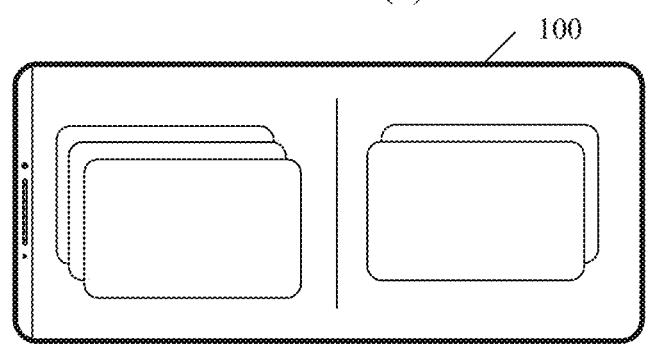

For example, the mobile phone 100 may display the one part of transaction cards in a first arrangement manner on the first screen, and display the another part of transaction cards in the first arrangement manner on the second screen. For example, as shown in FIG. 9A(a), the mobile phone 100 may display three transaction cards in the first arrangement manner (for example, a vertical arrangement manner) on the first screen, and display four transaction cards in the first arrangement manner on the second screen.

Alternatively, the mobile phone 100 may display the one part of transaction cards in a second arrangement manner on the first screen, and display the another part of transaction cards in the second arrangement manner on the second screen. For example, as shown in FIG. 9A(b), the mobile phone 100 may display three transaction cards in the second arrangement manner (for example, a horizontal arrangement manner) on the first screen, and display four transaction cards in the second arrangement manner on the second screen.

Alternatively, the mobile phone 100 may display the one part of transaction cards in a third arrangement manner on the first screen, and display the another part of transaction cards in the third arrangement manner on the second screen. For example, as shown in FIG. 9A(c), the mobile phone 100 may display three transaction cards in the third arrangement manner (for example, a horizontal-vertical arrangement manner) on the first screen, and display two transaction cards in the third arrangement manner on the second screen. In this embodiment of this application, the method in this instance of this application is described by using an example in which the mobile phone 100 displays transaction cards on the first screen and the second screen in the third arrangement manner.

For example, it is assumed that the electronic payment card of Alipay and the transaction card of Bank of China in the wallet application of the mobile phone 100 are preset transaction cards, and that the transaction card of China Construction Bank, the transaction card of China Merchants Bank, and the electronic payment card of WeChat are not preset transaction cards. As shown in FIG. 6(*d*), the mobile phone 100 may display the preset transaction card at the top layer (that is, in the preset display manner), for example, the electronic payment card 601 of Alipay and the transaction card 602 of Bank of China; and display the transaction card 605 of China Construction Bank, the transaction card 604 of China Merchants Bank, and the electronic payment card 603 of WeChat at a layer below the preset transaction card. It should be noted that displaying the preset transaction card at the top layer in this embodiment of this application means that the preset transaction card is not blocked by another transaction card, and that any part of the preset transaction card is visible to the user.

It can be learned from the foregoing description that the first screen of the mobile phone 100 may display one or more transaction cards, and that the second screen may also display one or more transaction cards.

In some embodiments, when the first screen of the mobile phone 100 displays a plurality of transaction cards, a transaction card displayed by the mobile phone 100 in the preset display manner may be switched among the plurality of transaction cards in response to a sliding operation (for example, a first sliding operation) of the user on the first screen. Likewise, when the second screen of the mobile phone 100 displays a plurality of transaction cards, a transaction card displayed by the mobile phone 100 in the preset display manner may be switched among the plurality of transaction cards in response to a sliding operation (for example, a second sliding operation) of the user on the second screen.

In one embodiment, when the first screen of the mobile phone 100 displays a plurality of transaction cards, the mobile phone 100 may display, in the preset display manner in response to the first sliding operation of the user on the first screen, a first transaction card among the plurality of transaction cards displayed on the first screen. As a sliding position of the first sliding operation changes, when the first screen displays a plurality of transaction cards, the first transaction card displayed in the preset display manner is switched among the plurality of transaction cards.

For example, in this embodiment of this application, that the mobile phone 100 displays the first transaction card in the preset display manner may specifically include: the mobile phone 100 displays the first transaction card at the top layer (that is, in the preset display manner); and the mobile phone 100 displays the first transaction card in a preset color. In this embodiment of this application, the method in this embodiment of this application is described by using an example in which the first transaction card is displayed at the top layer (that is, in the preset display manner).

Figure 9B:
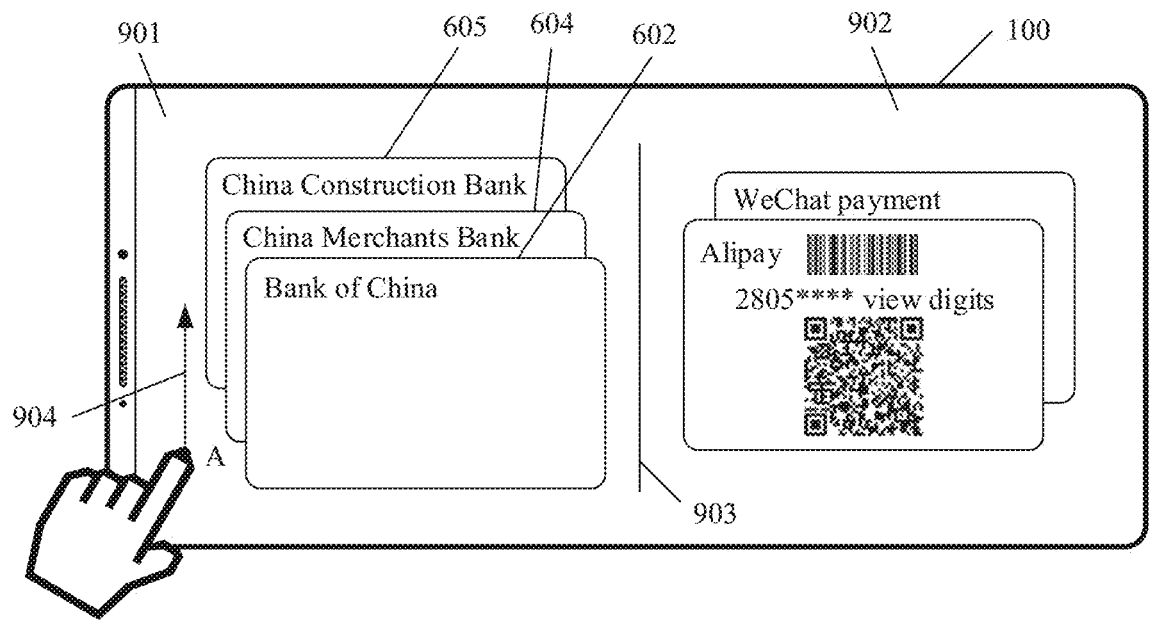
FIG. 9B(a) to FIG. 9B(c) each is a schematic diagram of a display interface of a mobile phone according to an embodiment of this application.
Figure 9B:
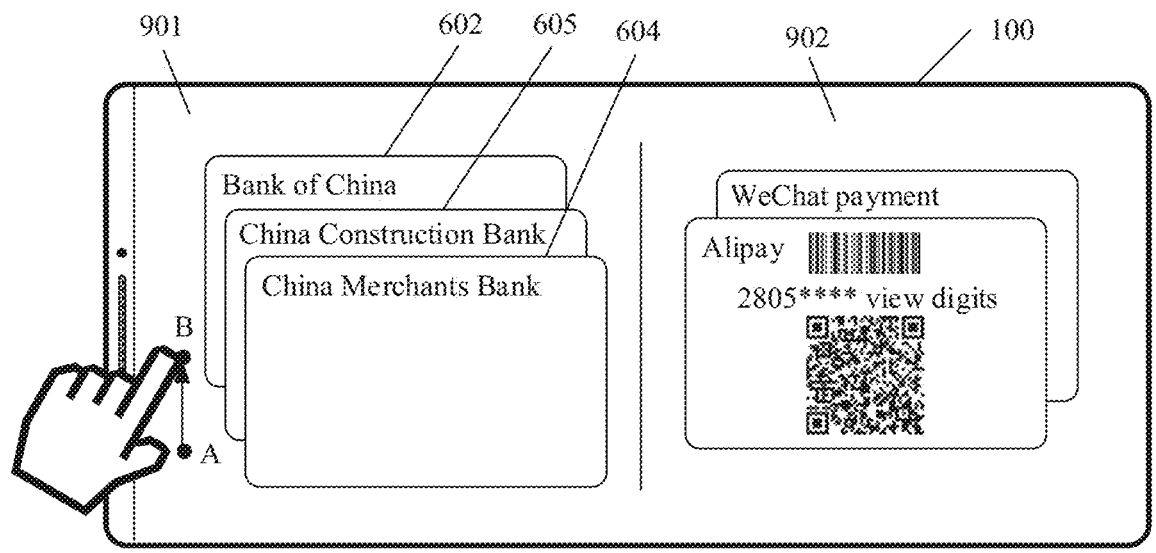
Figure 9B:
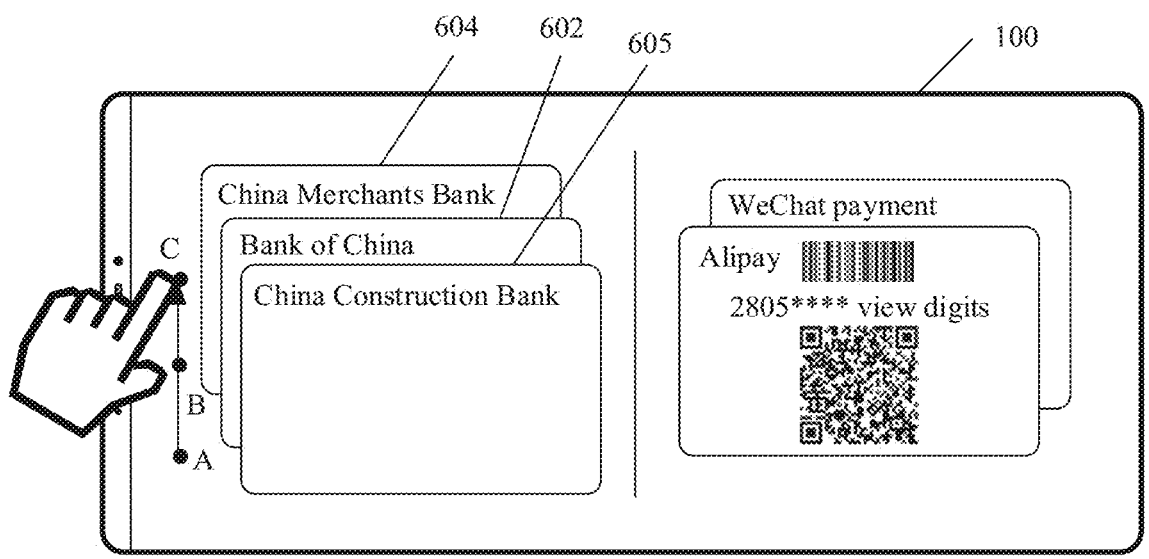

For example, the first sliding operation may be a bottom-up sliding operation, a top-down sliding operation, a left-to-right sliding operation, or a right-to-left sliding operation that is input by the user on the first screen of the foldable screen. For example, as shown in FIG. 9B(a), the first sliding operation may be a bottom-up sliding operation 904 input by the user on the first screen 901. As shown in FIG. 9B(a), a dividing line 903 is used as a boundary between the first screen 901 and the second screen 902 of the foldable screen of the mobile phone 100. A start point of the sliding operation 904 (that is, the first sliding operation) is a point A.

As shown in FIG. 9B(b), when the mobile phone 100 detects that the sliding position of the first sliding operation 904 changes from the point A shown in FIG. 9B(b) to a point B shown in FIG. 9B(b) along a sliding track, the first transaction card displayed by the mobile phone 100 is switched from the transaction card 602 of Bank of China shown in FIG. 9B(a) to the transaction card 604 of China Merchants Bank shown in FIG. 9B(b). As shown in FIG. 9B(b), the mobile phone 100 displays the transaction card 604 of China Merchants Bank at the top layer (that is, in the preset display manner).

It may be understood that, as the sliding position of the first sliding operation continues to change, the first transaction card displayed by the mobile phone 100 in the preset display manner continues to be switched among the plurality of transaction cards displayed on the first screen. For example, when the mobile phone 100 detects that the sliding position of the sliding operation changes from the point B shown in FIG. 9B(c) to a point C shown in FIG. 9B(c) along the sliding track, the first transaction card displayed by the mobile phone 100 is switched from the transaction card 602 of Bank of China shown in FIG. 9B(b) to the transaction card 605 of China Construction Bank shown in FIG. 9B(c). As shown in FIG. 9B(c), the mobile phone 100 displays the transaction card 605 of China Construction Bank at the top layer (that is, in the preset display manner).

It should be noted that, as the sliding position of the first sliding operation changes, when only one transaction card is displayed on the first screen, the mobile phone 100 does not display the transaction card in the preset display manner.

In this embodiment, the mobile phone 100 may further receive the second sliding operation of the user on the second screen; and display a second transaction card among the plurality of transaction cards on the second screen in the preset display manner in response to the second sliding operation. As a sliding position of the second sliding operation changes, when the second screen includes a plurality of transaction cards, the second transaction card displayed in the preset display manner is switched among the plurality of transaction cards.

Figure 10A:
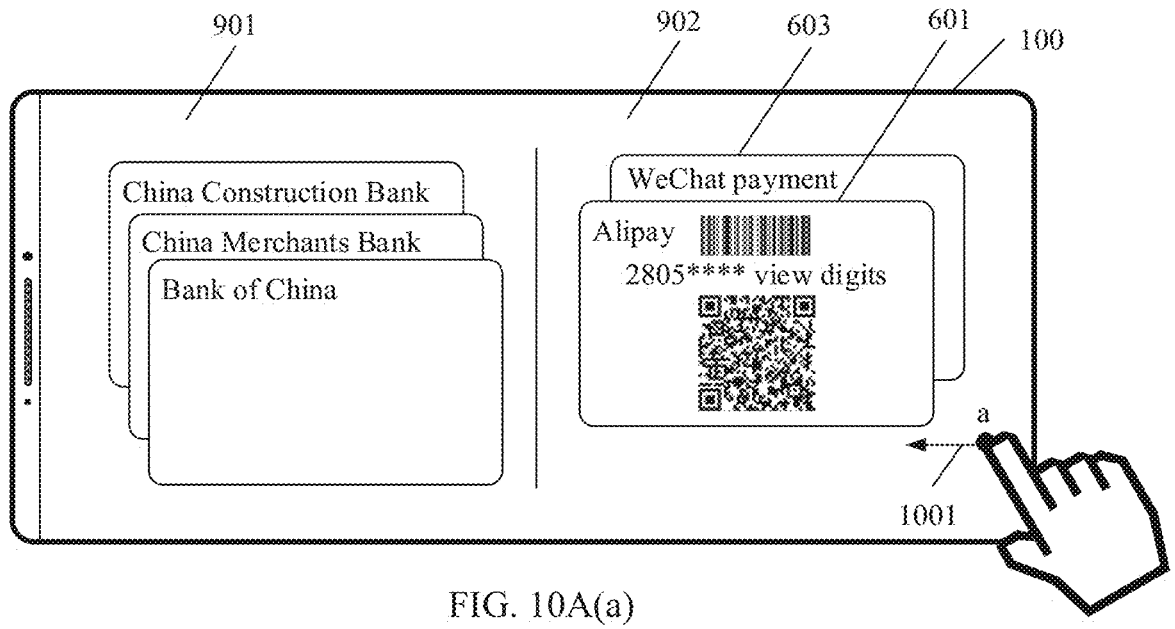
FIG. 10A(a) and FIG. 10A(b) each is a schematic diagram of a display interface of a mobile phone according to an embodiment of this application.
Figure 10A:
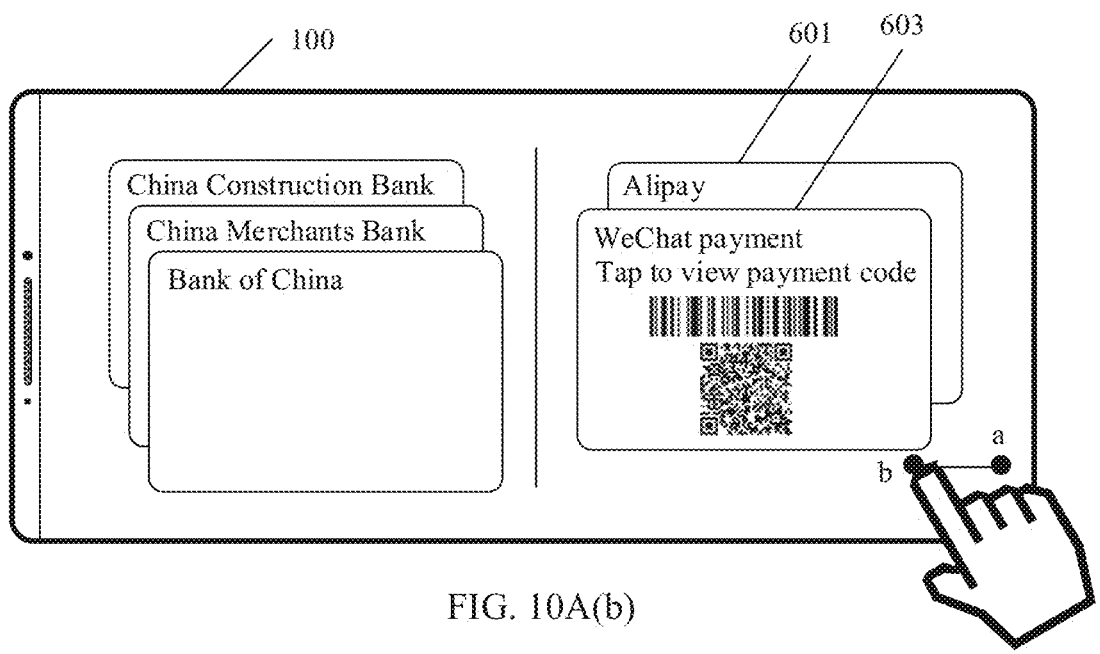

For example, the second sliding operation may be a bottom-up sliding operation, a top-down sliding operation, a left-to-right sliding operation, or a right-to-left sliding operation that is input by the user on the second screen of the foldable screen. For example, as shown in FIG. 10A(a), the second sliding operation may be a right-to-left sliding operation 1001 input by the user on the second screen 902. A start point of the sliding operation 1001 (that is, the second sliding operation) is a point a.

As shown in FIG. 10A(b), when the mobile phone 100 detects that the sliding position of the second sliding operation 1001 changes from the point a shown in FIG. 10A(b) to a point b shown in FIG. 10A(b) along a sliding track, the second transaction card displayed by the mobile phone 100 is switched from the electronic payment card 601 of Alipay shown in FIG. 10A(a) to the electronic payment card 603 of WeChat shown in FIG. 10A(b). As shown in FIG. 10A(b), the mobile phone 100 displays the electronic payment card 603 of WeChat at the top layer (that is, in the preset display manner). It may be understood that, as the sliding position of the second sliding operation continues to change, the second transaction card displayed by the mobile phone 100 in the preset display manner continues to be switched among the plurality of transaction cards displayed on the first screen (not shown in the figure).

It should be noted that, as the sliding position of the second sliding operation changes, when only one transaction card is displayed on the second screen, the mobile phone 100 does not display the transaction card in the preset display manner.

In this embodiment of this application, the mobile phone 100 may implement, in response to the first sliding operation of the user on the first screen, switching among the plurality of transaction cards displayed on the first screen; and implement, in response to the second sliding operation of the user on the second screen, switching among the plurality of transaction cards displayed on the second screen. According to this application, the user's operation of implementing transaction card switching can be reduced, man-machine interaction performance can be improved, and user experience can be improved.

In some embodiments, when the mobile phone 100 displays a plurality of transaction cards on the first screen in the first arrangement manner (for example, the vertical arrangement manner), the first sliding operation may be a top-down sliding operation or a bottom-up sliding operation on the first screen. Likewise, when the mobile phone 100 displays a plurality of transaction cards on the second screen in the first arrangement manner (for example, the vertical arrangement manner), the second sliding operation may be a top-down sliding operation or a bottom-up sliding operation on the second screen. In this way, switching among the plurality of transaction cards displayed in the vertical arrangement manner is controlled by performing a top-down sliding operation or a bottom-up sliding operation (for example, the first sliding operation or the second sliding operation). This better complies with a visual habit of the user, and can improve user experience.

When the mobile phone 100 displays a plurality of transaction cards on the first screen in the second arrangement manner (for example, the horizontal arrangement manner), the first sliding operation may be a left-to-right sliding operation or a right-to-left sliding operation on the first screen. Likewise, when the mobile phone 100 displays a plurality of transaction cards on the second screen in the second arrangement manner (for example, the horizontal arrangement manner), the second sliding operation may be a left-to-right sliding operation or a right-to-left sliding operation on the second screen. In this way, switching among the plurality of transaction cards displayed in the horizontal arrangement manner is controlled by performing a left-to-right or right-to-left sliding operation (for example, the first sliding operation or the second sliding operation). This better complies with a visual habit of the user, and can improve user experience.

In other embodiments, the mobile phone 100 may further receive a fourth operation of the user on a seventh transaction card among the transaction cards displayed on the first screen. The seventh transaction card is any other transaction card than the transaction card displayed in the preset display manner (for example, the first transaction card) among the plurality of transaction cards displayed on the first screen. For example, the seventh transaction card may be the transaction card 604 of China Merchants Bank shown in FIG. 9B(a) or the transaction card 605 of China Construction Bank, but not the transaction card 602 of Bank of China shown in FIG. 9B(a). In response to the fourth operation, the mobile phone 100 may display the seventh transaction card in the preset display manner on the first screen. For example, the mobile phone 100 may receive the fourth operation (for example, a tapping operation, which is not shown in the figure) of the user on the transaction card 604 (that is, the seventh transaction card) of China Merchants Bank shown in FIG. 9B(a). In response to the fourth operation, as shown in FIG. 9B(b), the mobile phone 100 may display the transaction card 604 of China Merchants Bank in the preset display manner (for example, at the top layer) on the first screen 901.

The mobile phone 100 may further receive a fourth operation of the user on an eighth transaction card among the transaction cards displayed on the second screen. The eighth transaction card is any other transaction card than the transaction card displayed in the preset display manner among the transaction cards displayed on the second screen. For example, the eighth transaction card may be the electronic payment card 603 of WeChat shown in FIG. 10A(a), but not the electronic payment card 601 of Alipay shown in FIG. 10A(a). In response to the fourth operation, the mobile phone 100 may display the eighth transaction card in the preset display manner on the second screen. For example, the mobile phone 100 may receive the fourth operation (for example, a tapping operation, which is not shown in the figure) of the user on the electronic payment card 603 of WeChat (that is, the eighth transaction card) shown in FIG. 10A(a). In response to the fourth operation, as shown in FIG. 10A(b), the mobile phone 100 may display the electronic payment card 603 of WeChat in the preset display manner (for example, at the top layer) on the second screen.

In other embodiments, the mobile phone 100 may further receive a fifth operation of the user on the first screen or the second screen. In response to the fifth operation on the first screen, the mobile phone 100 may display a first editing interface on the first screen. The first editing interface is used to edit the transaction cards displayed on the first screen. In response to the fifth operation on the second screen, the mobile phone 100 may display a second editing interface on the second screen. The second editing interface is used to edit the transaction cards displayed on the second screen.

That the first editing interface is used to edit the transaction cards displayed on the first screen specifically means that the first editing interface may provide a function of adjusting an arrangement order of the transaction cards on the first screen, a function of deleting a transaction card, and the like. That the second editing interface is used to edit the transaction cards displayed on the second screen specifically means that the second editing interface may provide a function of adjusting an arrangement order of the transaction cards on the second screen, a function of deleting a transaction card, and the like.

For example, the fifth operation may be a touch and hold operation, a double-tapping operation, or the like of the user at any blank position on the first screen or the second screen. Alternatively, the fifth operation may be a first preset gesture input by the user on the first screen or the second screen, such as an S-shaped gesture or an O-shaped gesture. Alternatively, the fifth operation may be a touch and hold operation, a double-tapping operation, or the like of the user on any transaction card displayed on the first screen or the second screen. The fifth operation is different from the fourth operation described above.

Figure 10B:
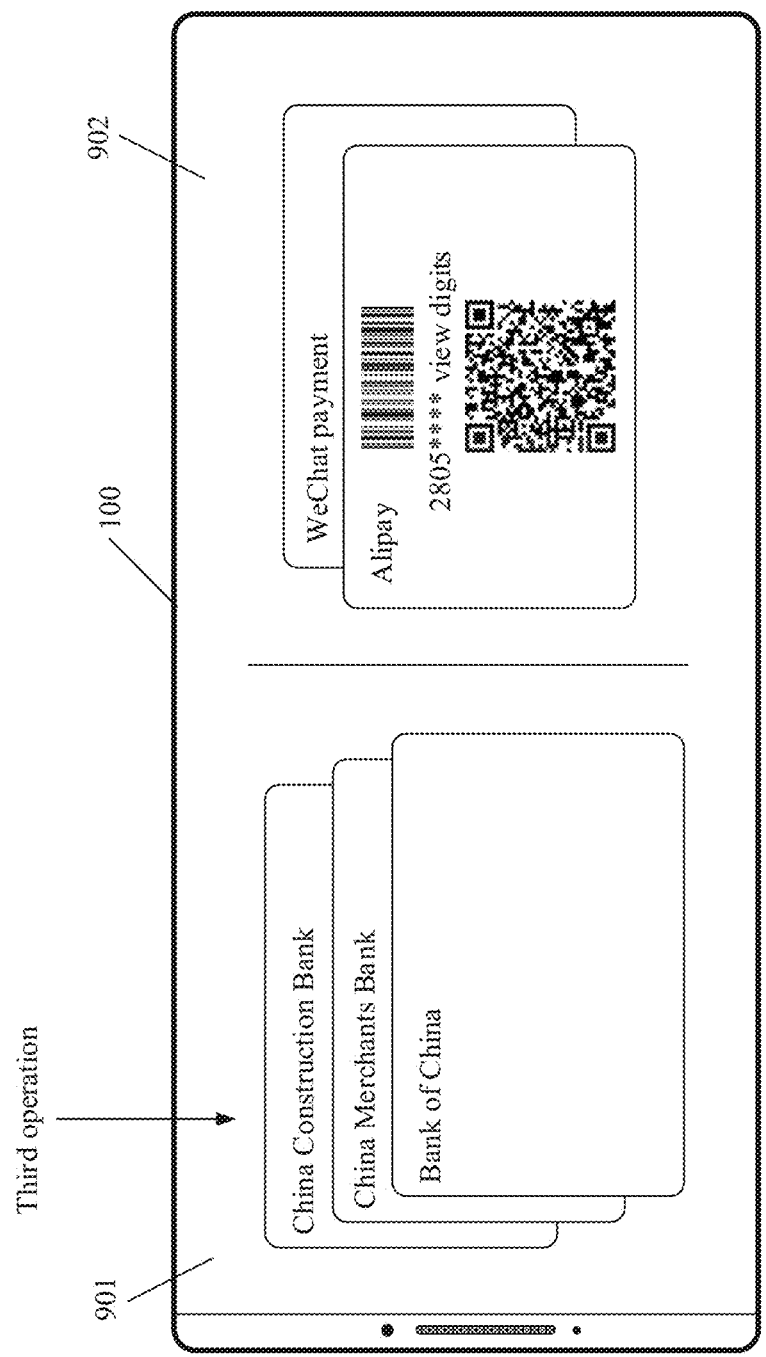
FIG. 10B(a) to FIG. 10B(c) each is a schematic diagram of a display interface of a mobile phone according to an embodiment of this application.
Figure 10B:
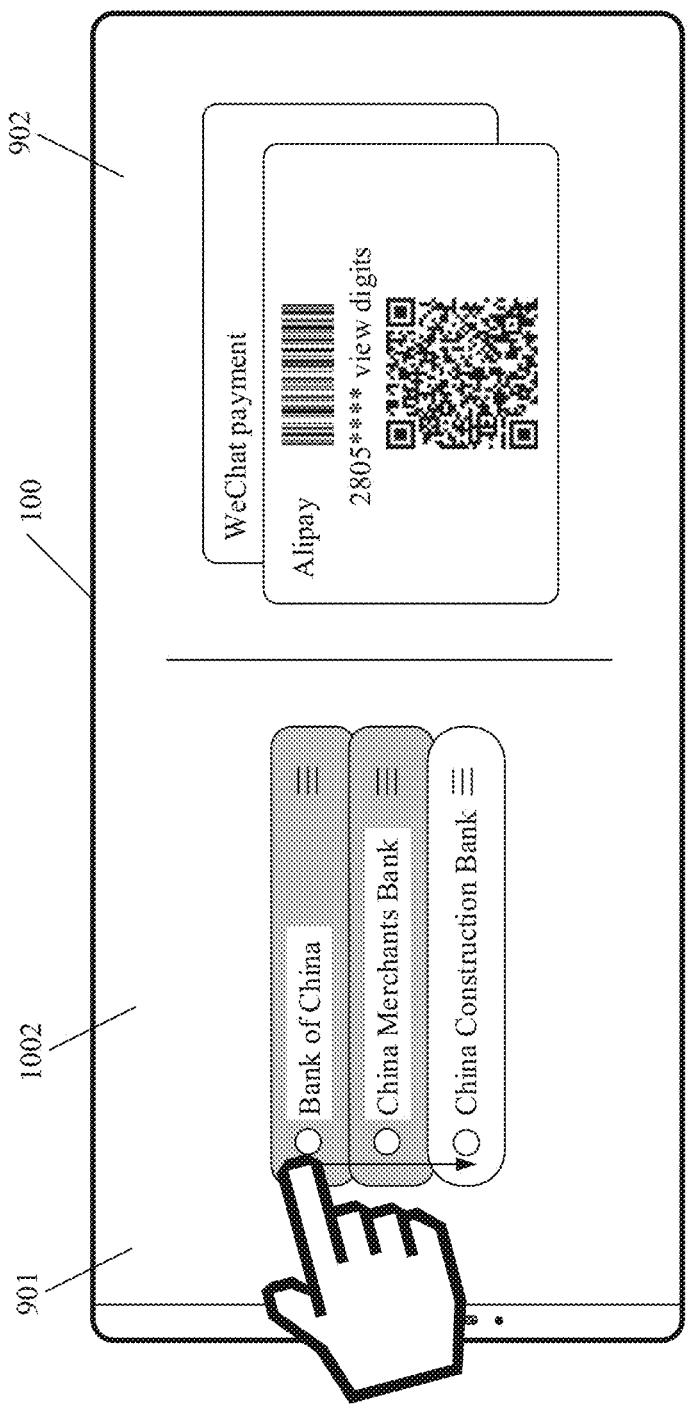
Figure 10B:
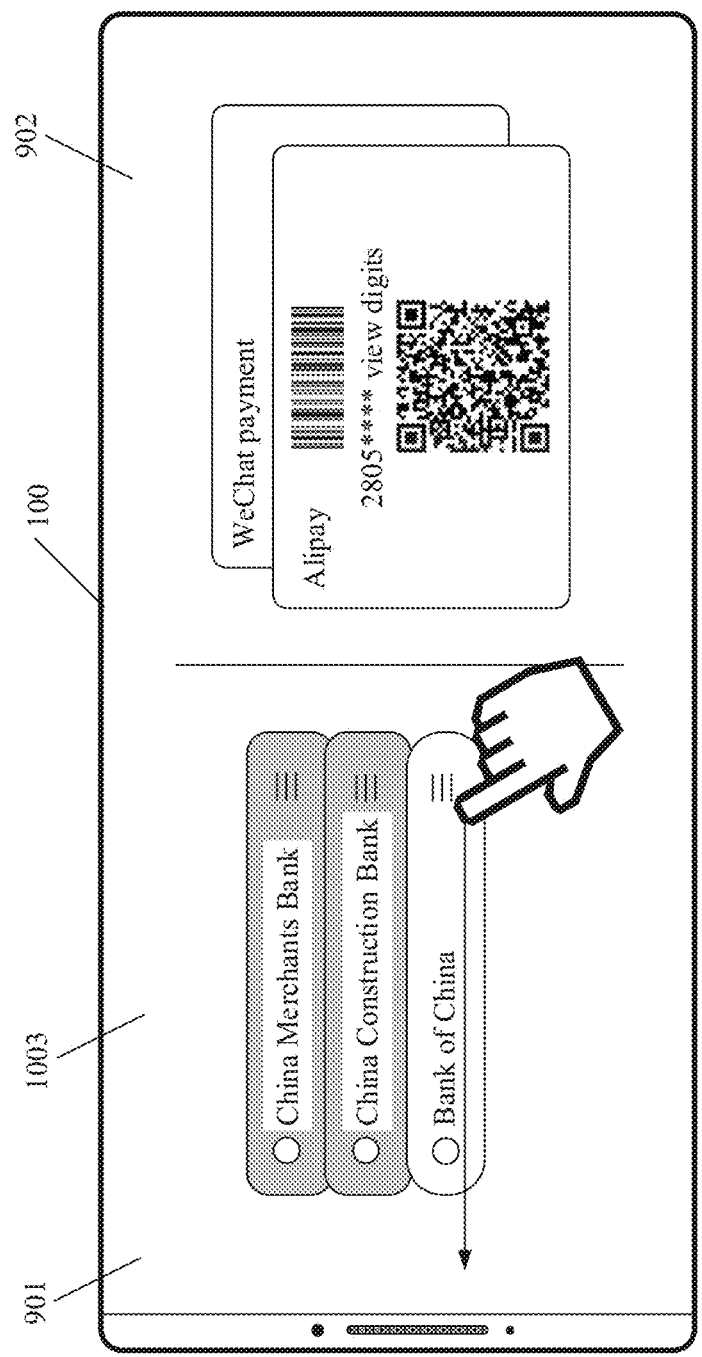

For example, it is assumed that the mobile phone 100 displays the first editing interface on the first screen in response to the fifth operation of the user on the first screen. As shown in FIG. 10B(a), in response to the fifth operation of the user on the first screen 901, the mobile phone 100 may display, on the first screen 901, the first editing interface 1002 shown in FIG. 10B(b). The first editing interface 1002 includes card options corresponding to the three transaction cards displayed on the first screen 901 in FIG. 10B(a), for example, a card option of China Merchants Bank, a card option of Bank of China, and a card option of China Construction Bank.

In response to a dragging operation of the user on any card option among the card option of China Merchants Bank, the card option of Bank of China, and the card option of China Construction Bank, the mobile phone 100 may adjust an arrangement order of the corresponding three transaction cards on the first screen. For example, as shown in FIG. 10B(b), in response to a downward dragging operation of the user on the card option of Bank of China, the mobile phone 100 may display the first editing interface 1003 shown in FIG. 10B(c). In FIG. 10B(b), the card option of China Construction Bank is marked in white, and is used to indicate the transaction card of China Construction Bank displayed at the top layer on the first screen. In FIG. 10B(c), the card option of Bank of China is marked in white, and is used to indicate the transaction card of Bank of China displayed at the top layer on the first screen. It can be learned by comparing FIG. 10B(b) and FIG. 10B(c) that, in response to the downward dragging operation of the user on the card option of Bank of China, the mobile phone 100 adjusts the arrangement order of the three transaction cards on the first screen.

In response to a deletion operation of the user on any card option among the card option of China Merchants Bank, the card option of Bank of China, and the card option of China Construction Bank, the mobile phone 100 may delete a corresponding transaction card. For example, the deletion operation may be an operation of dragging a card option to slide the card option out of the first screen. For example, the deletion operation may be a leftward sliding operation of the user on the card option of Bank of China shown in FIG. 10B(c), where the leftward sliding operation is used to slide the card option of Bank of China out of the first screen 901. In response to the leftward sliding operation of the user on the card option of Bank of China shown in FIG. 10B(c), the mobile phone 100 may display a dynamic image of the card option of Bank of China slid out of the first screen 901, as shown by an interface 1004 in FIG. 10C(a). Subsequently, the mobile phone 100 may display an interface 1005 shown in FIG. 10C(b). The interface 1005 includes only the card option of China Merchants Bank and the card option of China Construction Bank, but does not include the card option of Bank of China.

Figure 10C:
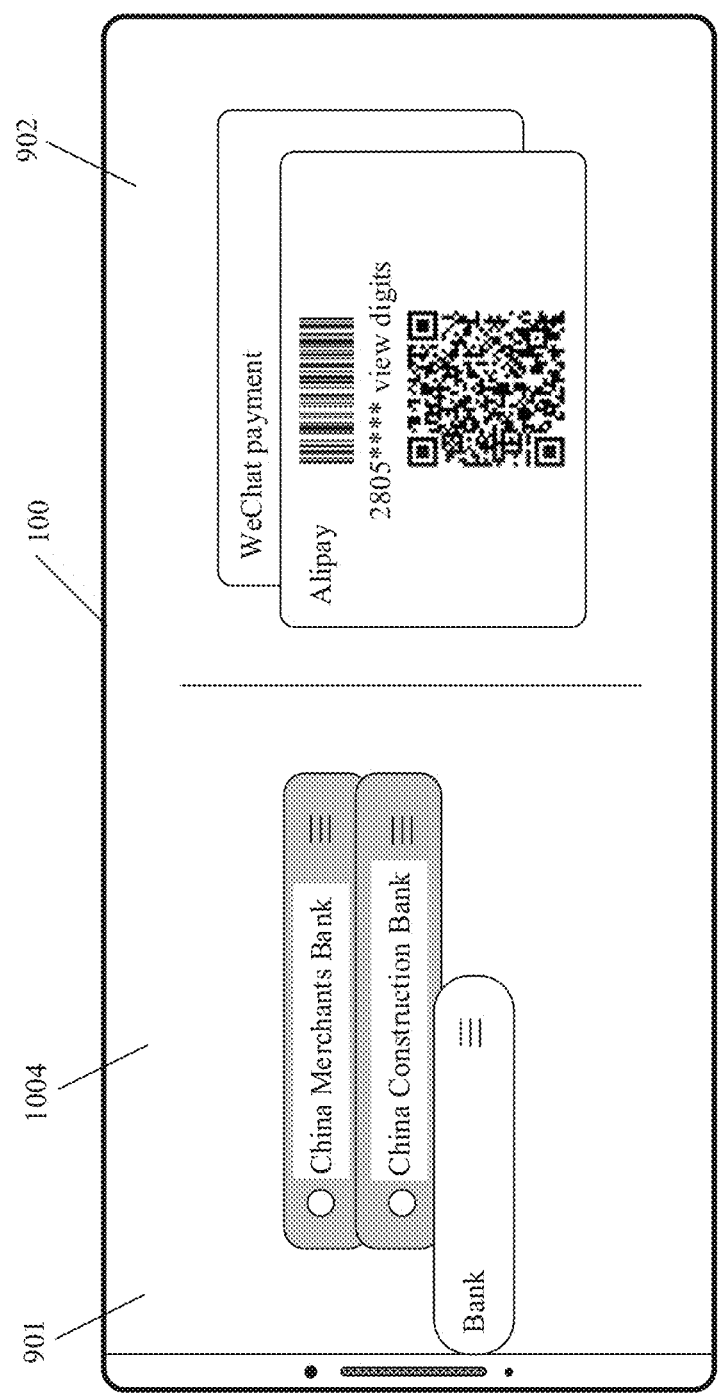
FIG. 10C(a) to FIG. 10C(c) each is a schematic diagram of a display interface of a mobile phone according to an embodiment of this application.
Figure 10C:
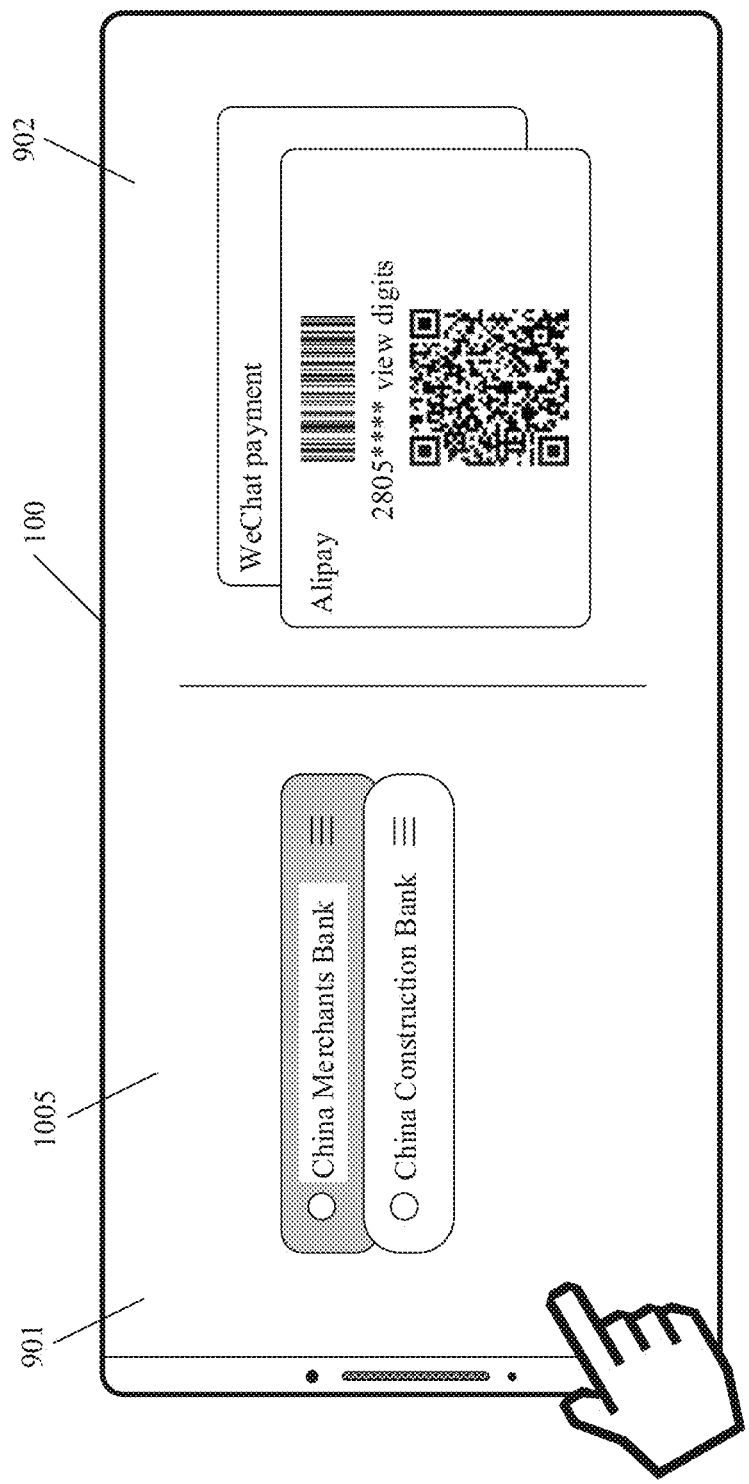
Figure 10C:
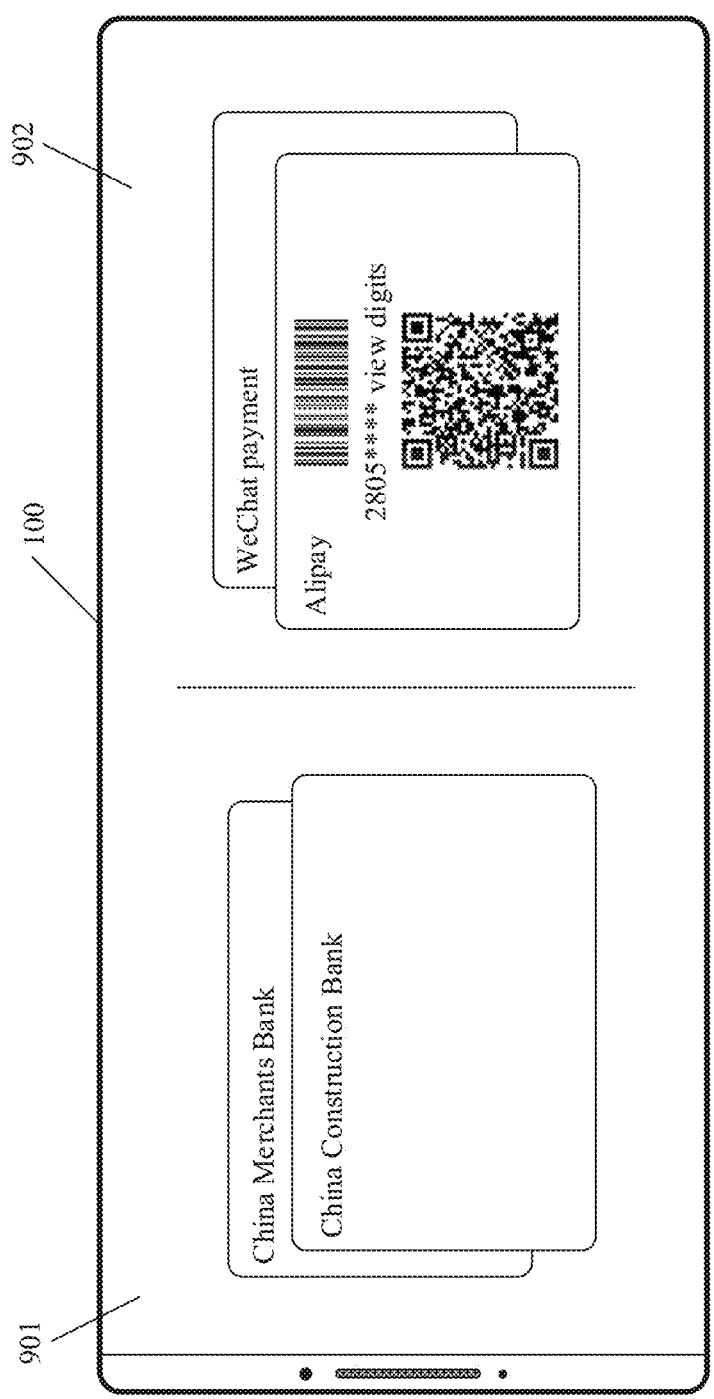

As shown in FIG. 10C(b), the mobile phone 100 may receive a tapping operation of the user on any blank position on the first screen 901. As shown in FIG. 10C(c), the mobile phone 100 may display the transaction card of China Merchants Bank and the transaction card of China Construction Bank on the first screen in response to the tapping operation. As shown in FIG. 10C(c), the transaction card of Bank of China has been deleted.

In some embodiments, after the mobile phone 100 displays the first editing interface on the first screen or displays the second editing interface on the second screen, if no operation of the user is received in the first preset time period, the mobile phone 100 may automatically return to a previous main interface. For example, as shown in FIG. 10B(b), if the mobile phone 100 does not receive an operation of the user in the first preset time period after displaying the first editing interface 1002 on the first screen 901, the mobile phone 100 may automatically display the interface shown in FIG. 10B(a). For example, the first preset time period may be any duration such as 5 seconds (s), 10 s, or 8 s.

In this embodiment of this application, in response to the operation of the user, the mobile phone 100 may display an interface for editing the transaction cards on the first screen or the second screen. In this way, the mobile phone may provide the user with functions of adjusting the arrangement order of the transaction cards on the first screen or the second screen and deleting a transaction card on the editing interface.

In other embodiments, the mobile phone 100 may further receive a first operation of the user on a third transaction card displayed on the first screen, or receive a first operation of the user on a fourth transaction card displayed on the second screen. In response to the first operation of the user on the third transaction card, the mobile phone 100 may display the third transaction card on the first screen, and display a detail page of the third transaction card on the second screen. In response to the first operation of the user on the fourth transaction card, the mobile phone 100 may display the fourth transaction card on the second screen, and display a detail page of the fourth transaction card on the first screen.

The detail page may include one or more pieces of information, such as payment information, a transaction record, a balance, and a use time of a corresponding transaction card. The first operation may be any operation, such as a tapping operation, a double-tapping operation, or a touch and hold operation of the user on any transaction card on the first screen or the second screen. The first operation is different from the fifth operation, the fourth operation, and the sixth operation described above.

Figure 10D:
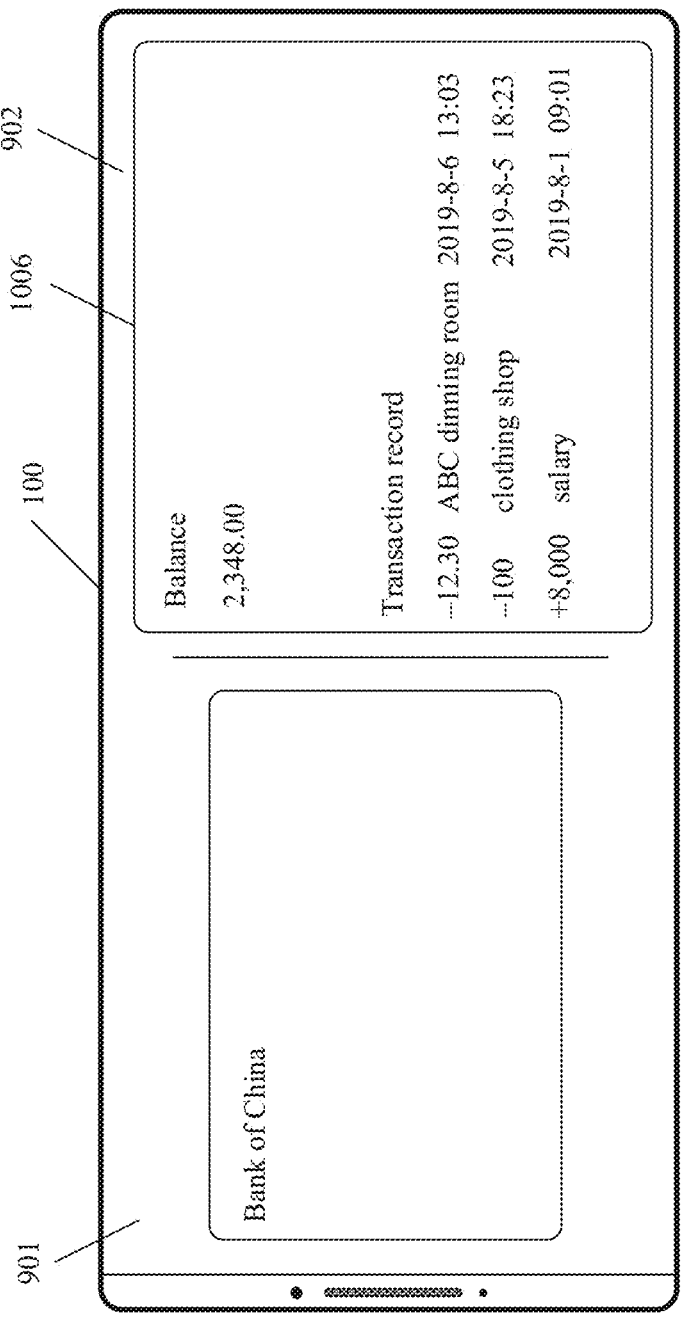
FIG. 10D is a schematic diagram of a display interface of a mobile phone according to an embodiment of this application.

For example, the mobile phone 100 may receive a first operation (not shown in the drawing) of the user on the transaction card of Bank of China shown in FIG. 10B(a). In response to the first operation of the user on the transaction card of Bank of China, the mobile phone 100 may display the transaction card of Bank of China on the first screen, and display, on the second screen 902, a detail page 1006 of the transaction card of Bank of China shown in FIG. 10D. The detail page 1006 includes a transaction record, a balance, and a use time of the transaction card of Bank of China.

In other embodiments, the transaction card may alternatively be a traffic electronic payment card, for example, a bus electronic payment card of WeChat, a map electronic payment card of WeChat, a bus electronic payment card of Alipay, or a metro electronic payment card of Alipay. A detail page of the traffic electronic payment card may include real-time running information of a corresponding vehicle. For example, a detail page of the metro electronic payment card may include real-time running information of a metro line closest to a current geographical location of the mobile phone 100, for example, a metro arrival time.

In this embodiment of this application, in response to the first operation of the user on any transaction card on the first screen or the second screen, the mobile phone 100 may display a detail page of a corresponding transaction card. In this way, the user can conveniently view payment information, a transaction record, a balance, a use time, and the like of each transaction card.

In other embodiments, the mobile phone 100 may further receive a second operation of the user on a fifth transaction card displayed on the first screen, or receive a second operation of the user on a sixth transaction card displayed on the second screen. In response to the second operation of the user on the fifth transaction card displayed on the first screen, the mobile phone 100 may display the fifth transaction card on the first screen, and display, on the second screen, another transaction card that matches the fifth transaction card. In response to the second operation of the user on the sixth transaction card displayed on the second screen, the mobile phone 100 may display the sixth transaction card on the second screen, and display, on the first screen, another transaction card that matches the sixth transaction card.

That one transaction card (for example, a transaction card a) matches another transaction card (for example, a transaction card b) may be specifically: when the transaction card a is used, a use frequency or a quantity of use times of the transaction card b is higher than a second preset threshold. In other words, a frequency or a quantity of times of simultaneously using the transaction card a and the transaction card b is higher than the second preset threshold. For example, the mobile phone 100 may learn, by collecting statistics, that a frequency or a quantity of times of simultaneously using a supermarket membership card and an electronic payment card of Alipay is higher than the second preset threshold. In other words, when shopping in a supermarket, the user usually uses the supermarket membership card and the electronic payment card of Alipay simultaneously.

Figure 10E:
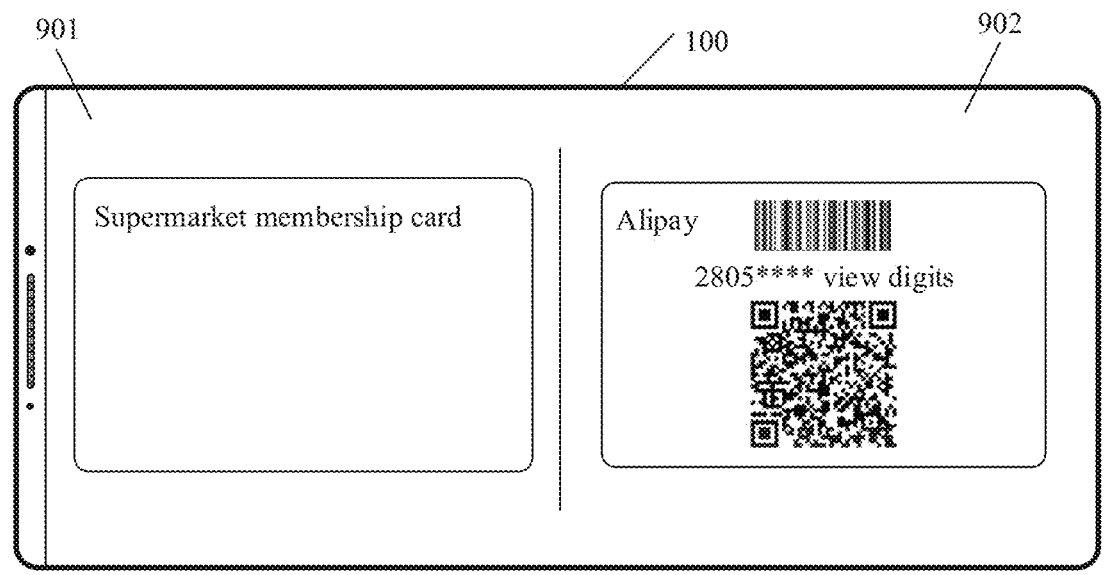
FIG. 10E is a schematic diagram of a display interface of a mobile phone according to an embodiment of this application.
Figure 10F:
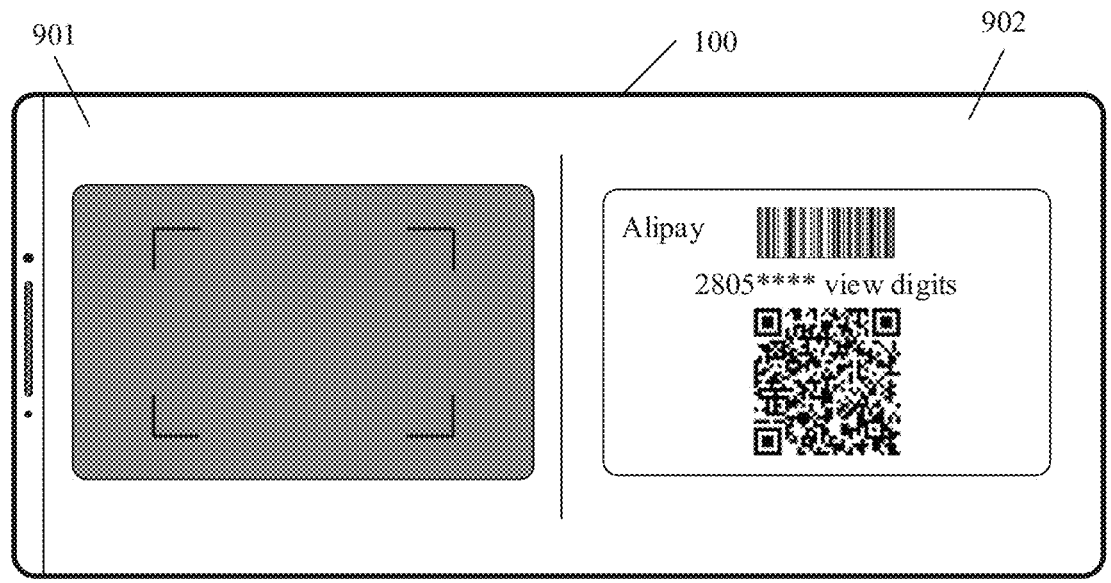
FIG. 10F is a schematic diagram of a display interface of a mobile phone according to an embodiment of this application.

For example, as shown in FIG. 10F, the mobile phone 100 may display a scanning interface on the first screen 901, and display the electronic payment card of Alipay on the second screen 902. For another example, the mobile phone 100 may receive a second operation (not shown in the figure) of the user on the supermarket membership card. In response to the second operation of the user on the supermarket membership card, the mobile phone 100 may display the supermarket membership card on the first screen 901, and display, on the second screen 902, the electronic payment card of Alipay shown in FIG. 10E. When the user uses the mobile phone 100 to make payment, the mobile phone 100 displays the supermarket membership card and the electronic payment card of Alipay simultaneously. In this way, after scanning the supermarket membership card, a cashier can directly scan a payment code of the electronic payment card of Alipay to collect money. This can simplify a payment operation.

In some embodiments, the mobile phone 100 may include a plurality of transaction cards. The mobile phone 100 may automatically classify the plurality of transaction cards. For example, the mobile phone 100 may classify the plurality of transaction cards into at least the following five types: an identification card, a bank card (also referred to as a physical payment card), a voucher card, an electronic card (also referred to as an application card), a daily card, and the like.

For example, the identification card may include a card that can indicate an identity of the user, such as an identity card, a social security card, or a passport. The bank card may include an electronic card of each bank, for example, a transaction card of Bank of China, a transaction card of China Construction Bank, and a transaction card of China Merchants Bank. The voucher card may include a movie ticket, a train ticket, an airplane ticket, an entrance ticket (for example, an attraction ticket, a concert ticket, and an exposition ticket), or the like. The application card may include a transaction card corresponding to each application, for example, an electronic payment card of Alipay and an electronic payment card of WeChat. The application card may include a payment code of a corresponding application. As shown in FIG. 6(d), the electronic payment card 601 of Alipay includes an electronic payment code. The daily card may include a transaction card such as a bus card, an entrance guard card, or a car key.

It should be noted that a method for classifying the plurality of transaction cards by the mobile phone 100 includes but is not limited to the foregoing classification method. This is not limited in this embodiment of this application. Certainly, the mobile phone 100 may further receive settings of the user, and classify the plurality of transaction cards.

The at least one transaction card displayed on the mobile phone 100 may include a transaction card that is of a same type as the preset transaction card among the plurality of transaction cards. For example, it is assumed that the preset transaction card includes the electronic payment card 601 of Alipay and the transaction card 602 of Bank of China. In this case, the at least one transaction card may include an application card corresponding to the electronic payment card 601 of Alipay and a bank card corresponding to the transaction card 602 of Bank of China. For example, as shown in FIG. 6(d), the application card corresponding to the electronic payment card 601 of Alipay may include the electronic payment card 601 of Alipay and the electronic payment card 603 of WeChat; and the bank card corresponding to the transaction card 602 of Bank of China may include the transaction card 605 of China Construction Bank and the transaction card 604 of China Merchants Bank.

In this embodiment of this application, the mobile phone 100 may display, based on types of transaction cards, at least one transaction card including the preset transaction card. It is assumed that the preset transaction card includes two types of transaction cards: a first type of transaction card (for example, a bank card "transaction card of Bank of China") and a second type of transaction card (for example, an application card "electronic payment card of Alipay"). In this case, the mobile phone 100 may display the first type of transaction card on the first screen of the foldable screen, and display the second type of transaction card on the second screen.

For example, as shown in FIG. 6(d), the mobile phone 100 displays the electronic payment card 601 of Alipay and the electronic payment card 603 of WeChat (that is, an application card, the second type of transaction card) on the second screen of the foldable screen; and displays the transaction card 605 of China Construction Bank, the transaction card 604 of China Merchants Bank, and the transaction card 602 of China (that is, a bank card, the first type of transaction card) on the first screen of the foldable screen.

The mobile phone 100 displays, in different display areas based on types of the transaction cards, at least one transaction card including the preset transaction card. Therefore, the user can conveniently view or search for transaction cards of a same type, and user experience can be improved.

It can be learned from the foregoing embodiment that a plurality of transaction cards may be managed in the wallet application of the mobile phone 100. The mobile phone 100 may automatically classify the plurality of transaction cards. Alternatively, the mobile phone 100 may further receive settings of the user, and classify the plurality of transaction cards. The mobile phone 100 may store and manage the plurality of transaction cards in the wallet application based on types.

It is assumed that the mobile phone 100 displays the first type of transaction card on the first screen, and displays the second type of transaction card on the second screen. In some embodiments, in response to a first folding operation of the user on the foldable screen, the mobile phone 100 may display a third type of transaction card on the first screen, and display a fourth type of transaction card on the second screen. The first type of transaction card, the second type of transaction card, the third type of transaction card, and the fourth type of transaction card are different types of transaction cards. For example, the first type of transaction card may be a bank card, the second type of transaction card may be an application card, the third type of transaction card may be an identification transaction card, and the fourth type of transaction card may be a voucher transaction card.

For example, the first folding operation may include an operation of folding the second screen along the foldable screen of the first screen and the second screen, to decrease an included angle between the first screen and the second screen within a first included angle range and then increase the included angle between the first screen and the second screen within the first included angle range. In other words, the first folding operation may be: the user controls the second screen to be folded along the foldable screen of the first screen and the second screen, to decrease the included angle between the first screen and the second screen within the first included angle range; and then controls the second screen to be folded along the foldable screen of the first screen and the second screen, to increase the included angle between the first screen and the second screen within the first included angle range. For example, the first included angle range may be (45°, 90°), (30°, 90°), or (40°, 90°).

It should be noted that, in the process of folding the second screen along the foldable screen of the first screen and the second screen, changes of included angles between the x-axis, the y-axis, and the z-axis of the first screen (for example, the gyro of the first screen) and the horizontal plane all fall within a second included angle range. For example, the second included angle range may be [0°, 10°], [0°, 15°], or [0°, 12°].

Figure 11A:
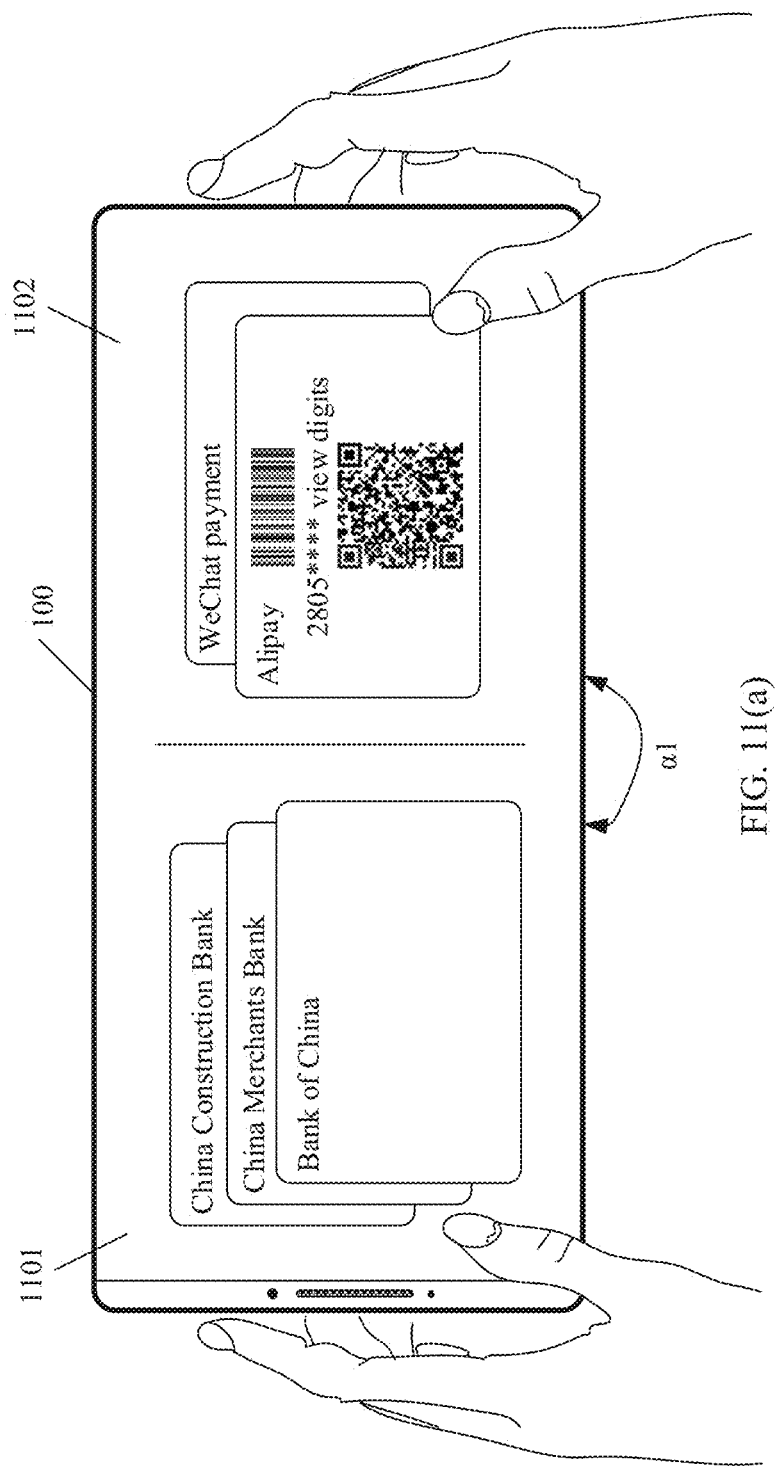
FIG. 11(a) to FIG. 11(c) each is a schematic diagram of a display interface of a mobile phone according to an embodiment of this application.
Figure 11B:
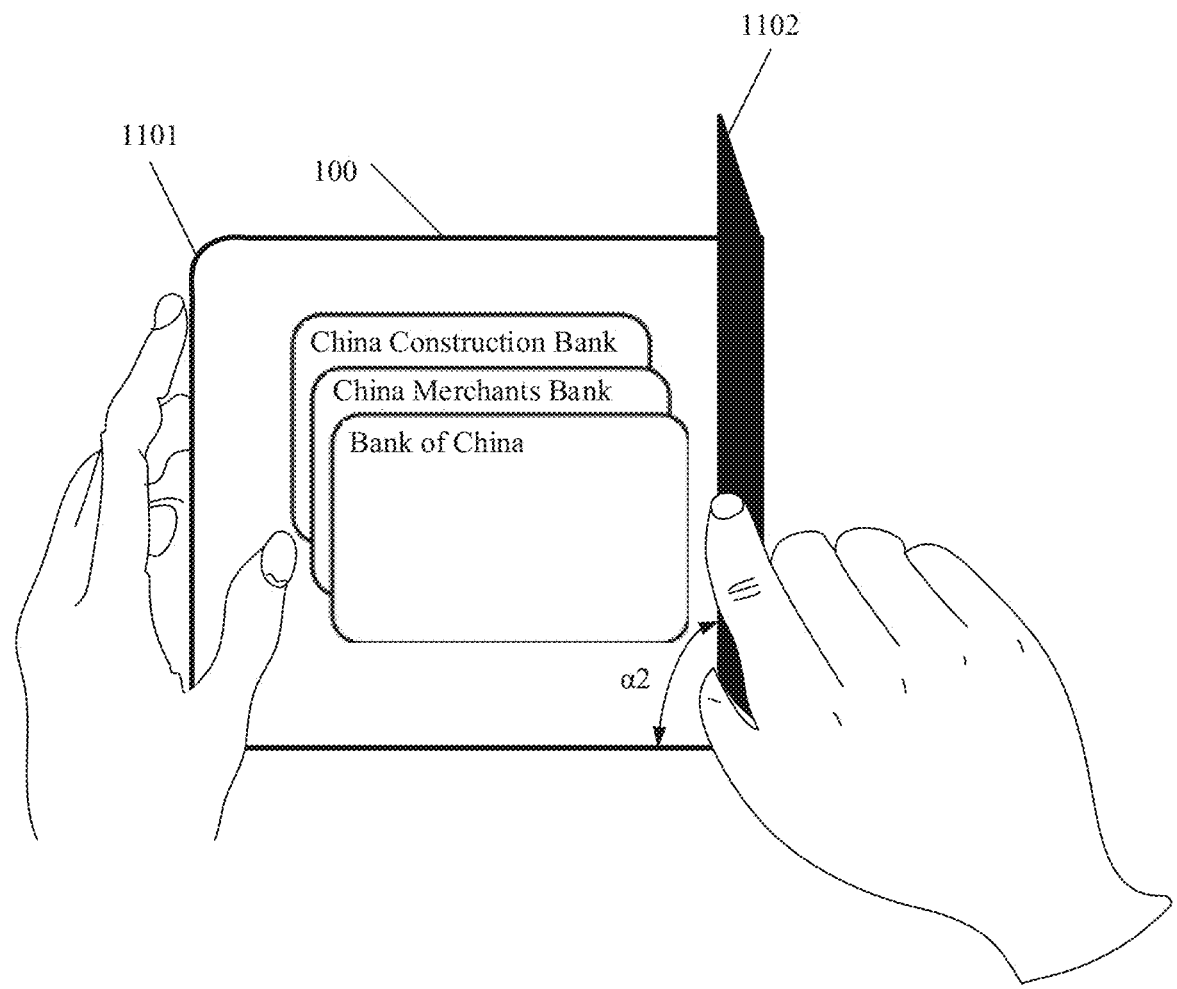
Figure 11C:
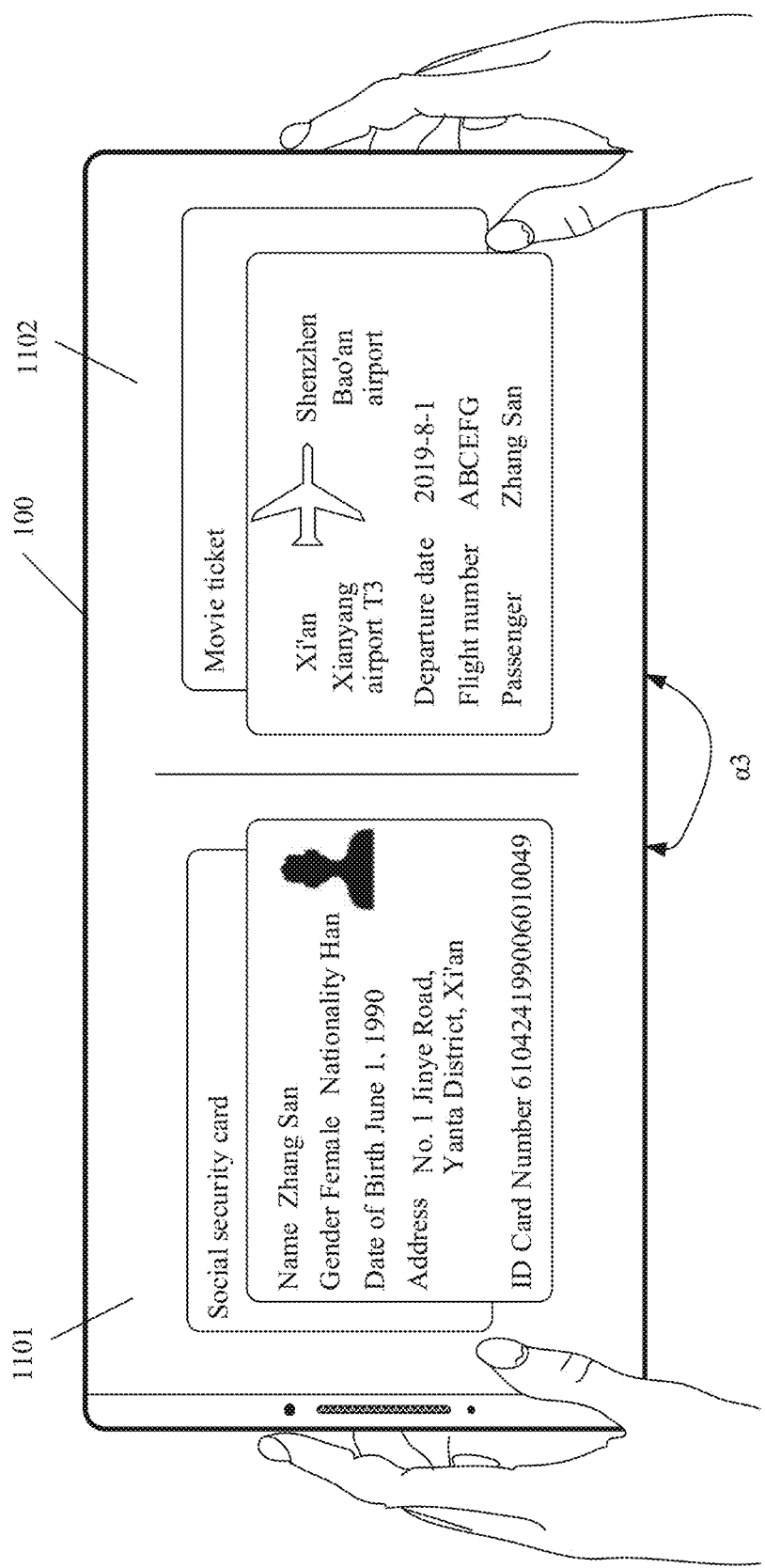

For example, the first folding operation may include: folding the second screen 1102 shown in FIG. 11(a) along the foldable side of the first screen 1101 and the second screen 1102, so that the included angle between the first screen 1101 and the second screen 1102 gradually changes from α1 shown in FIG. 11(a) to α2 shown in FIG. 11(b); and folding the second screen 1102 shown in FIG. 11(b) along the foldable side of the first screen 1101 and the second screen 1102, so that the included angle between the first screen 1101 and the second screen 1102 gradually changes from α1 shown in FIG. 11(b) to α3 shown in FIG. 11(c). α1>α2, and an angle difference between α1 and α2 is within the first included angle range. α2<α3, and an angle difference between α2 and α3 is within the first included angle range. α1 and α3 may be the same or different.

As shown in FIG. 11(a), the mobile phone 100 displays a bank card (that is, the first type of transaction card) on the first screen 1101, and displays an application card (that is, the second type of transaction card) on the second screen 1102. In response to the first folding operation corresponding to FIG. 11(a) to FIG. 11(c), as shown in FIG. 11(c), the mobile phone 100 may display an identification transaction card (that is, the third type of transaction card) on the first screen 1101, and display a voucher transaction card (that is, the fourth type of transaction card) on the second screen 1102.

Further, after the mobile phone 100 displays the third type of transaction card on the first screen, and displays the fourth type of transaction card on the second screen, the method in this embodiment of this application may further include: in response to a second folding operation of the user on the foldable screen, the mobile phone 100 may display the first type of transaction card on the first screen, and display the second type of transaction card on the second screen.

The second folding operation may include an operation of folding the first screen along the foldable screen of the first screen and the second screen, to decrease the included angle between the first screen and the second screen within the first included angle range and then increase the included angle between the first screen and the second screen within the first included angle range. In other words, the first folding operation may be: the user controls the first screen to be folded along the foldable screen of the first screen and the second screen, to decrease the included angle between the first screen and the second screen within the first included angle range; and then controls the first screen to be folded along the foldable screen of the first screen and the second screen, to increase the included angle between the first screen and the second screen within the first included angle range.

It should be noted that, in the process of folding the first screen along the foldable screen of the first screen and the second screen, changes of included angles between the x-axis, the y-axis, and the z-axis of the first screen (for example, the gyro of the first screen) and the horizontal plane all fall within the second included angle range.

Figure 12A:
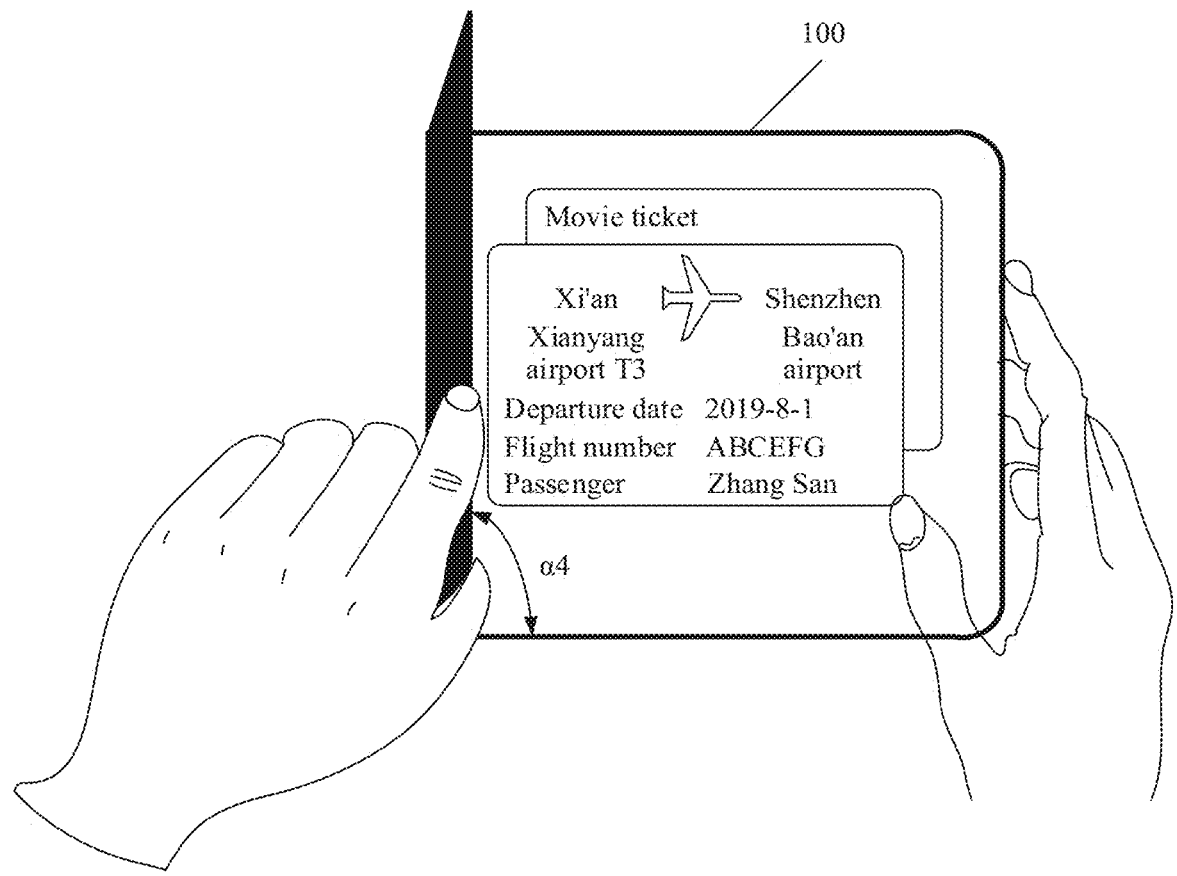
FIG. 12A(a) and FIG. 12A(b) each is a schematic diagram of a display interface of a mobile phone according to an embodiment of this application.
Figure 12A:
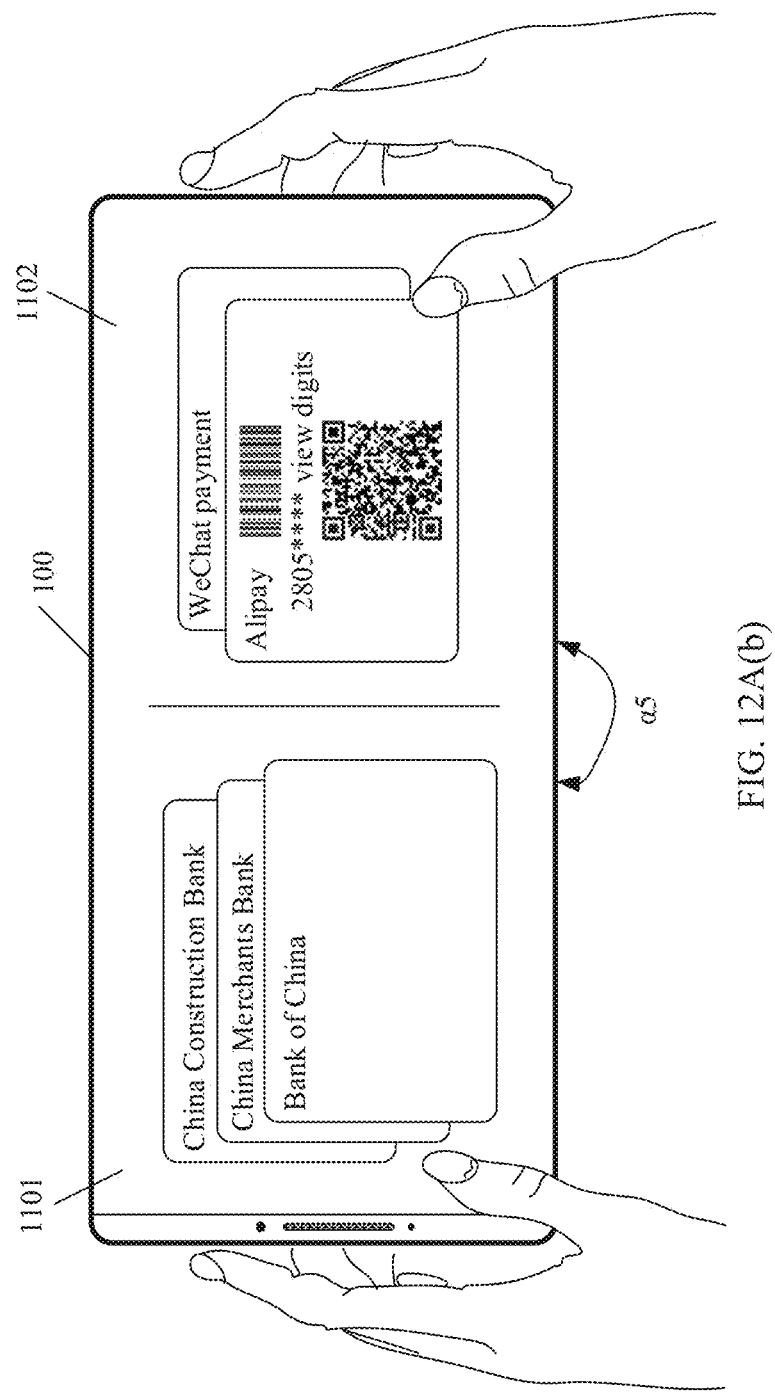

For example, the second folding operation may include: folding the first screen 1101 shown in FIG. 11(c) along the foldable side of the first screen 1101 and the second screen 1102, so that the included angle between the first screen 1101 and the second screen 1102 gradually changes from α3 shown in FIG. 11(c) to α4 shown in FIG. 12A(a); and folding the first screen 1101 shown in FIG. 12A(a) along the foldable side of the first screen 1101 and the second screen 1102, so that the included angle between the first screen 1101 and the second screen 1102 gradually changes from α1 shown in FIG. 12A(a) to α5 shown in FIG. 12A(b). α3>α4, and an angle difference between α3 and α4 is within the first included angle range. α4<α5, and an angle difference between α4 and α5 is within the first included angle range. α3 and α5 may be the same or different.

In response to the second folding operation corresponding to FIG. 11(c), FIG. 12A(a), and FIG. 12A(b), as shown in FIG. 12A(b), the mobile phone 100 may display a bank card (that is, the first type of transaction card) on the first screen 1101, and display an application card (that is, the second type of transaction card) on the second screen 1102.

It may be understood that a wallet (that is, a billfold) daily used by the user may include a plurality of interlayers, and that a plurality of cards may be placed in each interlayer. In this embodiment of this application, the mobile phone 100 may store a plurality of types of transaction cards, and each type of transaction card may include a plurality of transaction cards. In addition, the mobile phone 100 may display one type of transaction card on each of the first screen and the second screen. In response to the first folding operation or the second folding operation, the mobile phone 100 switches and displays different types of transaction cards on the first screen and the second screen. This is equivalent to turning pages of the interlayers of the wallet, so that the user can view cards placed in each interlayer.

In this embodiment of this application, the mobile phone 100 may switch and display different types of transaction cards on the first screen and the second screen in response to the first folding operation or the second folding operation with reference to behavior of turning the pages of the interlayers of the wallet to search for a card when the user daily uses the wallet (that is, the billfold). In this way, a card search manner that complies with a daily habit of the user can be provided for the user, and user experience can be improved.

Figure 12B:
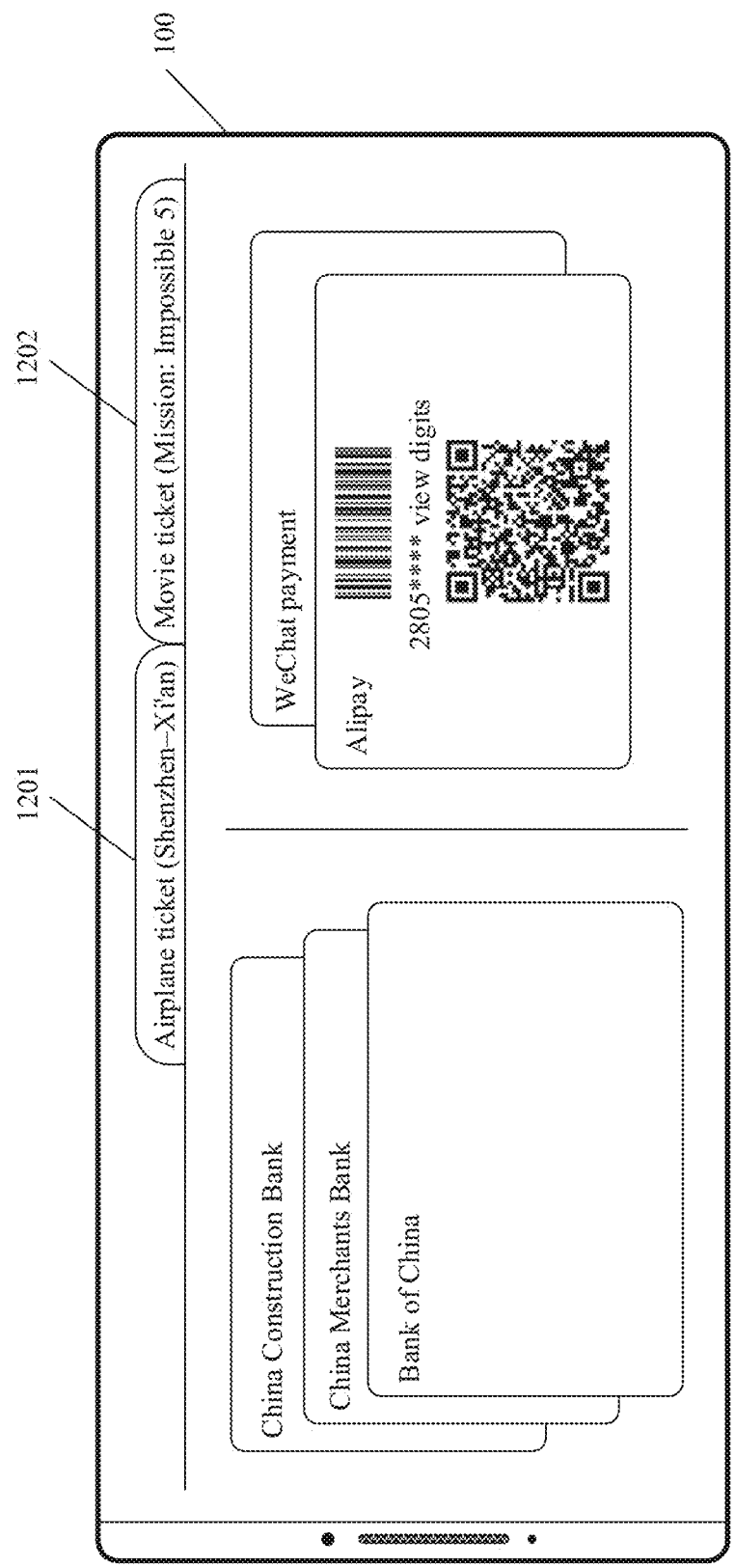
FIG. 12B is a schematic diagram of a display interface of a mobile phone according to an embodiment of this application.

It may be understood that the voucher transaction card (such as a movie ticket, a train ticket, an airplane ticket, or a concert ticket) has relatively strong time validity. Generally, the user will use the voucher transaction card in the near future. The mobile phone 100 may not only display at least one transaction card on the first screen and the second screen, but also display a label of one or more voucher cards on the foldable screen (for example, the upper right), so that the user can use the voucher transaction card conveniently. For example, as shown in FIG. 12B, the mobile phone 100 may display a label 1202 of the movie ticket and a label 1201 of the airplane ticket on the upper right of the foldable screen.

In response to a tapping operation of the user on a label of any transaction card, the mobile phone 100 may display a detail page of the corresponding transaction card on the foldable screen. For example, in response to a tapping operation of the user on the label 1202 of the movie ticket shown in FIG. 12B, the mobile phone 100 may display the movie ticket 800 (that is, the detail page of the movie ticket) shown in FIG. 8B.

In one embodiment, the label of the transaction card may further include key information of the corresponding transaction card. For example, as shown in FIG. 12B, the label 1202 of the movie ticket may include a movie name, and the label 1201 of the airplane ticket may further include names of a place of departure and a destination.

It should be noted that the mobile phone 100 may display labels of all voucher transaction cards in the wallet application on the foldable screen. Alternatively, the mobile phone 100 may display, on the foldable screen, a label of a voucher transaction card whose use time is in a second preset time period in the wallet application. The second preset time period may be N days starting from a current time, where N may be 1, 2, 5, 15, 30, or the like.

In one embodiment, if a voucher transaction card has been used, or the transaction card has expired (that is, a valid use time has expired), the mobile phone 100 may not display a label of the transaction card on the foldable screen. Certainly, the mobile phone 100 may further delete the transaction card from the wallet application.

In this embodiment of this application, when the mobile phone 100 detects that the mobile phone 100 in the folded state is horizontally held and then horizontally unfolded, the mobile phone 100 may not only display at least one transaction card on the first screen and the second screen, but also display the label of one or more voucher transaction cards on the foldable screen (for example, the upper right). In this way, the user can conveniently view and use the voucher transaction card, and user experience can be improved.

In other embodiments, when displaying at least one transaction card on the foldable screen, the mobile phone 100 may receive a third operation of the user. In response to the third operation, a preset application or a preset function may be started. For example, the preset application may be the camera application, a flashlight application, or a voice assistant application. The preset function may be a function such as scanning or screen locking.

For example, the third operation may include a fifth sliding operation and a sixth sliding operation. The fifth sliding operation may be a bottom-up sliding operation input by the user on the first screen, and the sixth sliding operation may be a bottom-up sliding operation input by the user on the second screen. Alternatively, the fifth sliding operation may be a top-down sliding operation input by the user on the first screen, and the sixth sliding operation may be a top-down sliding operation input by the user on the second screen. The fifth sliding operation and the sixth sliding operation may be sliding operations of the user at a blank position (that is, a position at which no transaction card is displayed) of the foldable screen.

Alternatively, the third operation may be a second preset gesture input by the user on the foldable screen. For example, the second preset gesture may be an S-shaped gesture, a √-shaped gesture, an L-shaped gesture, or an O-shaped gesture. The second preset gesture is different from the first preset gesture. The third operation is different from the sixth operation.

Figure 13:
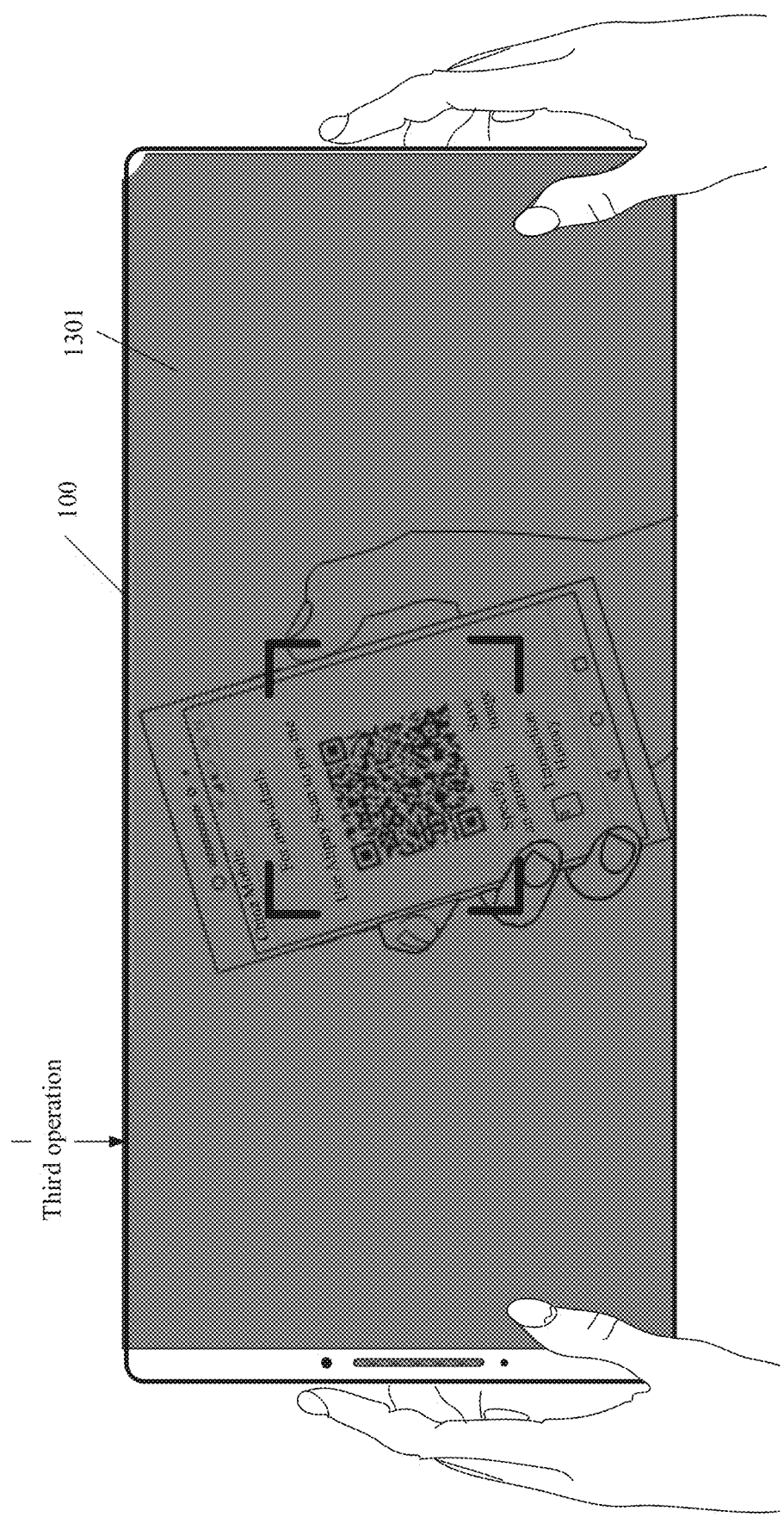
FIG. 13 is a schematic diagram of a display interface of a mobile phone according to an embodiment of this application.

For example, when displaying the first interface shown in FIG. 12A(b) or FIG. 12B, the mobile phone 100 may start a scanning function in response to the third operation of the user, and display a scanning interface 1301 shown in FIG. 13.

In other embodiments, when displaying the first interface, the mobile phone 100 may display, in response to the third operation, a widget area including one or more control icons. Each control icon is used to start a preset application or a preset function. For example, the preset application or the preset function may include: exchange rate conversion, scanning, account book, calculator, quick recharge, and utilities payment.

Figure 14:
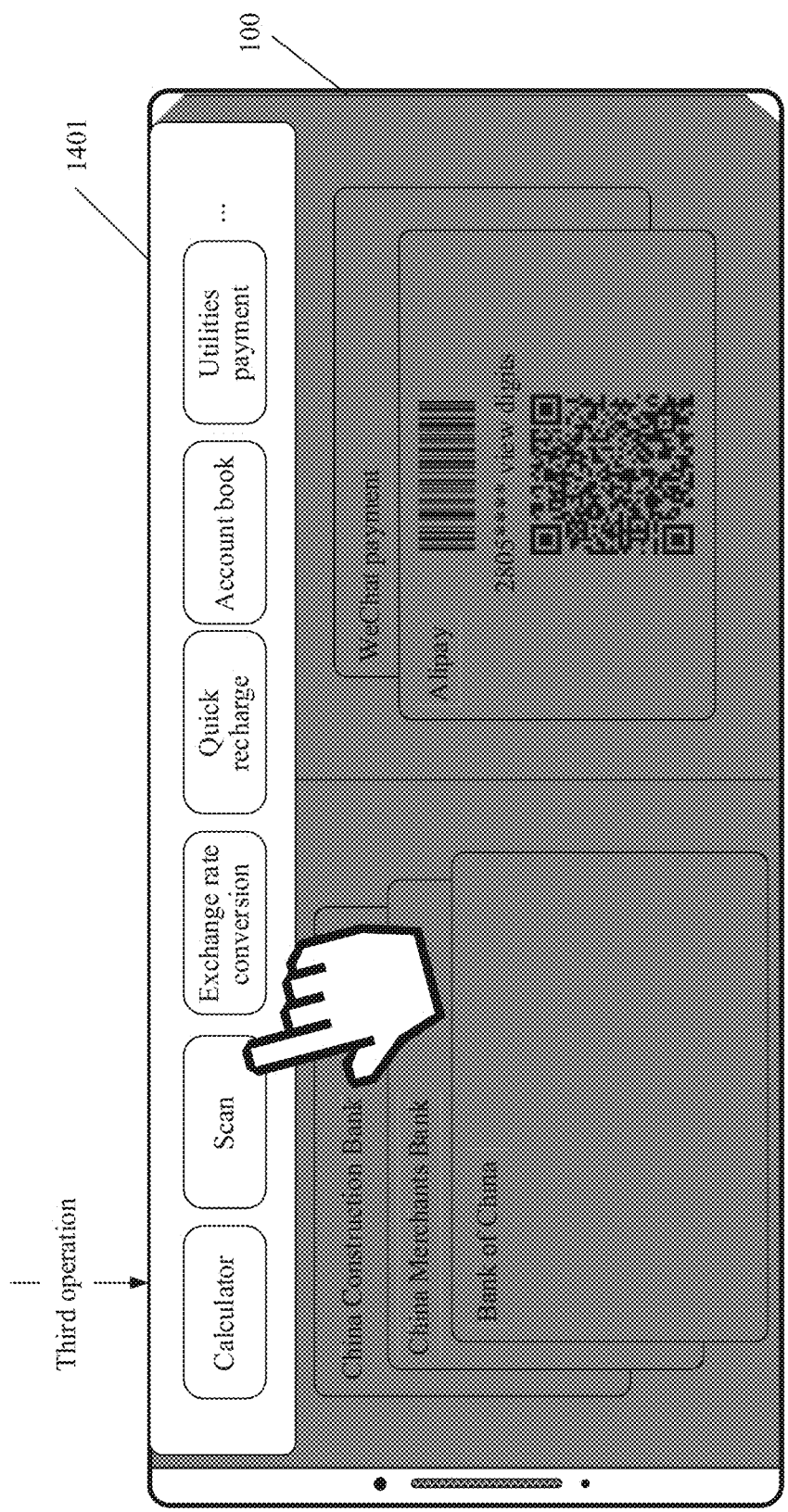
FIG. 14 is a schematic diagram of a display interface of a mobile phone according to an embodiment of this application.

For example, when displaying the first interface shown in FIG. 12A(b) or FIG. 12B, the mobile phone 100 may display, in response to the third operation of the user, a widget area 1401 shown in FIG. 14. The widget area 1401 includes a calculator control, an exchange rate conversion control, a scanning control, an account book control, a quick recharge control, a utilities payment control, and the like. For example, the calculator control is used to trigger the mobile phone 100 to start a calculator application, and display an interface of a calculator. The scanning control is used to trigger the mobile phone 100 to start the scanning function, and display the scanning interface 1301 shown in FIG. 13. The exchange rate conversion control is used to trigger the mobile phone 100 to start an exchange rate conversion function and display an exchange rate conversion interface.

In this embodiment of this application, in response to the third operation of the user, the mobile phone 100 may start the preset application or the preset function, or display the widget area including the control of the preset application or the preset function. In this way, by performing the third operation, the user can control the mobile phone 100 to quickly start the preset application or the preset function, so that more convenient and comfortable operation experience can be provided for the user.

In other embodiments, the preset function may be the photographing function, and the first interface may be the viewfinder interface of the camera application. In other words, when the mobile phone 100 is in the folded state and is horizontally held, if the mobile phone 100 detects that the mobile phone 100 is horizontally unfolded, the mobile phone 100 may start the camera, and display the viewfinder interface of the camera.

That the mobile phone 100 detects that the mobile phone 100 is horizontally unfolded may be specifically: the mobile phone 100 detects that a change of the first screen (for example, the screen A) and/or the second screen (for example, the screen B) in compliance with the preset condition occurs.

It should be noted that a manner in which the mobile phone 100 displays at least one transaction card in the foregoing embodiment may be different from a manner in which the mobile phone 100 is horizontally unfolded when the mobile phone displays the viewfinder interface in this embodiment. For example, when the mobile phone 100 is in the folded state and is horizontally held, if the mobile phone 100 detects that no change of the screen A in compliance with the preset condition occurs but detects that a change of the screen B in compliance with the preset condition occurs, the mobile phone 100 may display the at least one transaction card. However, when the mobile phone 100 is in the folded state and is horizontally held, if the mobile phone 100 detects that no change of the screen B in compliance with the preset condition occurs but detects that a change of the screen A in compliance with the preset condition occurs, the mobile phone 100 may start the camera, and display the viewfinder interface.

In this embodiment of this application, when the mobile phone 100 is in the folded state and is horizontally held, if the mobile phone 100 detects that the mobile phone 100 is horizontally unfolded, the mobile phone 100 may automatically start the camera, and display the viewfinder interface of the mobile phone 100, so that the user can conveniently shoot a picture. In this way, the user can horizontally hold the mobile phone 100 in the folded state, and then horizontally unfold the foldable screen, to operate the mobile phone 100 to quickly start the camera. This can provide more convenient and comfortable shooting experience for the user.

In other embodiments, if the mobile phone 100 is in the folded state and is horizontally held, when detecting that the mobile phone 100 is horizontally unfolded, the mobile phone 100 may further obtain an included angle between the direction vector of the orientation of the first screen or the second screen and the horizontal plane, to determine to display at least one transaction card or the viewfinder interface.

Generally, when the included angle between the direction vector of the orientation of the first screen or the second screen and the horizontal plane is close to 90° (that is, the first screen or the second screen is nearly parallel to the horizontal plane), there is a high possibility that the user wants to use the transaction card in the mobile phone 100 to perform a transaction. However, when the included angle between the direction vector of the orientation of the first screen or the second screen and the horizontal plane is close to 0° (that is, the first screen or the second screen is nearly perpendicular to the horizontal plane), there is a high possibility that the user uses the mobile phone 100 to shoot an image.

Figure 15A:
FIG. 15A(a) to FIG. 15A(d) are schematic diagrams of screen orientations of a mobile phone according to an embodiment of this application.
Figure 15A:
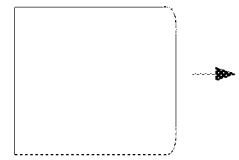
Figure 15A:
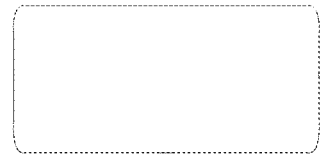

Therefore, if the included angle between the direction vector of the orientation of the first screen or the second screen and the horizontal plane falls within a second angle range, the mobile phone 100 may display at least one transaction card. In other words, the first interface includes at least one transaction card. The second angle range is [m1, 90°]. For example, m1 may be an angle value close to 90°, such as 85°, 86°, 89°, or 80°. For example, as shown in FIG. 15A(a), it is assumed that the mobile phone is in the folded state and is horizontally held. As shown in FIG. 15A(b), when the mobile phone 100 is horizontally unfolded, the direction vector of the orientation of the foldable screen (the first screen and the second screen) is perpendicular to the horizontal plane, and the foldable screen is parallel to the horizontal plane. In this case, the mobile phone 100 may display at least one transaction card.

If the included angle between the direction vector of the orientation of the first screen or the second screen and the horizontal plane falls within a third angle range, the mobile phone 100 may display the viewfinder interface. In other words, the first interface is the viewfinder interface of the camera. The third angle range is [0°, m2]. For example, m2 may be an angle value close to 0°, such as 5°, 8°, 10°, or 7°. For example, as shown in FIG. 15A(c), it is assumed that the mobile phone is in the folded state and is horizontally held. As shown in FIG. 15A(d), when the mobile phone 100 is horizontally unfolded, the direction vector of the orientation of the foldable screen (the first screen and the second screen) is parallel to the horizontal plane, and the foldable screen is perpendicular to the horizontal plane. In this case, the mobile phone 100 may display the viewfinder interface.

It should be noted that, in this embodiment of this application, the mobile phone 100 may obtain the direction vector of the orientation of the corresponding screen by using the gyro sensor in the first screen or the second screen. For a method for obtaining the direction vector of the orientation of the corresponding screen by the mobile phone 100 by using the gyro sensor, refer to a related method in the conventional technology. Details are not described herein in this embodiment of this application.

In any one of the foregoing embodiments, to protect user privacy in the mobile phone 100, the mobile phone 100 may perform user identity authentication before displaying the at least one transaction card or the first interface. The mobile phone 100 may perform user identity authentication in any manner such as human face recognition, fingerprint recognition, iris recognition, or password authentication.

For example, when the mobile phone 100 is in the folded state and is horizontally held, if the mobile phone 100 detects that the mobile phone 100 is horizontally unfolded, the mobile phone 100 may start the camera to capture a face image, to perform human face recognition. The mobile phone 100 can display the at least one transaction card or the first interface only if the human face recognition succeeds. In this way, the mobile phone 100 can perform user identity authentication without being perceived by the user, to protect user privacy in the mobile phone 100.

For another example, a fingerprint sensor (for example, a fingerprint sensor 480H) may be disposed under the display screen (for example, the first screen or the second screen) of the foldable screen of the mobile phone 100. Alternatively, the fingerprint sensor 480H may be disposed on a side frame of the foldable screen. When the mobile phone 100 is in the folded state and is horizontally held, the mobile phone 100 can capture fingerprint information input by the user to perform fingerprint recognition (that is, user identity authentication) only if the mobile phone 100 detects that the mobile phone 100 is horizontally unfolded. The mobile phone 100 can display the at least one transaction card or the first interface only if the fingerprint recognition succeeds.

In one embodiment, when the mobile phone 100 is in the folded state and is horizontally held, if the mobile phone 100 detects that the mobile phone 100 is horizontally unfolded, the mobile phone 100 may further prompt the user to input a fingerprint at a corresponding position of the fingerprint sensor 480H.

The mobile phone 100 displays the at least one transaction card or the first interface only after the user authentication succeeds. In this way, privacy information stored in the mobile phone 100 can be protected from leakage, and security performance of the mobile phone 100 can be improved.

In other embodiments, when the mobile phone 100 is in the folded state and is vertically held, if the mobile phone 100 detects that the mobile phone 100 is vertically unfolded, the mobile phone 100 performs user authentication. If the user identity authentication succeeds, the mobile phone 100 displays a third interface.

It should be noted that, for a method for detecting, by the mobile phone, that the mobile phone 100 is vertically held and vertically unfolded, refer to related descriptions in the foregoing embodiment. Details are not described herein in this embodiment of this application.

For example, the third interface may be an interface (which may be referred to as privacy space) of an application to which an application lock is added. For example, the application to which the application lock is added may include a gallery application or a payment application (such as Alipay, WeChat, or a bank application) to which the application lock is added.

For example, it is assumed that the gallery application of the mobile phone 100 is the application to which the application lock is added. Generally, the mobile phone 100 may display the lock screen interface or main interface in response to an unfolding operation of the user on the foldable screen. For example, it is assumed that the mobile phone 100 displays the main interface. In response to a tapping operation of the user on an icon of the gallery application displayed on the main interface of the mobile phone 100, the mobile phone 100 may perform user identity authentication (for example, display a password entry interface). The mobile phone 100 can display a home page of the gallery application, that is, the third interface, only if the user identity authentication succeeds.

However, in this embodiment of this application, when the mobile phone 100 is in the folded state and is vertically held, if the mobile phone 100 detects that the mobile phone 100 is vertically unfolded, the mobile phone 100 may perform user identity authentication (for example, human face recognition). In this way, after the user identity authentication succeeds, the mobile phone 100 may display the foregoing third interface. This simplifies a user operation when the mobile phone 100 starts the application of the application lock on the unfolded foldable screen, so that more convenient and comfortable operation experience can be provided for the user.

In other instances, an NFC apparatus that can interact with an NFC card reader to complete a transaction may be disposed in each of the first screen and the second screen of the mobile phone 100. The NFC apparatus may be a chip or an antenna. For example, an NFC apparatus 1 is disposed in the first screen, and an NFC apparatus 2 is disposed in the second screen.

Figure 16A:
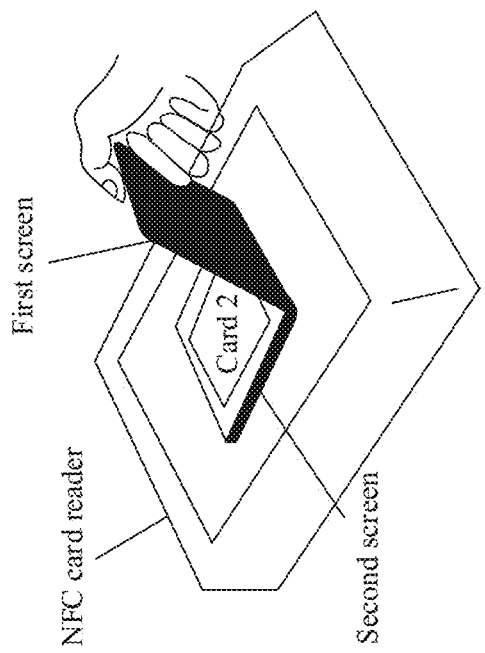
FIG. 16A(a) to FIG. 16A(c) each is a schematic diagram of a usage scenario of a mobile phone according to an embodiment of this application.
Figure 16A:
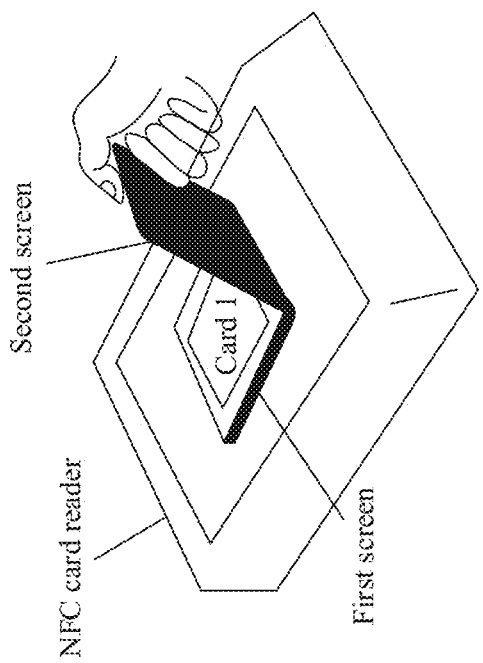
Figure 16A:
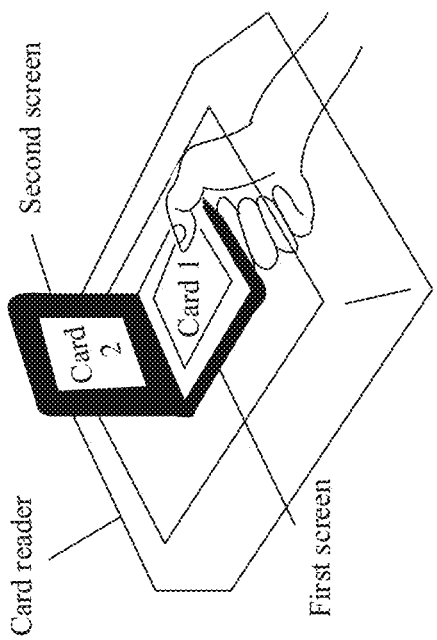
Figure 16B:
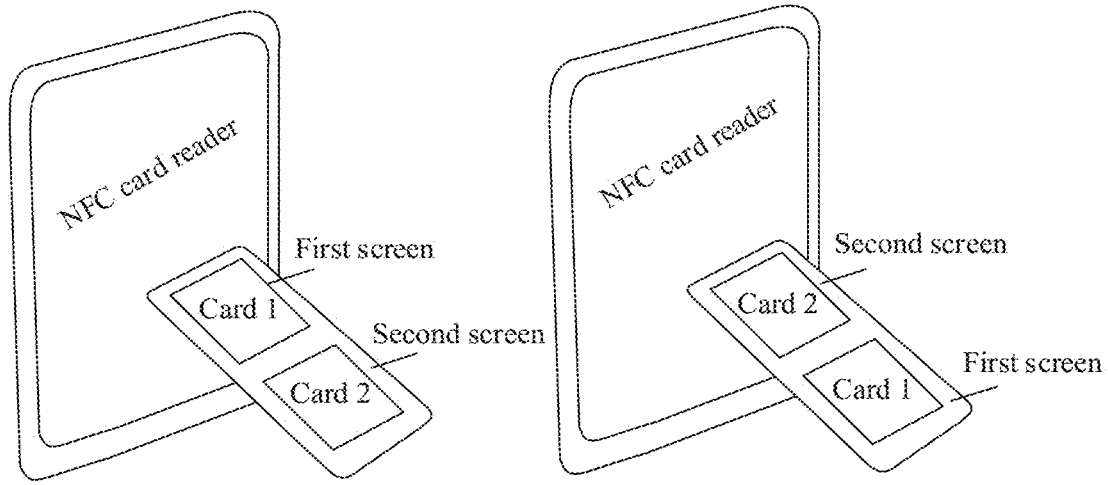
FIG. 16B(a) and FIG. 16B(b) each is a schematic diagram of a usage scenario of a mobile phone according to an embodiment of this application.

When the mobile phone 100 in the folded state detects that the mobile phone 100 is horizontally held and horizontally unfolded, the mobile phone 100 may separately display one or more transaction cards on the first screen and the second screen. For example, as shown in FIG. 16A(a) to FIG. 16A(c), or FIG. 16B(a) and FIG. 16B(b), a transaction card 1 (that is, the card 1) is displayed on the first screen, and a transaction card 2 (that is, the card 2) is displayed on the second screen.

In this case, if a distance between the NFC apparatus 1 and the NFC card reader is shorter than a distance between the NFC apparatus 2 and the NFC card reader, the mobile phone 100 may complete a transaction by using the transaction card displayed on the first screen. For example, as shown in FIG. 16A(a), FIG. 16A(c), or FIG. 16B(a), a distance between the first screen provided with the NFC apparatus 1 and the NFC card reader is shorter than a distance between the second screen provided with the NFC apparatus 2 and the NFC card reader. Therefore, the mobile phone 100 can complete a transaction by using the card 1 displayed on the first screen.

If a distance between the NFC apparatus 2 and the NFC card reader (or the POS machine) is shorter than a distance between the NFC apparatus 1 and the NFC card reader, the mobile phone 100 may complete a transaction by using the transaction card displayed on the second screen. For example, as shown in FIG. 16A(b) or FIG. 16B(b), a distance between the second screen provided with the NFC apparatus 2 and the NFC card reader is shorter than a distance between the first screen provided with the NFC apparatus 1 and the NFC card reader. Therefore, the mobile phone 100 can complete a transaction by using the card 2 displayed on the second screen.

The card 1 and the card 2 are transaction cards that can interact with the NFC apparatus to complete transactions. The card 1 may be a transaction card displayed at the top layer among one or more transaction cards displayed on the first screen. The card 2 may be a transaction card displayed at the top layer among one or more transaction cards displayed on the second screen.

Alternatively, the card 1 may be any transaction card that can use the NFC apparatus to complete a transaction among one or more transaction cards displayed on the first screen. The card 2 may be any transaction card that can use the NFC apparatus to complete a transaction among one or more transaction cards displayed on the second screen.

Alternatively, the card 1 may be a transaction card that is among one or more transaction cards displayed on the first screen and is to be accessed by an AID carried in a transaction instruction sent by the NFC card reader. The card 2 may be a transaction card that is among one or more transaction cards displayed on the second screen and is to be accessed by an AID carried in a transaction instruction sent by the NFC card reader.

In this embodiment of this application, the mobile phone 100 may determine, based on distances between the first screen and the second screen and a payment device (that is, the NFC card reader), which transaction card is used to complete a transaction. In this way, when the user wants to use a transaction card to perform a transaction, the user may horizontally hold the mobile phone 100 in the folded state and horizontally unfold the mobile phone 100, and then put one side of the mobile phone 100 that displays the transaction card, close to the NFC card reader. In this way, the mobile phone 100 can automatically complete the transaction by using the transaction card. Therefore, the user's operation of using a transaction card to perform a transaction on an electronic device in the unfolded state can be simplified, and more convenient and comfortable operation experience can be provided for the user.

In other embodiments, only one NFC apparatus may be disposed in the mobile phone 100. The NFC apparatus may be a chip or an antenna. When the mobile phone 100 is in the folded state, each of the first screen and the second screen of the mobile phone 100 may correspond to a default transaction card. For example, the default transaction card corresponding to the first screen is a bus card, and the default transaction card corresponding to the second screen is an entrance guard card.

In this embodiment, it is assumed that the foldable screen of the mobile phone 100 is an inward foldable screen. If the mobile phone 100 is in the folded state, and the direction vector of the orientation of the first screen is perpendicular (or nearly perpendicular) to the horizontal plane upwards, but the direction vector of the orientation of the second screen is perpendicular (or nearly perpendicular) to the horizontal plane downwards, that is, if the first screen is located below the second screen, when the mobile phone 100 approaches the NFC card reader (or the POS machine), the mobile phone 100 may receive a transaction instruction from the NFC card reader, and complete a transaction by using the default transaction card (such as a bus card) corresponding to the first screen.

If the mobile phone 100 is in the folded state, and the direction vector of the orientation of the second screen is perpendicular (or nearly perpendicular) to the horizontal plane upwards, but the direction vector of the orientation of the first screen is perpendicular (or nearly perpendicular) to the horizontal plane downwards, that is, if the second screen is located below the first screen, when the mobile phone 100 approaches the NFC card reader (or the POS machine), the mobile phone 100 may receive a transaction instruction from the NFC card reader, and complete a transaction by using the default transaction card (such as an entrance guard card) corresponding to the second screen.

In this embodiment of this application, the mobile phone 100 may obtain the direction vectors of the orientations of the corresponding screens by using the gyro sensors in the first screen and the second screen. For a method for obtaining the direction vectors of the orientations of the first screen and the second screen by the mobile phone 100, refer to a related method in the conventional technology. Details are not described herein in this embodiment of this application.

Certainly, the electronic device may also be the horizontally folded foldable-screen mobile phone 300 shown in FIG. 3(a) and FIG. 3(b). Generally, when using the horizontally folded foldable-screen mobile phone 300 shown in FIG. 3(a) and FIG. 3(b), the user is accustomed to horizontally holding the mobile phone 300 in the folded state, and then horizontally unfolding the foldable screen. For example, as shown in FIG. 3(b), the foldable screen of the mobile phone 300 is in the folded state, and is vertically held by the user.

In other words, when the user uses the horizontally folded foldable-screen mobile phone 300 shown in FIG. 3(a) and FIG. 3(b), "the mobile phone 300 in the folded state is horizontally held and horizontally unfolded" is a normal state in which the user uses the horizontally folded foldable-screen mobile phone. However, "the mobile phone 300 is vertically held and vertically unfolded" may be referred to as a special state in which the user uses the horizontally folded foldable-screen mobile phone. For example, FIG. 15B is a schematic diagram of the horizontally folded foldable-screen mobile phone 300 that is vertically unfolded.

It should be noted that, for a method in which the mobile phone 300 detects that the mobile phone 300 is vertically held and vertically unfolded, refer to the method in which the mobile phone 100 detects that the mobile phone 100 is horizontally held and horizontally unfolded in the foregoing embodiment. Details are not described herein in this embodiment of this application.

Figure 15B:
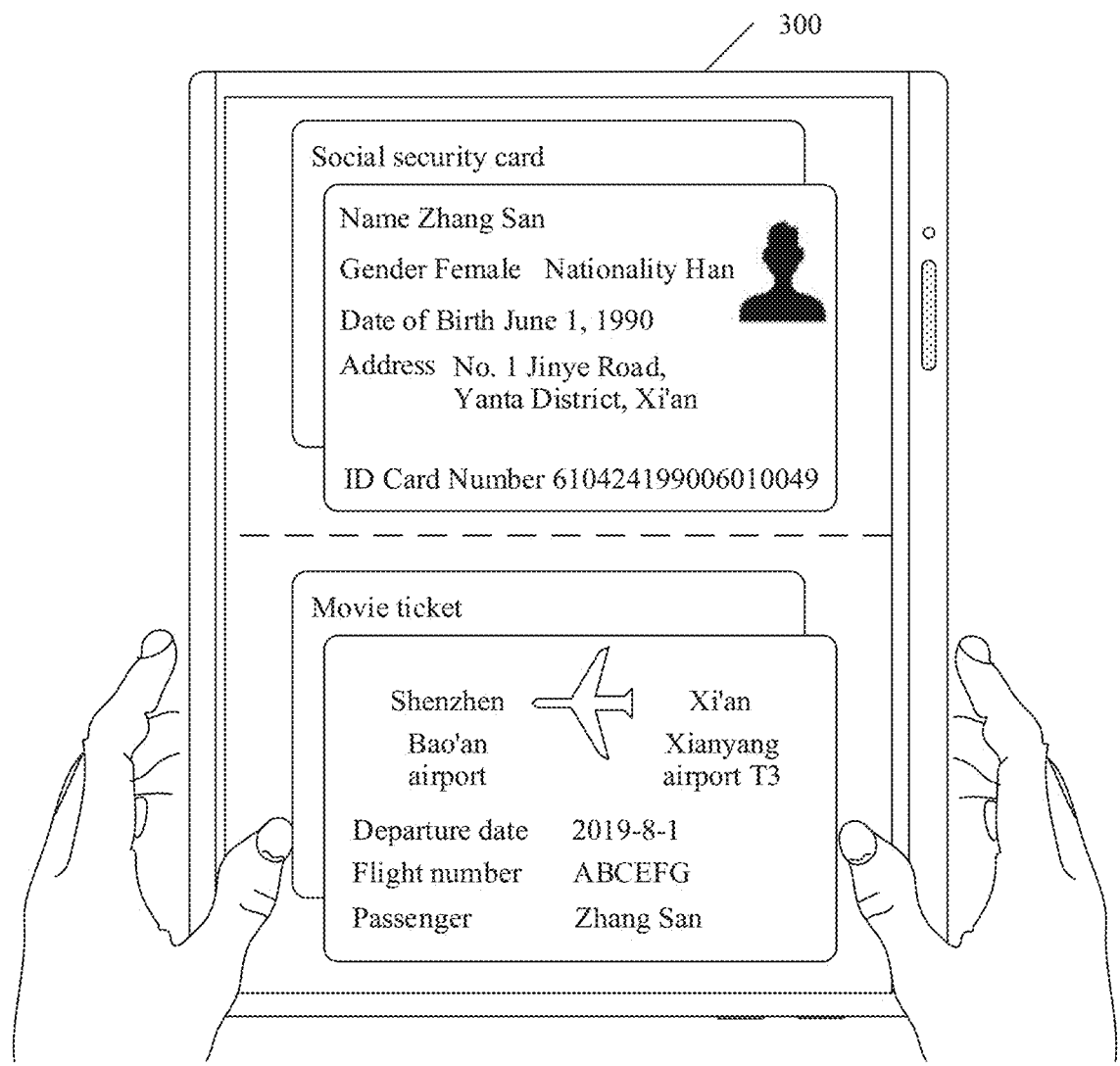
FIG. 15B is a schematic diagram of a display interface of a mobile phone according to an embodiment of this application.

In this embodiment of this application, when the mobile phone 300 detects that the mobile phone 300 in the folded state is vertically held and then vertically unfolded, as shown in FIG. 15B, the mobile phone 300 may automatically display at least one transaction card on the foldable screen in the unfolded state. In this way, the user's operation of starting an application or function on the foldable screen of the foldable-screen mobile phone in the unfolded state can be simplified, and user experience can be improved.

Other embodiments of this application provide a foldable electronic device. The electronic device may include a memory, a display screen, and one or more processors. As the electronic device is folded, the display screen of the electronic device is divided into a first screen and a second screen. The display screen, a microphone, and the memory are coupled to the processor. The electronic device may further include a camera. Alternatively, the electronic device may be connected to an external camera. The memory is configured to store computer program code, where the computer program code includes a computer instruction. When the processor executes the computer instruction, the electronic device may perform functions or operations performed by the mobile phone in the foregoing method embodiment. For a structure of the electronic device, refer to the structure of the electronic device shown in FIG. 4A.

Figure 17:
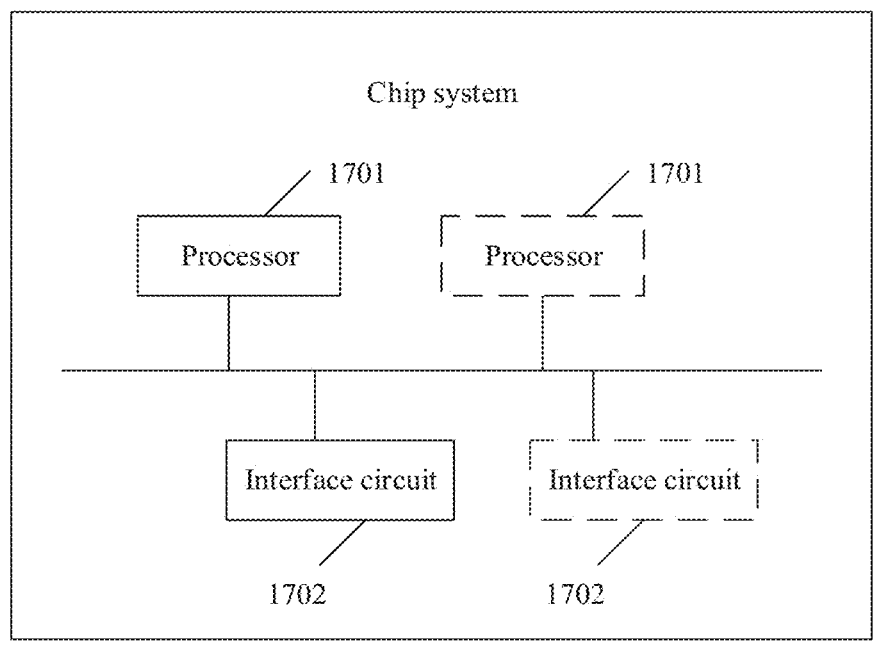
FIG. 17 is a schematic diagram of a structure of a chip system according to an embodiment of this application.

An embodiment of this application further provides a chip system. The chip system may be applied to a foldable electronic device. As shown in FIG. 17, the chip system includes at least one processor 1701 and at least one interface circuit 1702. The processor 1701 and the interface circuit 1702 may be interconnected by using a line. For example, the interface circuit 1702 may be configured to receive a signal from another apparatus (for example, a memory of the electronic device). For another example, the interface circuit 1702 may be configured to send a signal to another apparatus (for example, the processor 1701). For example, the interface circuit 1702 may read an instruction stored in the memory, and send the instruction to the processor 1701. When the instruction is executed by the processor 1701, the electronic device (the electronic device shown in FIG. 4A) may be enabled to perform each operation in the foregoing embodiment. Certainly, the chip system may further include another discrete component. This is not specifically limited in this embodiment of this application.

An embodiment of this application further provides a computer storage medium. The computer storage medium includes a computer instruction. When the computer instruction is run on the foregoing foldable electronic device (the electronic device shown in FIG. 4A), the electronic device is enabled to perform functions or operations performed by the mobile phone in the foregoing method embodiment.

An embodiment of this application further provides a computer program product. When the computer program product is run on a computer, the computer is enabled to perform functions or operations performed by the mobile phone in the foregoing method embodiment.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the operations of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display method for a foldable electronic device, comprising:
   when the electronic device is in a folded state, detecting that the electronic device is in a landscape state or a portrait state, wherein a display screen of the electronic device is divided into a first screen and a second screen when the electronic device is in the folded state; and
   if the electronic device is in the landscape state, displaying, by the electronic device, a first interface in response to horizontal unfolding of the electronic device, wherein the first interface comprises one or more transaction cards to support the electronic device in completing a transaction with another electronic device by using a payment mode;
   if the electronic device is in the portrait state, displaying, by the electronic device, a second interface in response to vertical unfolding of the electronic device, wherein the second interface comprises one of a lock screen interface of the electronic device, a main interface, or an interface displayed before the electronic device is folded;
   wherein the displaying, by the electronic device, the first interface comprising:
   displaying a part of the one or more transaction cards on the first screen, and displaying another part of the one or more transaction cards on the second screen;
   wherein when a distance between the first screen and the another electronic device is shorter than a distance between the second screen and the another electronic device, using a first transaction card from the part of the one or more transaction cards displayed on the first screen in the transaction; when the distance between the second screen and the another electronic device is shorter than the distance between the second screen and the another electronic device, using a second transaction card from the another part of the one or more transaction cards displayed on the second screen in the transaction.

2. The method according to claim 1, wherein the folded state is a state in which an included angle between the first screen and the second screen is less than a first preset angle threshold, the method further comprising
   determining, by the electronic device, that the electronic device is horizontally unfolded in response to detecting that a change of the first screen and/or the second screen in compliance with a preset condition occurs,
   wherein a gyro sensor and/or an acceleration sensor are/is disposed on both the first screen and the second screen; the gyro sensor of the first screen is configured to capture angles between an x-axis, a y-axis, and a z-axis of the first screen and a horizontal plane, and the acceleration sensor of the first screen is configured to capture an acceleration of the first screen; the gyro sensor of the second screen is configured to capture angles between an x-axis, a y-axis, and a z-axis of the second screen and the horizontal plane, and the acceleration sensor of the second screen is configured to capture an acceleration of the second screen; and
   wherein the change of the first screen and/or the second screen comprises: a change of at least one of the angles between the x-axis, the y-axis, and the z-axis of the first screen and the horizontal plane, the angles between the x-axis, the y-axis, and the z-axis of the second screen and the horizontal plane, the acceleration of the first screen, or the acceleration of the second screen.

3. The method according to claim 1, wherein the one or more transaction cards comprises a preset transaction card among transaction cards of the electronic device; and
   wherein the preset transaction card is set in the electronic device by a user; or
   the preset transaction card is a transaction card that is among the transaction cards of the electronic device and a quantity of use times or use frequency of the transaction card in a first preset time period is greater than a first preset threshold; or
   the preset transaction card is a transaction card that is among the transaction cards of the electronic device and matches current scenario information of the electronic device, wherein the current scenario information comprises geographical location information and/or time information; or
   the preset transaction card is a transaction card that currently has a preferential activity among the transaction cards of the electronic device.

4. The method according to claim 3, wherein the one or more transaction cards further comprises a transaction card other than the preset transaction card among the transaction cards of the electronic device;
   wherein the electronic device displays the preset transaction card on the first interface in a preset display manner, and displays the transaction card other than the preset transaction card in another display manner different from the preset display manner; and wherein the preset display manner comprises: displaying the preset transaction card at a top layer of the first interface, wherein the preset transaction card displayed at the top layer of the first interface is not blocked by another transaction card.

5. The method according to claim 1, the method further comprising:
displaying, by the electronic device, the first transaction card on the first screen in a preset display manner in response to a first sliding operation of a user on the first screen, wherein as a sliding position of the first sliding operation changes, the first transaction card is switched among transaction cards displayed on the first screen; and
displaying, by the electronic device, the second transaction card on the second screen in the preset display manner in response to a second sliding operation of the user on the second screen, wherein as a sliding position of the second sliding operation changes, the second transaction card is switched among transaction cards displayed on the second screen.

6. The method according to claim 5, further comprising:
in response to a first operation of the user on a third transaction card displayed on the first screen, displaying, by the electronic device, the third transaction card on the first screen, displaying no other transaction cards on the first screen, and displaying a detailed page of the third transaction card on the second screen; and
in response to a first operation of the user on a fourth transaction card displayed on the second screen, displaying, by the electronic device, the fourth transaction card on the second screen, displaying no other transaction cards on the second screen, and displaying a detailed page of the fourth transaction card on the second screen.

7. The method according to claim 6, further comprising:
in response to a second operation of the user on a fifth transaction card displayed on the first screen, displaying, by the electronic device, the fifth transaction card on the first screen, and displaying, on the second screen, a transaction card that matches the fifth transaction card among the transaction cards of the electronic device; and
in response to a second operation of the user on a sixth transaction card displayed on the first screen, displaying, by the electronic device, the sixth transaction card on the second screen, and displaying, on the first screen, a transaction card that matches the sixth transaction card among the transaction cards of the electronic device.

8. The method according to claim 1, wherein the electronic device comprises a plurality of types of transaction cards comprising at least two types of transaction cards: an identification card, a bank card, a voucher card, or an electronic card, wherein the identification card comprises at least one of an identity card or a social security card, wherein the voucher card comprises at least one of a movie ticket, a train ticket, an airplane ticket, or an entrance ticket, and wherein the electronic card is a transaction card comprising an electronic payment code.

9. The method according to claim 8, wherein the displaying, by the electronic device, the part of the one or more transaction cards on the first screen, and displaying the another part of the one or more transaction cards on the second screen comprises:
displaying, by the electronic device, a first type of transaction card among the plurality of types of transaction cards on the first screen, and displaying a second type of transaction card on the second screen, wherein one or more preset transaction cards comprises two transaction cards.

10. The method according to claim 9, further comprising:
in response to a first folding operation of the user on the electronic device, displaying, by the electronic device, a third type of transaction card on the first screen, and displaying a fourth type of transaction card on the second screen; and
in response to a second folding operation of the user on the electronic device, displaying, by the electronic device, the first type of transaction card on the first screen, and displaying the second type of transaction card on the second screen.

11. The method according to claim 1, further comprising:
displaying, by the electronic device, a label of one or more transaction cards on the display screen while displaying the first interface, wherein the one or more transaction cards are voucher cards comprising at least one of a movie ticket, a train ticket, an airplane ticket, or an entrance ticket, wherein
the label of the one or more transaction cards is used to trigger the electronic device to display a detailed page of a corresponding transaction card.

12. The method according to claim 1, wherein after the displaying, by the electronic device, the first interface, further comprising:
in response to an operation of a user on the display screen, starting, by the electronic device, a preset application of a plurality of applications or a preset function of a plurality of preset functions, or displaying, by the electronic device, a widget area comprising one or more control icons, wherein each control icon of the one or more control icons is used to start one preset application of the plurality of applications or one preset function of the plurality of preset functions.

13. A electronic device, comprising
a memory;
a display screen, wherein the display screen is divided into a first screen and a second screen when the electronic device is in the folded state; and
one or more processors, wherein the memory and the display screen are coupled to the one or more processors, the memory is configured to store computer program code comprising a computer instruction, and when the one or more processors execute the computer instruction, cause the electronic device to
when the electronic device is in a folded state, detect that the electronic device is in a landscape state or a portrait state; and
if the electronic device is in the landscape state, display a first interface in response to horizontal unfolding of the electronic device, wherein the first interface comprises one or more transaction cards to support the electronic device in completing a transaction with another electronic device by using a payment mode;
if the electronic device is in the portrait state, display a second interface in response to vertical unfolding of the electronic device, wherein the second interface comprises one of a lock screen interface of the electronic device, a main interface, or an interface displayed before the electronic device is folded;
wherein to display the first interface, the electronic device is to:

display a part of the one or more transaction cards on the first screen, and displaying another part of the one or more transaction cards on the second screen;

wherein when a distance between the first screen and the another electronic device is shorter than a distance between the second screen and the another electronic device, using a first transaction card from the part of the one or more transaction cards displayed on the first screen in the transaction; when the distance between the second screen and the another electronic device is shorter than the distance between the second screen and the another electronic device, using a second transaction card from the another part of the one or more transaction cards displayed on the second screen in the transaction.

14. The electronic device according to claim 13, wherein the folded state is a state in which an included angle between the first screen and the second screen is less than a first preset angle threshold;

wherein the electronic device is further to determine that the electronic device is horizontally unfolded in response to detecting that a change of the first screen and/or the second screen in compliance with a preset condition occurs;

wherein a gyro sensor and/or an acceleration sensor are/is disposed on both the first screen and the second screen; the gyro sensor of the first screen is configured to capture angles between an x-axis, a y-axis, and a z-axis of the first screen and a horizontal plane, and the acceleration sensor of the first screen is configured to capture an acceleration of the first screen; the gyro sensor of the second screen is configured to capture angles between an x-axis, a y-axis, and a z-axis of the second screen and the horizontal plane, and the acceleration sensor of the second screen is configured to capture an acceleration of the second screen; and wherein the change of the first screen and/or the second screen comprises: a change of at least one of the angles between the x-axis, the y-axis, and the z-axis of the first screen and the horizontal plane, the angles between the x-axis, the y-axis, and the z-axis of the second screen and the horizontal plane, the acceleration of the first screen, or the acceleration of the second screen.

15. The electronic device according to claim 14, wherein the one or more transaction cards comprises a preset transaction card among transaction cards of the electronic device; and wherein the preset transaction card is set in the electronic device by a user; or the preset transaction card is a transaction card that is among the transaction cards of the electronic device and a quantity of use times or use frequency of the transaction card in a first preset time period is greater than a first preset threshold; or the preset transaction card is a transaction card that is among the transaction cards of the electronic device and matches current scenario information of the electronic device, wherein the current scenario information comprises geographical location information and/or time information; or the preset transaction card is a transaction card that currently has a preferential activity among the transaction cards of the electronic device.

16. The electronic device according to claim 15, wherein the one or more transaction cards further comprises a transaction card other than the preset transaction card among the transaction cards of the electronic device;

wherein the electronic device displays the preset transaction card on the first interface in a preset display manner, and displays the transaction card other than the preset transaction card in another display manner different from the preset display manner; and wherein the preset display manner comprises: displaying the preset transaction card at a top layer of the first interface, wherein the preset transaction card displayed at the top layer of the first interface is not blocked by another transaction card.

17. The electronic device according to claim 13, wherein the electronic device is further to:

display the first transaction card on the first screen in a preset display manner in response to a first sliding operation of a user on the first screen, wherein as a sliding position of the first sliding operation changes, the first transaction card is switched among transaction cards displayed on the first screen; and display the second transaction card on the second screen in the preset display manner in response to a second sliding operation of the user on the second screen, wherein as a sliding position of the second sliding operation changes, the second transaction card is switched among transaction cards displayed on the second screen.

18. The electronic device according to claim 17, wherein the electronic device is further to:

in response to a first operation of the user on a third transaction card displayed on the first screen, display the third transaction card on the first screen, display no other transaction cards on the first screen, and display a detailed page of the third transaction card on the second screen; and in response to a first operation of the user on a fourth transaction card displayed on the second screen, display the fourth transaction card on the second screen, display no other transaction cards on the second screen, and display a detailed page of the fourth transaction card on the second screen.

19. The electronic device according to claim 18, wherein the electronic device is further to:

in response to a second operation of the user on a fifth transaction card displayed on the first screen, display the fifth transaction card on the first screen, and display, on the second screen, a transaction card that matches the fifth transaction card among the transaction cards of the electronic device; and in response to a second operation of the user on a sixth transaction card displayed on the first screen, display the sixth transaction card on the second screen, and displaying, on the first screen, a transaction card that matches the sixth transaction card among the transaction cards of the electronic device.

20. The electronic device according to claim 17, wherein the electronic device comprises a plurality of types of transaction cards comprising at least two types of transaction cards: an identification card, a bank card, a voucher card, or an electronic card, wherein the identification card comprises at least one of an identity card or a social security card, the voucher card comprises at least one of a movie ticket, a train ticket, an airplane ticket, or an entrance ticket, and the electronic card is a transaction card comprising an electronic payment code.

* * * * *